US010322767B2

(12) United States Patent
Dragomir

(10) Patent No.: US 10,322,767 B2
(45) Date of Patent: Jun. 18, 2019

(54) CARRY-ON FOLDABLE STEPPER SCOOTER

(71) Applicant: Costel Dragomir, Jersey City, NJ (US)

(72) Inventor: Costel Dragomir, Jersey City, NJ (US)

(*) Notice: Subject to any disclaimer, the term of this patent is extended or adjusted under 35 U.S.C. 154(b) by 81 days.

(21) Appl. No.: 15/409,680

(22) Filed: Jan. 19, 2017

(65) Prior Publication Data
US 2017/0210440 A1 Jul. 27, 2017

Related U.S. Application Data

(60) Provisional application No. 62/286,408, filed on Jan. 24, 2016.

(51) Int. Cl.
B62K 15/00 (2006.01)
B62K 3/00 (2006.01)
B62K 5/05 (2013.01)
B62K 5/08 (2006.01)
B62K 5/10 (2013.01)
B62K 23/06 (2006.01)
B62M 1/36 (2013.01)
B62M 3/08 (2006.01)
B62M 1/30 (2013.01)
B62M 6/40 (2010.01)

(52) U.S. Cl.
CPC ............ B62K 15/008 (2013.01); B62K 3/002 (2013.01); B62K 5/05 (2013.01); B62K 5/08 (2013.01); B62K 5/10 (2013.01); B62K 23/06 (2013.01); B62M 1/30 (2013.01); B62M 1/36 (2013.01); B62M 3/08 (2013.01); B62M 6/40 (2013.01)

(58) Field of Classification Search
USPC ........................................................ 280/221
See application file for complete search history.

(56) References Cited

U.S. PATENT DOCUMENTS 3,079,172 A 2/1963 Burwell
3,309,097 A 3/1967 Karl
3,375,023 A 3/1968 Cox
3,561,778 A 2/1971 La Brie
(Continued)

FOREIGN PATENT DOCUMENTS

CA 1314064 3/1993
CA 2296166 7/2001
(Continued)

Primary Examiner — Joseph M Rocca
Assistant Examiner — Felicia L. Brittman

(57) ABSTRACT

An improved pedal driven scooter may have a mainframe, a joint-frame, a front balance and steering mechanism, one or two front steering wheel(s), a rear drive wheel, and a drive mechanism. The pedals are pushed rearward and move independent of each other within an adjustable angle range. The drive mechanism translates the alternative movement of the pedals into unidirectional rotation, which is further multiplied, and drives the real wheel. A leaning control mechanism allows a rider to stay mounted when the vehicle is stopped. The scooter can be folded with the joint frame pivoting at both ends, such that the rear-wheel docks between or near the front wheel(s) and the scooter can be carried as if it were a carry-on luggage. The scooter may be further folded for storage with the help of a folding hinge which connects a lower part and an upper part of the front steering mechanism.

5 Claims, 52 Drawing Sheets

(56) References Cited

U.S. PATENT DOCUMENTS

| | | |
|---|---|---|
| 3,877,724 A | 4/1975 | Chase |
| 3,913,929 A | 10/1975 | Matsuura |
| 3,954,282 A | 5/1976 | Hege |
| 3,990,717 A | 11/1976 | Best |
| 3,998,469 A | 12/1976 | Ruys |
| 4,019,230 A | 4/1977 | Pollard |
| 4,072,325 A | 2/1978 | Bright et al. |
| 4,088,199 A | 5/1978 | Trautwein |
| 4,124,222 A | 11/1978 | Moe et al. |
| 4,351,410 A | 9/1982 | Townsend |
| 4,375,293 A | 3/1983 | Solbes |
| 4,421,334 A | 12/1983 | Efros |
| 4,445,701 A | 5/1984 | Stroud |
| 4,448,435 A | 5/1984 | Hon |
| 4,473,236 A | 9/1984 | Stroud |
| 4,630,839 A | 12/1986 | Seol |
| 4,634,137 A | 1/1987 | Cocksedge |
| 4,666,174 A | 5/1987 | Efros |
| 4,740,004 A | 4/1988 | McMullen |
| 4,761,014 A | 8/1988 | Huang |
| 4,828,284 A * | 5/1989 | Sandgren ............... B62K 3/002 280/221 |
| 4,844,494 A | 7/1989 | Blanchard |
| 4,903,857 A | 2/1990 | Klopfenstein |
| 4,998,596 A | 3/1991 | Miksitz |
| 5,088,340 A | 2/1992 | Seol |
| 5,326,121 A | 7/1994 | Fisher |
| 5,335,927 A | 8/1994 | Islas |
| 5,442,972 A | 8/1995 | Hoover |
| 5,655,982 A | 8/1997 | Fyfe |
| 5,695,021 A | 12/1997 | Schaffner et al. |
| 5,860,329 A | 1/1999 | Day |
| 6,152,471 A | 11/2000 | Kang et al. |
| 6,209,900 B1 | 4/2001 | Yoshizawa |
| 6,367,824 B1 | 4/2002 | Hayashi |
| 6,382,646 B1 | 5/2002 | Shaw |
| 6,402,173 B1 | 6/2002 | Chiu |
| 6,478,322 B2 | 11/2002 | Fujiwara et al. |
| 6,619,682 B1 | 9/2003 | Carr et al. |
| 6,648,353 B1 | 11/2003 | Cabal |
| 6,648,355 B2 | 11/2003 | Ridenhour |
| 6,716,141 B2 | 4/2004 | Bhoopathy |
| 6,769,706 B2 | 8/2004 | Chow |
| 6,783,139 B1 | 8/2004 | Wang et al. |
| 6,799,771 B2 | 10/2004 | Bigot |
| 6,817,617 B2 * | 11/2004 | Hayashi ............... B62K 5/05 280/124.1 |
| 6,883,817 B2 | 4/2005 | Chu |
| 6,916,031 B1 | 7/2005 | Serdiuk |
| 6,929,276 B2 | 8/2005 | Varan |
| 7,140,626 B1 | 11/2006 | Keay |
| 7,306,249 B2 | 12/2007 | Kwok et al. |
| 7,487,985 B1 | 2/2009 | Mighell |
| 7,523,684 B2 | 4/2009 | French |
| 7,523,685 B2 | 4/2009 | French |
| 7,543,829 B1 | 6/2009 | Barnes |
| 7,544,139 B2 | 6/2009 | Seol |
| 7,581,742 B2 | 9/2009 | Chiu et al. |
| 7,669,869 B2 | 3/2010 | Meguerditchian |
| 7,753,387 B2 | 7/2010 | Wei |
| 7,988,170 B1 | 8/2011 | Fan |
| 8,070,172 B1 | 12/2011 | Smith et al. |
| 8,128,111 B2 | 3/2012 | Scolari et al. |
| 8,226,104 B2 | 7/2012 | Kulikov et al. |
| 8,517,405 B2 | 8/2013 | Yan |
| 8,596,660 B2 | 12/2013 | Hsu et al. |
| 8,686,293 B2 | 1/2014 | Eliasson |
| 8,684,123 B2 | 4/2014 | Chen |
| 8,827,284 B2 * | 9/2014 | Walther ............... B62K 5/023 280/87.041 |
| 9,120,523 B2 | 9/2015 | Wu |
| 2002/0020980 A1 | 2/2002 | Lee |
| 2003/0102176 A1 | 6/2003 | Bautista |
| 2010/0327551 A1 | 12/2010 | Liu et al. |
| 2012/0068433 A1 | 3/2012 | Eliasson |
| 2013/0062859 A1 | 3/2013 | Moldestad |
| 2013/0062863 A1 | 3/2013 | Moldestad |
| 2014/0008882 A1 | 1/2014 | Liao |
| 2015/0076787 A1 | 3/2015 | Kipnis |
| 2015/0232141 A1 | 8/2015 | Bettin |
| 2016/0272264 A1 | 9/2016 | Mogensen et al. |

FOREIGN PATENT DOCUMENTS

| | | |
|---|---|---|
| CN | 2452567 | 10/2001 |
| CN | 104290853 | 1/2015 |
| CN | 102224062 | 3/2015 |
| DE | 102004044524 | 3/2006 |
| DE | 60120268 | 5/2007 |
| FR | 631286 | 12/1927 |
| FR | 748137 | 6/1933 |
| FR | 2344438 | 10/1977 |
| FR | 2670740 | 6/1992 |
| FR | 2700744 | 7/1994 |
| FR | 2713584 | 6/1995 |
| GB | 1013172 | 12/1965 |
| GB | 2104462 | 3/1983 |
| KR | 100584827 | 5/2006 |
| WO | 2013036246 | 3/2013 |
| WO | 2014060238 | 4/2014 |
| WO | 2014108579 | 7/2014 |
| WO | 2014206388 | 12/2014 |
| WO | 2016168207 | 10/2016 |

* cited by examiner

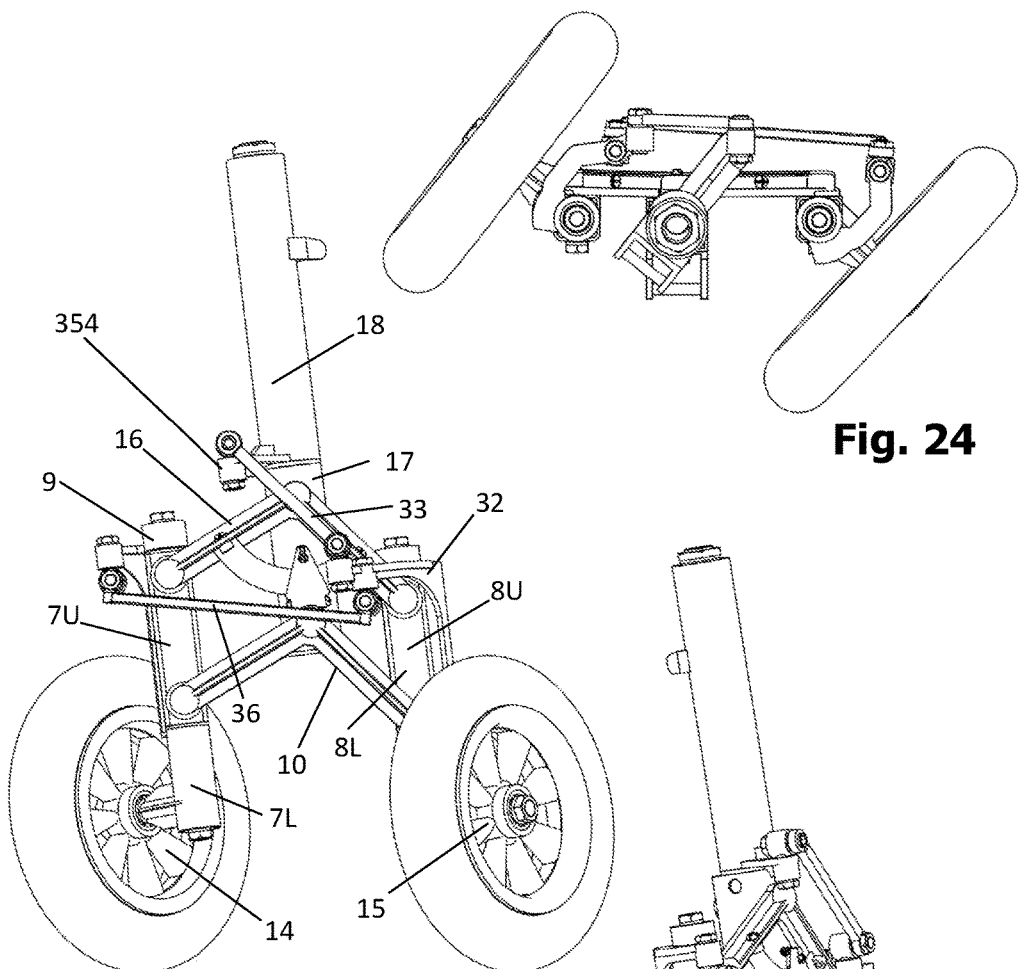
Fig. 24
Fig. 25
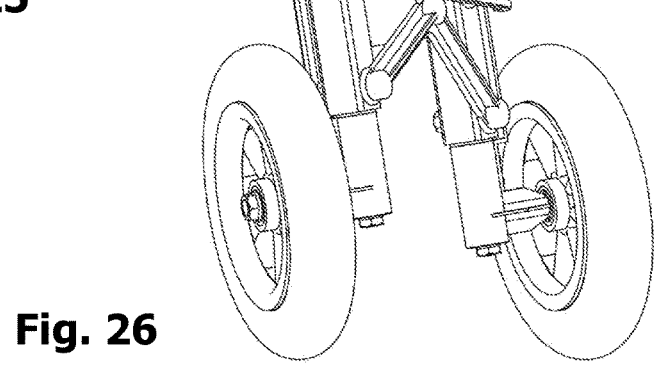
Fig. 26

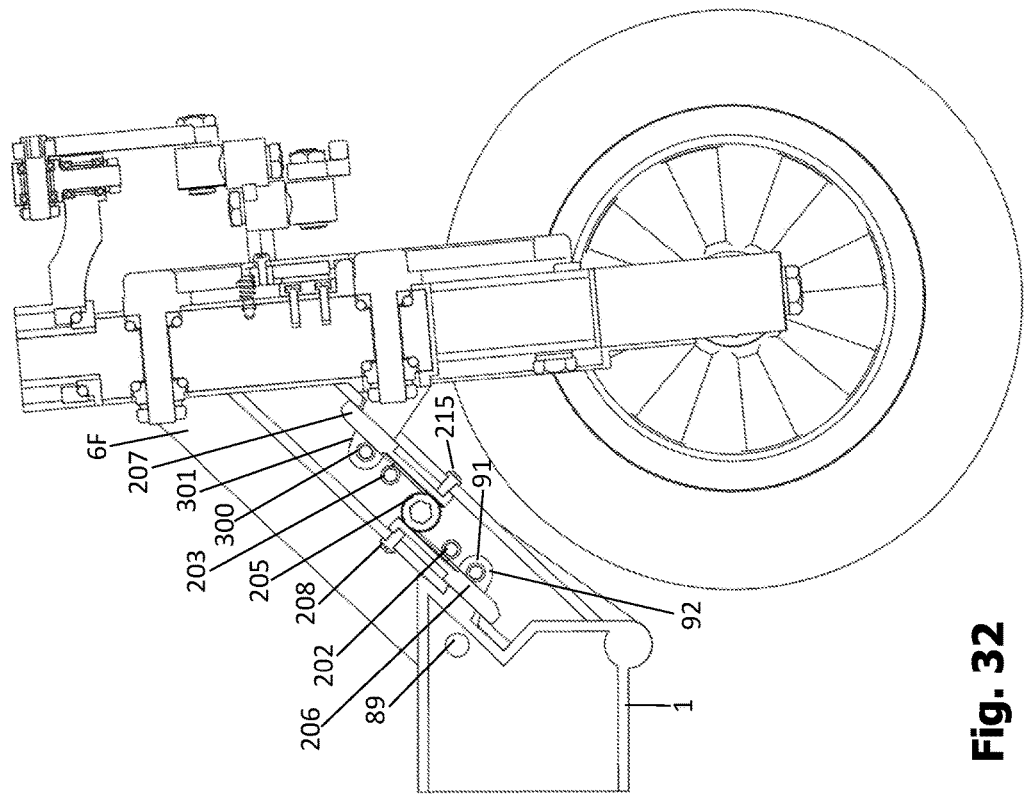
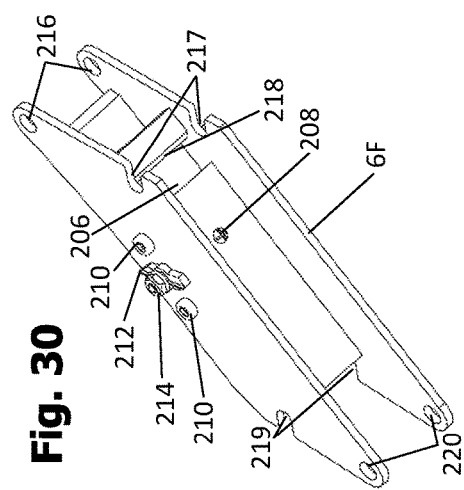
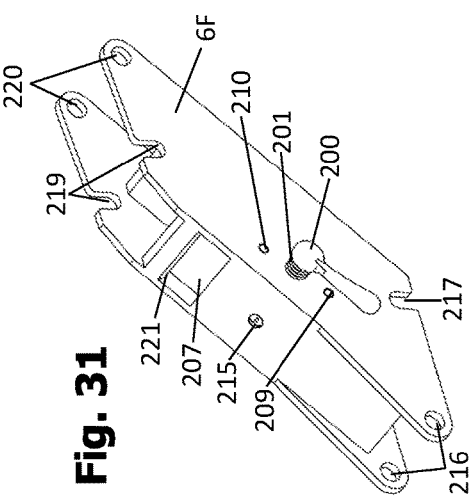

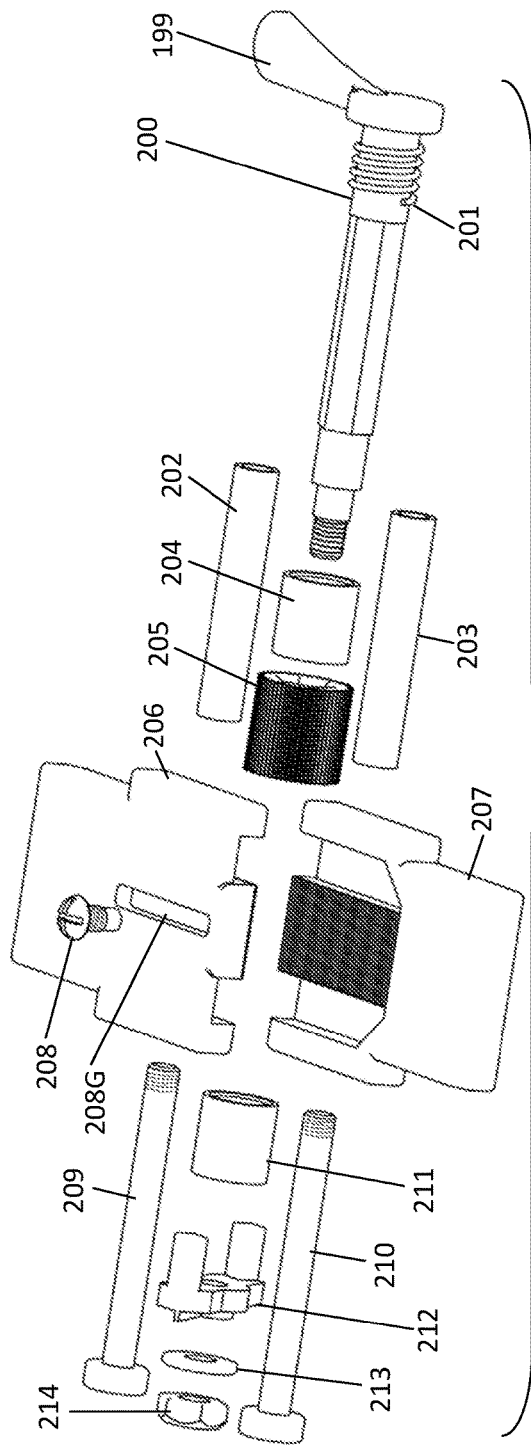

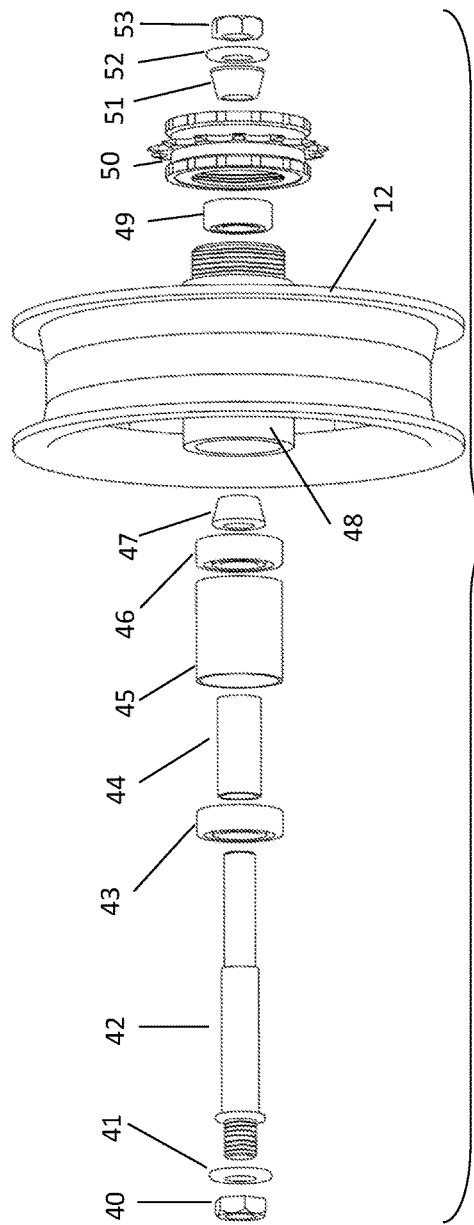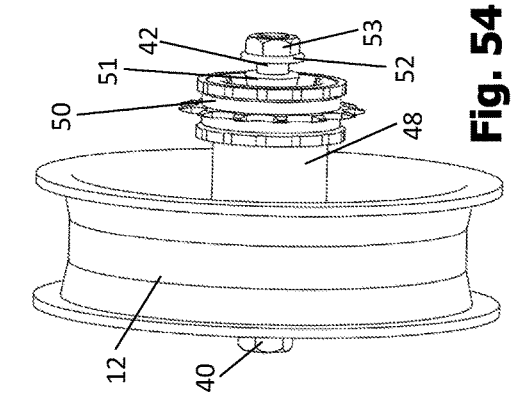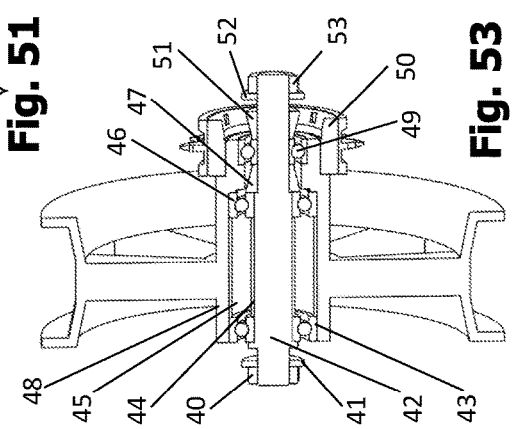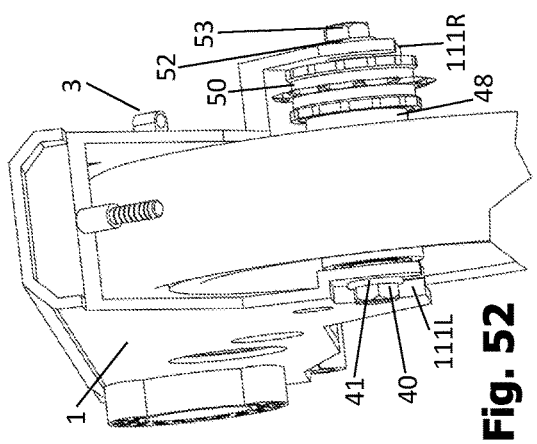

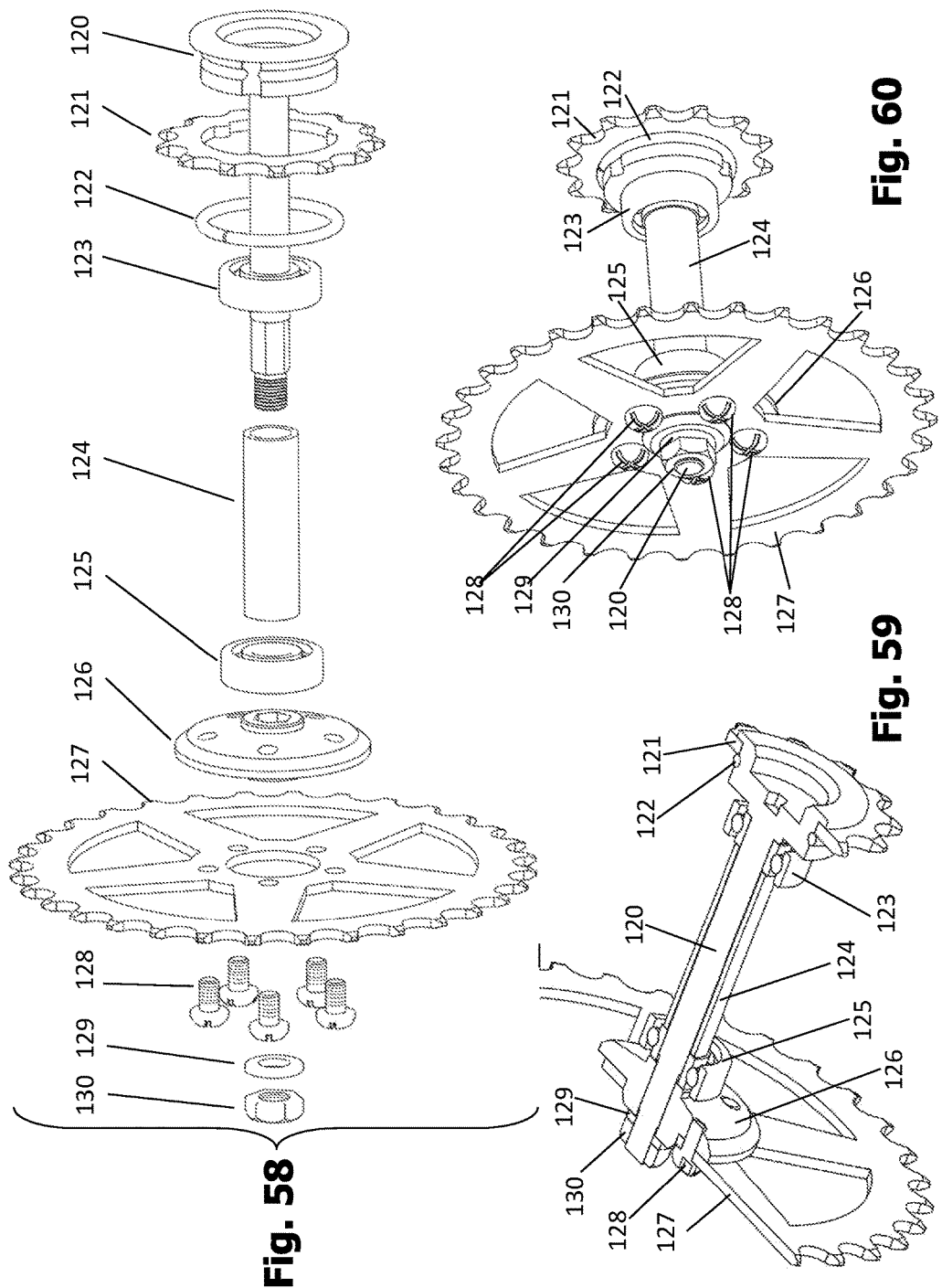

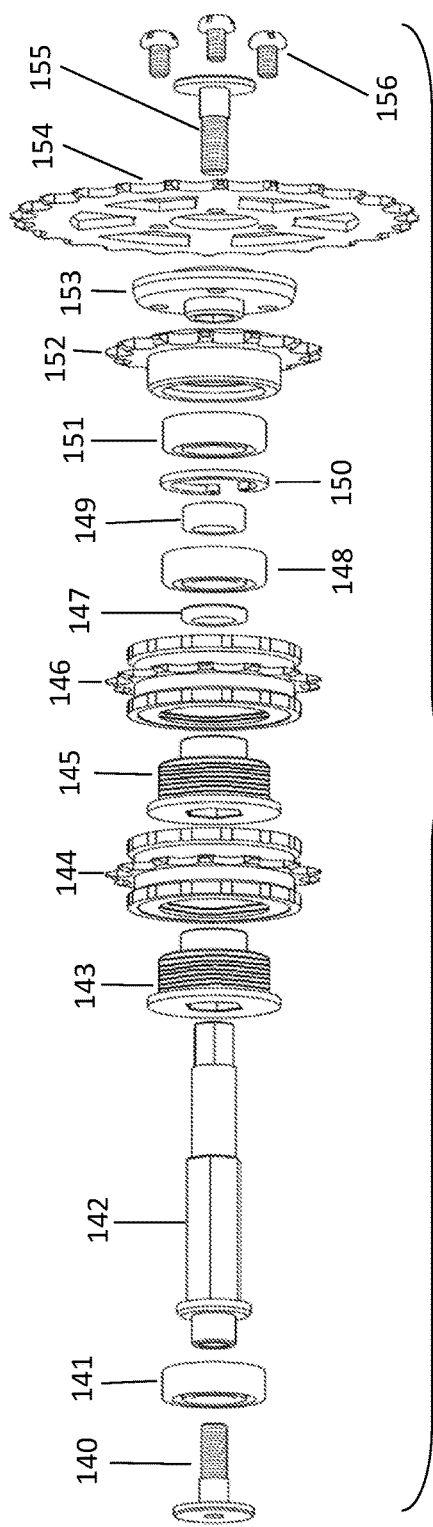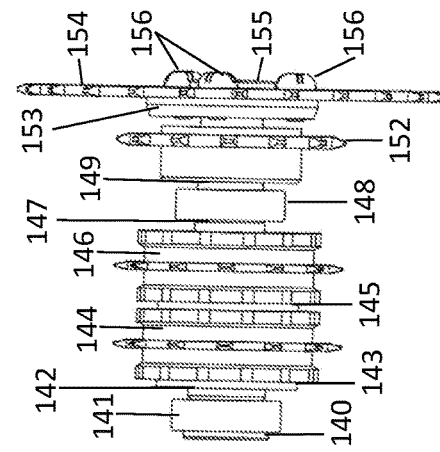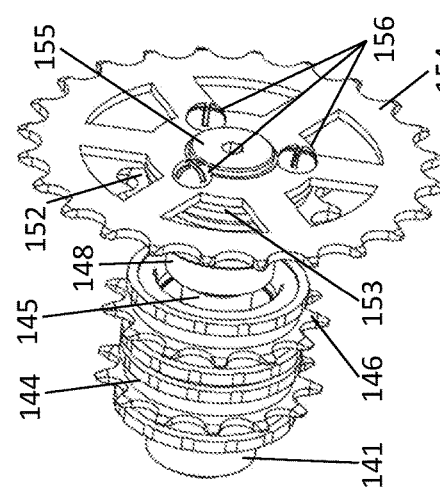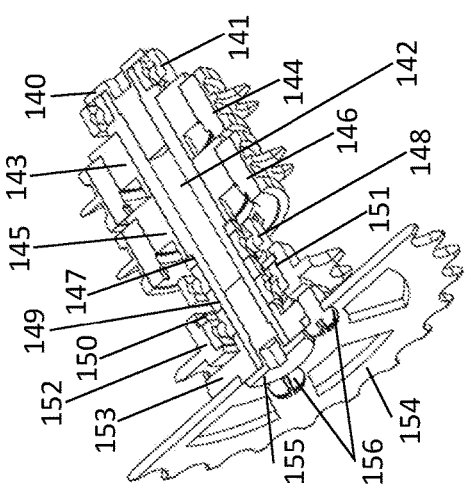
Fig. 61
Fig. 64
Fig. 63
Fig. 62

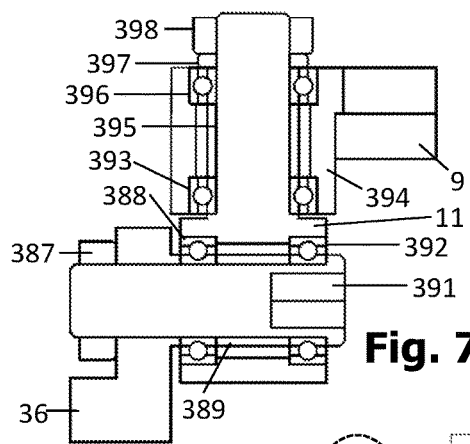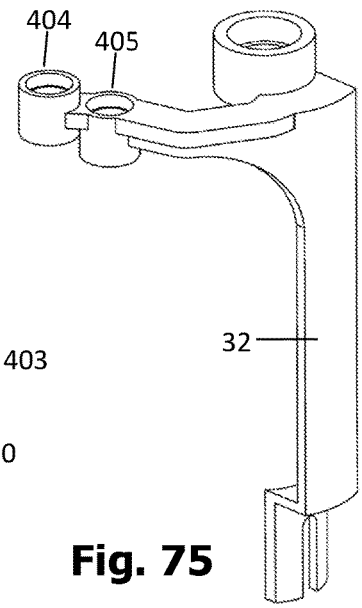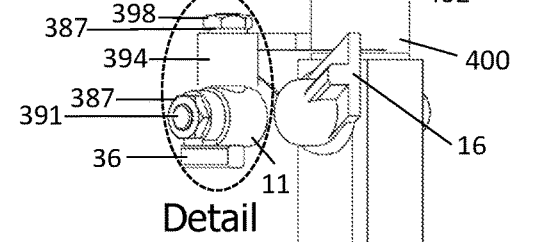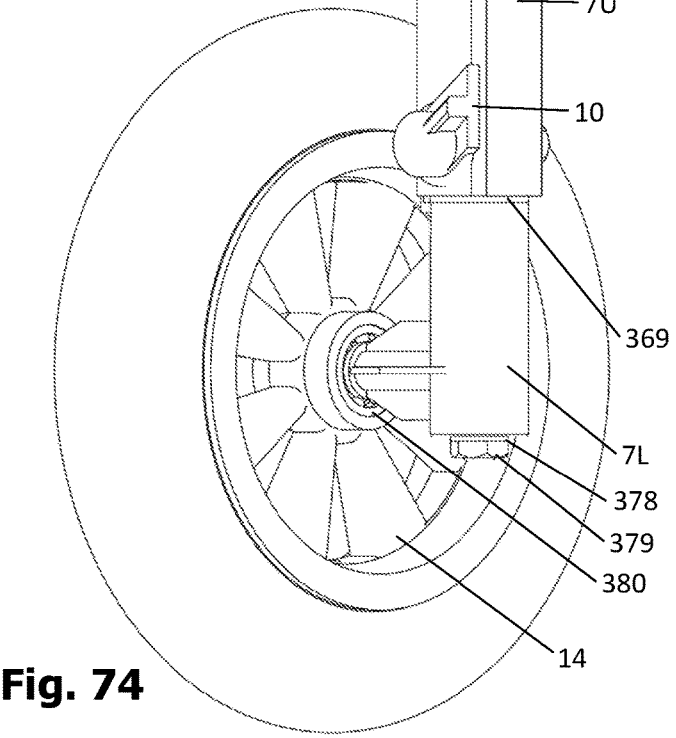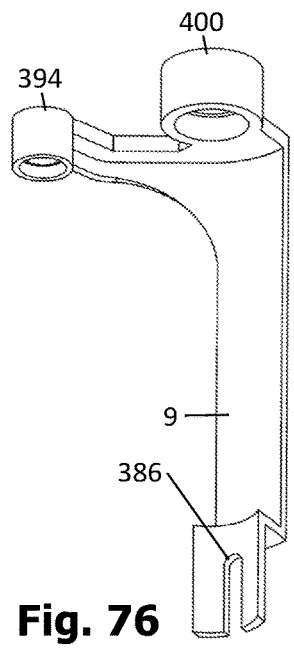
Fig. 73
Fig. 75
Fig. 74
Fig. 76

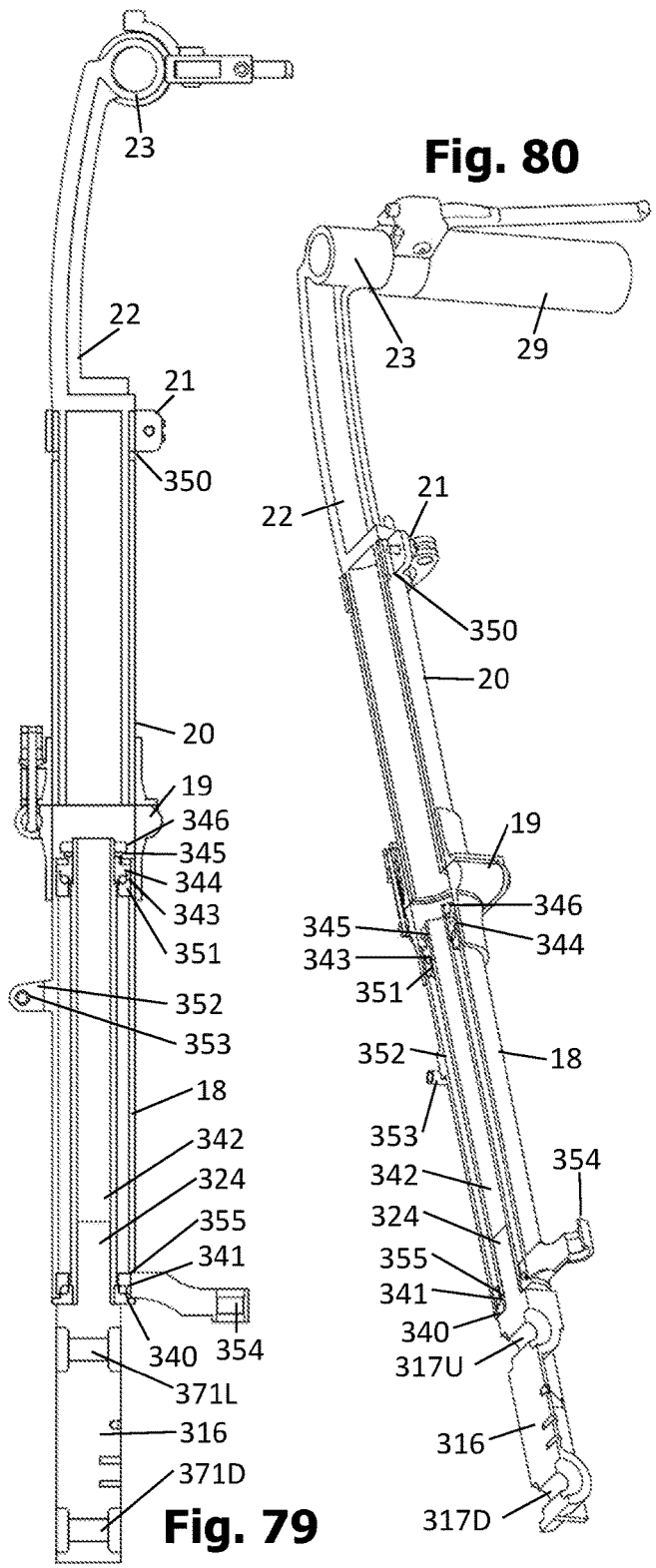

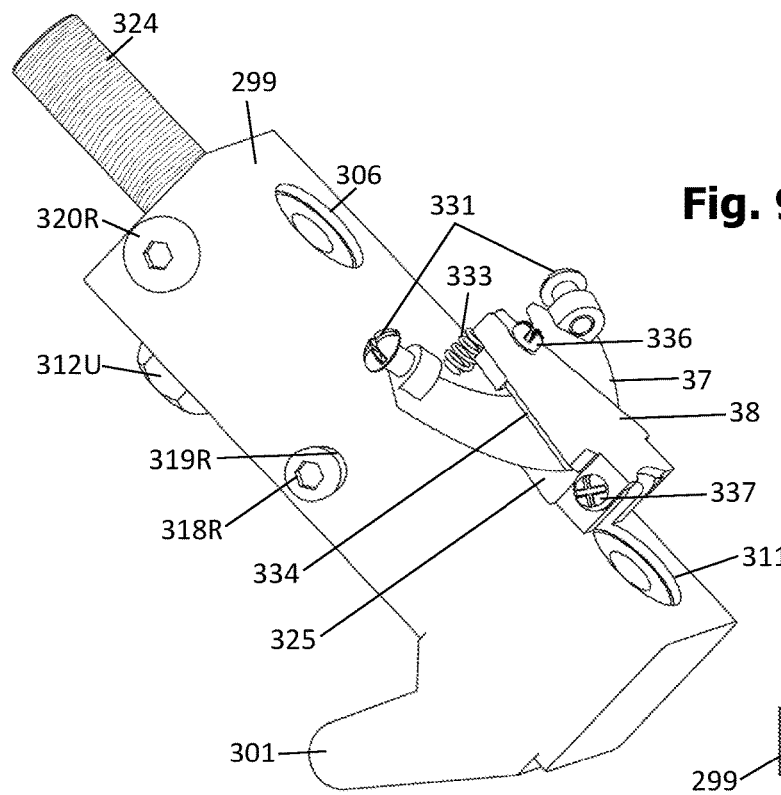
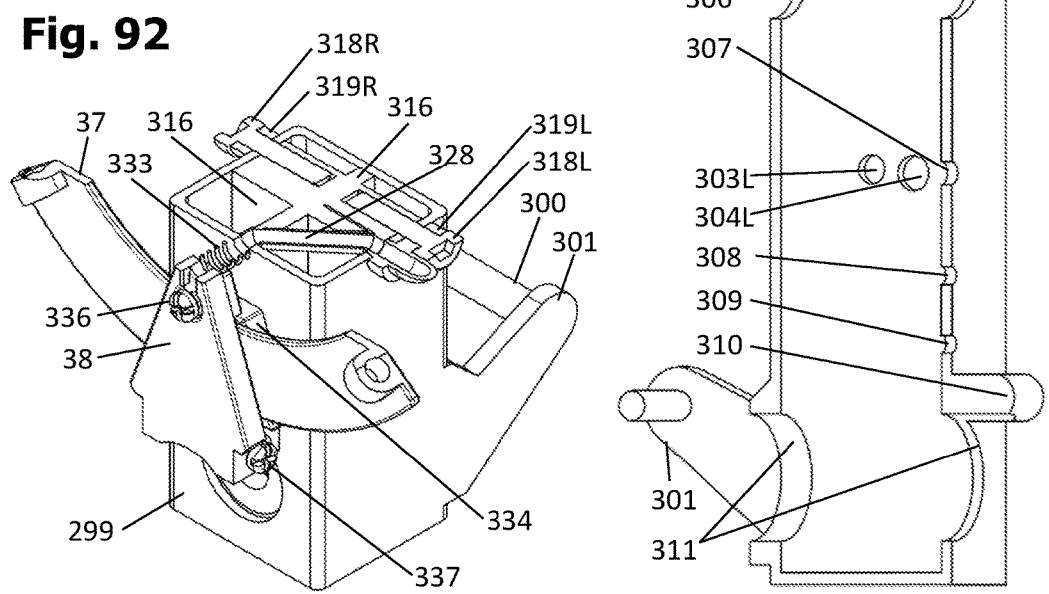

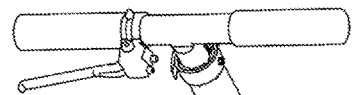
Fig. 94
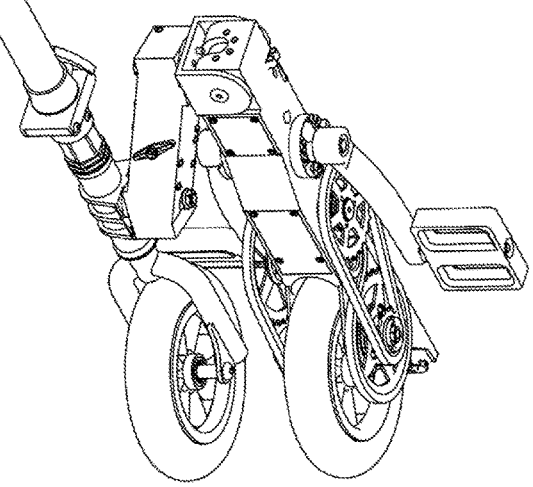
Fig. 95
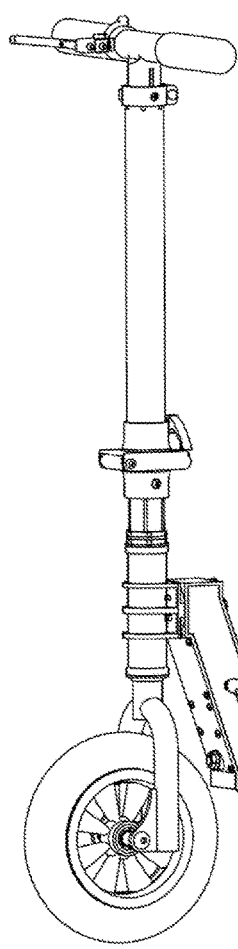
Fig. 96
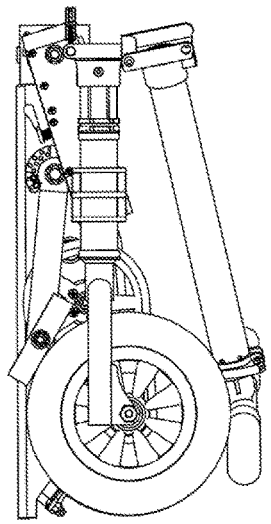
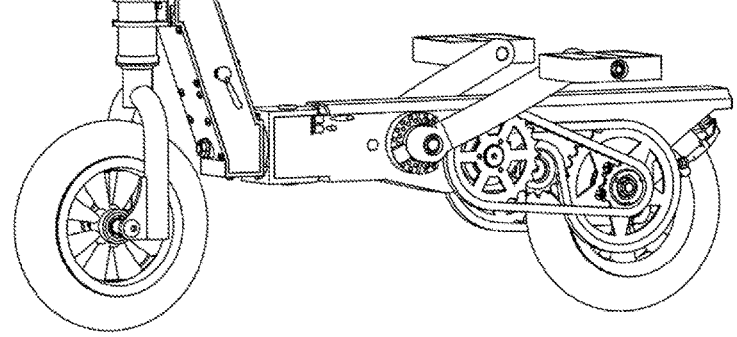

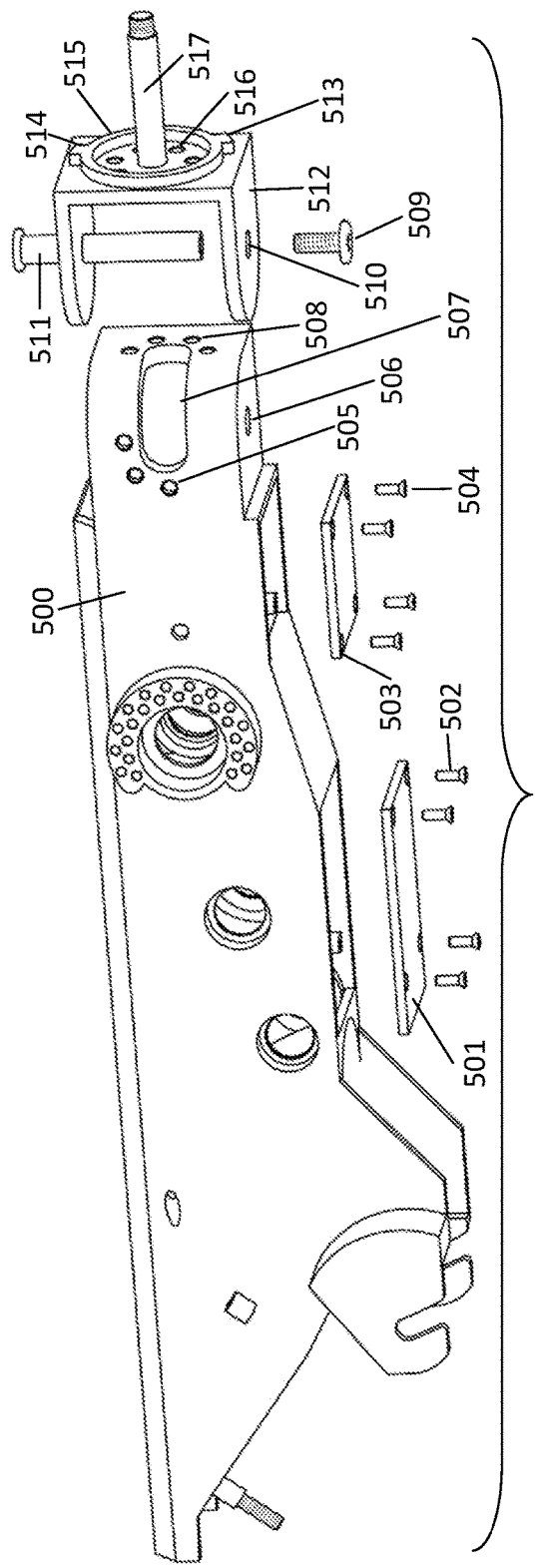
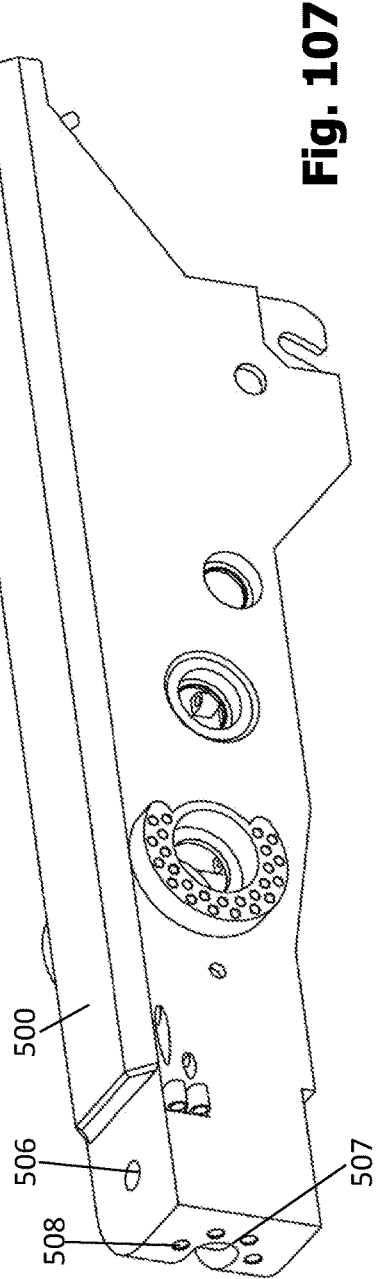
Fig. 106
Fig. 107

CARRY-ON FOLDABLE STEPPER SCOOTER

CLAIM OF PRIORITY

This application claims priority to U.S. Application Ser. No. 62/286,408, filed Jan. 24, 2016, the contents of which are herein fully incorporated by reference in its entirety.

FIELD OF THE EMBODIMENTS

The field of the embodiments of this invention relates to stepper scooters and, in particular, to foldable stepper scooters having pedals that rotate freely from one another.

BACKGROUND OF THE EMBODIMENTS

A pedal-driven scooter is typically composed of a fork and handlebars connected to hold a front wheel assembly linked to a back wheel assembly by means of a mainframe holding pedals and a transmission mechanism. Scooters are popular among users in crowded cities due to their small size when used, stored, and/or carried on. As scooters are generally used by riders in an upright position, they offer a riding experience closer to walking. They have higher maneuverability than bicycles when used in conditions where the interaction with pedestrian traffic requires many stops and turns. These advantages are achieved by using smaller wheels attached to a structure with a very low center of gravity. However, the use of small wheels comes in conflict with the need for high speed, and a mainframe closer to ground makes difficult the use of a traditional pedal and crank-set mechanism. One way of overcoming these difficulties is to use a stepper system which translates the up and down movements of the pedals within a limited angle range, into a continuous rotational movement that is further multiplied and transmitted to the back wheel by a transmission mechanism.

Examples of related art are described below:

U.S. Pat. No. 8,128,111 B2 pertain to a scooter that has a drive mechanism which is designed with two reciprocal pedals that transmit their up and down movements to a drive wheel by means of two linkage connections. A pedal needs to be positioned all the way up before it can be pushed back all the way down for the drive wheel to be able to perform a complete revolution. This design suffers from the well-known drawback of the conventional rotary pedal cranks where the driver has little control over the way the driving force is converted into drive torque at certain points of the pedal excursion. This arrangement makes the scooter difficult to ride uphill or on a muddy road, even when a speed change system is added. Moreover, this scooter has little possibilities to be folded efficiently, to be stored, or to be carried on when not in use.

U.S. Pat. No. 8,517,405 B2 pertain to a three wheel scooter with a reciprocal set of pedals and a gear train which translates the downward movement of one pedal into a rotational force directed to the back wheels, and also provides upward return force to a second pedal. The overall design of the scooter using this drive train has several drawbacks. The shafts of the two pedals are not collinear, causing discomfort for a rider who needs to hold one foot slightly ahead of the other foot when riding. Moreover, the pedals are designed to be pushed forward, thus the horizontal length of the scooter cannot be reduced, as would be the case with a scooter where the pedals are pushed backward, moving up and down on the sides of the back wheel. The two back wheels are rigid, thus prone to tip the scooter over at sharp turns. The angle range is not wide enough, thus limiting the speed the scooter can achieve.

Both U.S. Pat. No. 6,367,824 B1 and U.S. Pat. No. 6,817,617 B2 pertain to designs for tricycles with two front wheels using a well-known parallelogram structure which changes the inclination angle of both front wheels by the same amount as the inclination angle of the back wheel. The steering systems employed here use a tie rod arrangement, which works satisfactorily when the distance between the two front wheels is large enough not to matter at higher inclinations, where the two tie rods cannot be maintained collinear. However, this tie rod design cannot be employed for smaller tricycles or scooters, where the two front wheels are smaller in size and placed closer to each other. Consequently, at higher inclinations, or when one of the wheels runs over an obstacle while the other remains on the pavement, the two left and right tie rods pull the front tips of the wheels towards each other, thus breaking Ackermann's steering geometry rules.

None of the art described above addresses all of the issues that the present invention does.

SUMMARY OF THE EMBODIMENTS

According to an embodiment of the present invention, a drive mechanism for user propelled vehicles is provided. The drive mechanism includes a mainframe having an enclosure with a median divide along a segment of its length, thus forming a left chamber and a right chamber within the enclosure a left-crank-shaft protruding from the left chamber and a right-crank-shaft protruding from the right chamber, wherein the left-crank-shaft and the right-crank-shaft are able to rotate independently of each other. The drive mechanism further includes a drive-wheel attached to the left-crank-shaft and a drive-wheel attached to the right-crank-shaft, each drive-wheel being attached to each respective crank-shaft via supporting means, and whereby each drive-wheel and its respective crank-shaft rotate jointly.

According to another embodiment of the present invention, a three-wheeled scooter is provided. The three-wheeled scooter includes a mainframe, a rear-wheel mounted at a rear end of the mainframe and braking means for the rear-wheel, whereby a rider can control the braking of the rear-wheel by hand, a drive mechanism held by the mainframe, whereby the drive mechanism propels the rear-wheel, and a steering-handlebar mounted perpendicularly on a handlebar-stem, which handlebar-stem is inserted in an upper steering-shaft and secured in a desired position by a stem ring assembly mounted on the upper steering-shaft. The three-wheeled scooter further includes a left front-wheel pivotally mounted on bearing means on an horizontal axle of a left-front-wheel support and a right front-wheel pivotally mounted on bearing means on an horizontal axle of a right-front-wheel support, a left steering-arm which is rigidly connected to the left-front-wheel support and a right steering-arm which is rigidly connected to the right-front-wheel support, a steering-spacer having one end connected with bearing means to a front-tip of a left steering-arm, and having the other end connected with bearing means to a front-tip of a right steering-arm, whereby the steering-spacer can move freely while keeping a constant distance between two front-tips of the left and right steering-arms, and a steering-rod having one end connected with bearing means to a frontal steering-tip on a lower steering-shaft, and having another end connected with bearing means to the front-tip of the left steering-arm, whereby the steering-rod can move freely while keeping a constant distance between the frontal steering-tip and the tip of the left steering-arm. The left and right steering of the handlebar turns the handlebar-stem which rotates in conjunction with the upper steering-shaft, the lower steering-shaft, and the steering-tip on the lower steering-shaft, thus pushing or pulling the steering-rod, which in turn causes the front-tips of the left and right steering-arms to rotate jointly with the left and right front-wheel supports, and the left and right front-wheels around axles of the left and right legs respectively.

According to yet another embodiment of the present invention, a two-wheeled scooter is provided. The two-wheeled scooter includes a mainframe, a rear-wheel mounted at the rear end of the mainframe having rear-wheel braking means, whereby a rider can control the braking of the rear-wheel by hand, a drive mechanism held by the mainframe, whereby the drive mechanism propels the rear-wheel, a mainframe hinge mounted pivotally on a mainframe front end, whereby the mainframe hinge can rotate in a horizontal plane within a predetermined angle range, and a front-wheel pivotally mounted on bearing means on an axle held by a front-wheel fork. The two-wheeled scooter further includes a fork-stem rigidly connected to the front-wheel fork, a post pivotally mounted on bearing means on the fork-stem, a folding hinge adaptor rigidly mounted at a top the fork-stem, a folding hinge assembly connecting the folding hinge adaptor to a steering shaft, and a steering-handlebar mounted perpendicularly on a handlebar-stem, wherein the handlebar-stem is inserted in a steering-shaft and secured in a desired position by a stem ring assembly, wherein the stem ring assembly is mounted on the steering-shaft.

It is an object of an embodiment of the present invention to provide for the drive mechanism, wherein the left-crank-shaft is mounted transversally and largely inside the left chamber, supported by bearing means attached to the median divide and the left side of the enclosure, and having a segment of predetermined length extending outside the mainframe.

It is an object of an embodiment of the present invention to provide for the drive mechanism, wherein the right-crank-shaft is mounted transversally and largely inside the right chamber, supported by bearing means attached to the median divide and the right side of the enclosure, and having a segment of predetermined length extending outside the mainframe, and being collinear with the left-crank-shaft.

It is an object of an embodiment of the present invention to provide for the drive mechanism, wherein the drive mechanism further includes a pair of crank-arms symmetrically affixed to each of the left- and right-crank-shafts on the segments outside the mainframe.

It is an object of an embodiment of the present invention to provide for the drive mechanism, wherein the drive mechanism further includes a pair of pedals pivotally mounted on each of the crank-arms.

It is an object of an embodiment of the present invention to provide for the drive mechanism, wherein the drive mechanism further includes a means for controlling a range of an angle within which the two crank-arms can rotate, including two retaining levers rigidly mounted on the outside segments of the two crank shafts, and pedal stoppers fastened to the mainframe in predetermined locations around the crank shafts on each side of the mainframe.

It is an object of an embodiment of the present invention to provide for the drive mechanism, wherein the drive mechanism further includes a means for providing upward recovery movement of each crank-arm and pedal, the means including one left torsion-spring having one of its ends connected with connecting means to the left crank shaft while the other end is connected to a predetermined fixed point, and one right torsion-spring having one of its ends connected with connecting means to the right crank shaft while the other end is connected to a predetermined fixed point.

It is an object of an embodiment of the present invention to provide for the drive mechanism, wherein the drive mechanism further includes a unidirectional-shaft mounted transversally and largely inside the mainframe, supported by bearing means attached to a left side and a right side of the mainframe, and having a segment of predetermined length outside of the mainframe.

It is an object of an embodiment of the present invention to provide for the drive mechanism, wherein the drive mechanism further includes two free-wheels rigidly attached to the unidirectional-shaft with supporting means on an inside of the mainframe, each of the two free-wheels containing a one way clutch, whereby rotational movements of the left- and right-crank-shafts are translated into a unidirectional rotary movement of the unidirectional-shaft.

It is an object of an embodiment of the present invention to provide for the drive mechanism, wherein the drive mechanism further includes a free-rotating sprocket pivotally mounted on bearing means on the outside segment of the unidirectional shaft, whereby the free-rotating sprocket can rotate both directions without engaging the unidirectional shaft.

It is an object of an embodiment of the present invention to provide for the drive mechanism, wherein the drive mechanism further includes a chain-wheel rigidly mounted on supporting means on the outside segment of the unidirectional-shaft, whereby the chain-wheel rotates jointly with the unidirectional-shaft.

It is an object of an embodiment of the present invention to provide for the drive mechanism, wherein the drive mechanism further includes a small-chain-wheel and a large-chain-wheel mounted jointly on a supporting means and a bearing means on a rear-left axle.

It is an object of an embodiment of the present invention to provide for the drive mechanism, wherein the drive mechanism further includes a drive-shaft mounted transversally and largely inside the mainframe, supported by bearing means attached to left and the right sides of the mainframe, having a left segment and a right segment of predetermined lengths outside of the mainframe.

It is an object of an embodiment of the present invention to provide for the drive mechanism, wherein the drive mechanism further includes a left-chain-wheel rigidly mounted on supporting means on a left segment of the drive-shaft outside of the mainframe and a right-chain-wheel rigidly mounted on supporting means on a right segment of the drive-shaft outside of the mainframe.

BRIEF DESCRIPTION OF THE DRAWINGS

FIGS. 1-93 show various embodiments of a three-wheel scooter, according to various embodiments of the present invention.

FIG. 1 is a perspective view of the three-wheel scooter in a "carry-on" state.

FIG. 24 is a view of the steering components when turning right, as it can be seen from above.

FIG. 25 is a frontal view of the steering components in FIG. 24.

FIG. 26 is a lateral view of the steering components in FIG. 24.

FIG. 30 is a perspective view of the joint assembly as seen from above.

FIG. 31 is a perspective view of the joint assembly as seen from below.

FIG. 32 is a longitudinal section of the joint assembly and the components attached to it.

FIG. 33 is an exploded view of the joint assembly.

FIG. 34 is a perspective view of the joint assembly without its frame.

FIG. 35 is a transversal section view of the joint assembly along the axis of its axle.

FIG. 51 is an exploded view of a back wheel assembly.

FIG. 52 is a partial view of the back wheel assembly, showing how it is attached to the mainframe.

FIG. 53 is a transversal section of the back wheel assembly, without the mainframe.

FIG. 54 is perspective view of the back wheel assembly without the mainframe.

FIG. 58 is an exploded view of a drive assembly mounted on the mainframe next to the back wheel.

FIG. 59 is a transversal section view of the drive assembly in FIG. 58.

FIG. 60 is a perspective view of the drive assembly in FIG. 58.

FIG. 61 is an exploded view of the unidirectional assembly mounted on the frame next to the pedal hub.

FIG. 62 is a transversal section view of the unidirectional assembly in FIG. 61.

FIG. 63 is a perspective view of the unidirectional assembly in FIG. 61.

FIG. 64 is a frontal view of the unidirectional assembly in FIG. 61.

FIG. 73 is a section view of an assembly marked as "Detail" in FIG. 74 and FIG. 78.

FIG. 74 is a perspective view of the right front wheel along with the right front steering assembly.

FIG. 75 is a perspective view of a left steering-arm.

FIG. 76 is a perspective view of a right steering-arm.

FIG. 79 is a longitudinal section of a frontal steering assembly.

FIG. 80 is a perspective view of the components in FIG. 79.

FIG. 81 is a perspective view of a folding hinge in an open position.

FIG. 82 is a perspective view with hidden lines of the folding hinge in a closed position.

FIG. 83 shows a perspective view with no hidden lines of the folding hinge in a closed position.

FIG. 84 shows a perspective view of a handlebar-stem ring assembly.

FIG. 91 is a perspective view of the balance assembly in FIG. 86 without two frontal v-links.

FIG. 92 is a horizontal section of the components in FIG. 91 showing a cable guide to a balance controller.

FIG. 93 is a vertical plane section of the front-frame.

FIGS. 94-124 show various embodiments of a two-wheel scooter, according to various embodiments of the present invention.

FIG. 94 is a perspective view of a two-wheel scooter in a "carry-on" state.

FIG. 95 is a perspective view of the two-wheel scooter in a "ride-on" state.

FIG. 96 is a lateral view of the two-wheel scooter in a "storage" state.

FIG. 97 is an enlarged view of the two-wheel scooter as shown in FIG. 95.

FIG. 98 is a perspective view of the two-wheel scooter in a "ride-on" state as seen from right.

FIG. 99 is an enlarged view of the two-wheel scooter as shown in FIG. 94.

FIG. 100 is another perspective view of the two-wheel scooter as shown in FIG. 99.

FIG. 101 is a lateral view of the two-wheel scooter as shown in FIG. 99.

FIG. 102 is a perspective view of the two-wheel scooter completely folded, as seen from back.

FIG. 103 is a perspective view of the two-wheel scooter completely folded, as seen from right.

FIG. 104 is a perspective view of the two-wheel scooter completely folded, as seen from below.

FIG. 105 is a perspective view of the two-wheel scooter completely folded, as seen from front.

FIG. 106 is an exploded view of the mainframe and its external components.

FIG. 107 is a perspective view of the mainframe.

FIG. 108 is a longitudinal section view of a frontal tip of the mainframe, as seen from right.

FIG. 109 is a transversal section view of the frontal tip of the mainframe.

FIG. 110 is a longitudinal section view of a frontal tip of the mainframe, as seen from left.

FIG. 111 is a perspective view of a mainframe hinge as seen from front.

FIG. 112 is a perspective view of the mainframe hinge as seen from the back.

FIG. 113 is a perspective view of a joint assembly (without its frame), the mainframe hinge, and a post, as seen from right.

FIG. 114 is a perspective view of the joint assembly (with its frame), the mainframe hinge, and the post, as seen from left.

FIG. 115 is a transversal section view of the joint assembly along the axis of its axle.

FIG. 116 is an exploded view of the joint assembly.

FIG. 117 is a perspective view of a front wheel and steering assembly, as seen from right.

FIG. 118 is a perspective view of the front wheel and steering assembly, as seen from back.

FIG. 119 is an exploded view of the front wheel and steering assembly in FIG. 117.

FIG. 120 is longitudinal section view of the components in FIG. 121.

FIG. 121 is perspective view of some of some components of the steering assembly.

FIG. 122 is perspective view of a folding hinge.

FIG. 123 is a horizontal section view of the folding hinge.

FIG. 124 shows a perspective view of the handlebar-stem ring and the components it binds.

DESCRIPTION OF THE PREFERRED EMBODIMENTS

Figure 1:
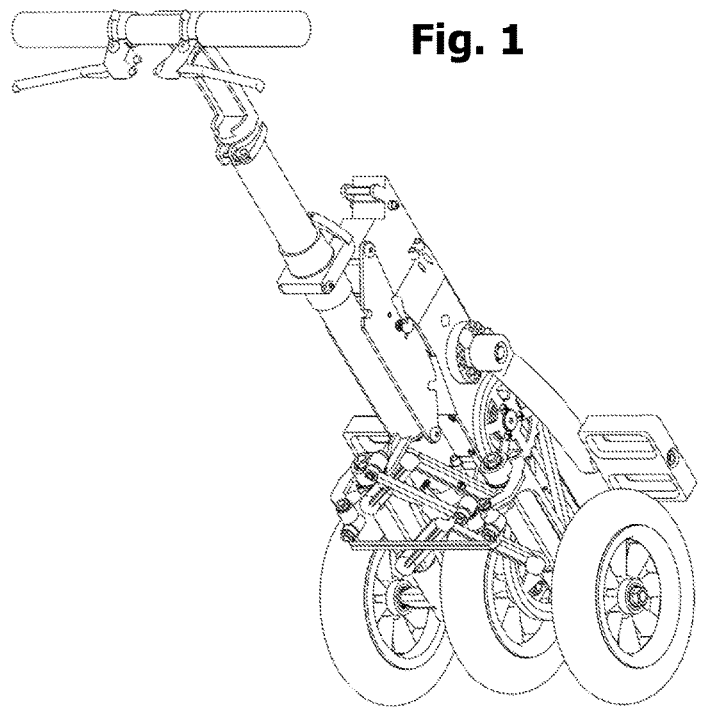
Figure 2:
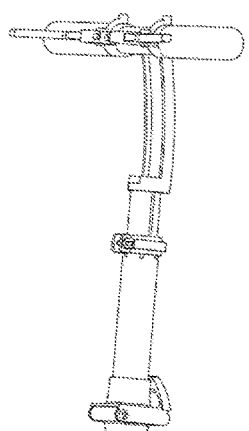
FIG. 2 is a perspective view of the three-wheel scooter in a "ride-on" state.
Figure 3:
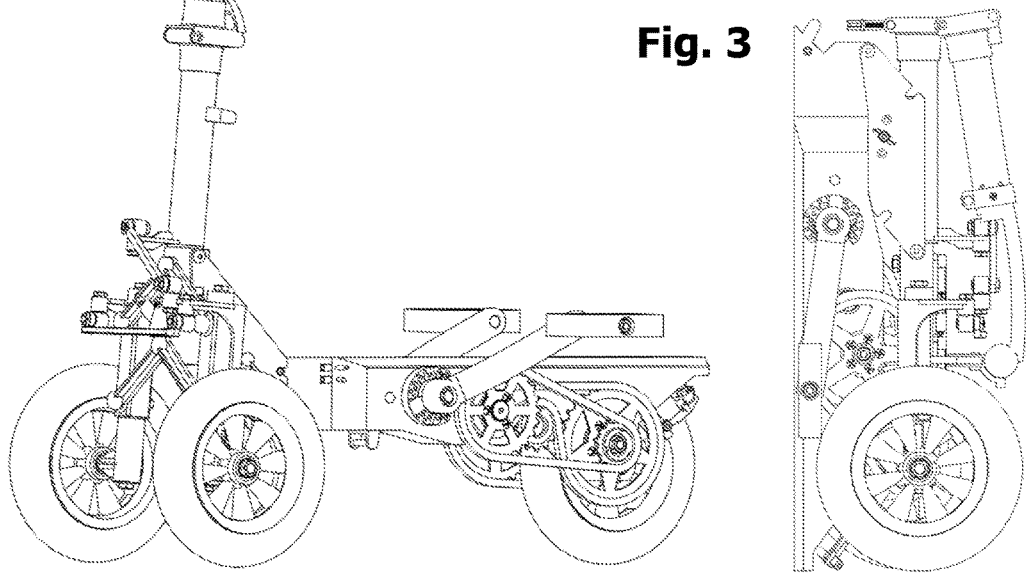
FIG. 3 is a lateral view of the three-wheel scooter in a "storage" state.

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

Referring now to FIGS. 1-9 an embodiment of a three-wheel scooter 1000 having one driven rear wheel assembly 12 and two steerable front wheels 14, 15, is illustratively depicted. According to an embodiment, the three-wheel scooter includes a mainframe 1 that includes a means for mounting the aforementioned rear-wheel assembly 12, two pedal assemblies 4, 5, a drive gear assembly 13, and a break assembly 2. A steering and balance mechanism 1001 is connected to the mainframe 1 with the help of a joint assembly 6 which can pivot around its two ends and be locked in two desired positions. According to an embodiment, brake 2 is controlled by a handbrake long lever 25 through the means of a cable (not shown) routed from brake 2, mounted on the rear-wheel, to a handbrake assembly 27, through several cable guides 3. Handbrake assembly 27 has an additional short lever 26 which is designed to be pushed and retained in one of two positions. According to an embodiment, another handbrake assembly 28 is mounted on the opposite side of a steering-handlebar 23. Further description of braking components 2, 27, 28 is omitted as these are of a type ordinarily used for bicycles. It is noted, however, that other suitable types of braking components may also be used, while maintaining the spirit of the present invention.

According to an embodiment, two handgrips 24, 29 are inserted at each end of the steering-handlebar 23. According to an embodiment, a handlebar-stem 22, which is perpendicularly attached to the middle of the steering-handlebar 23, has its other end inserted into an upper steering-shaft 20 and can be locked in the desired position with the help of a stem locking system 21, though other suitable locking systems may also be used.

A folding hinge assembly 19 connects upper steering-shaft 20 to a lower-steering-shaft 18, which is pivotally mounted on an internal cylindrical post stemming from a front-frame assembly 17. According to an embodiment, a lower v-shaped linkage 10 and a upper v-shaped linkage 16 connect to front-frame assembly 17 with two steering columns 7U, 8U, 7L, 8L by the means of pivots and ball bearing systems, thus forming a parallelogram structure which maintains front wheels 14, 15 and rear-wheel assembly 12 at equal angles to the ground surface when the scooter leans left or right. Each steering column includes a leg 7U, 8U and a front-wheel support 7L, 8L. Front-wheel supports 7L, 8L are designed to be able to pivot around shafts rigidly connected to the bottoms of legs 7U, 8U while supported by ball bearing systems. Two steering-arms 9, 32 are mounted on bearings revolving around shafts that are rigidly connected to each of the top of legs 7U, 8U. According to an embodiment, the bottom of each steering-arm 9, 32 is tied with screws to the corresponding front-wheel support 7L, 8L, thus forming a rigid structure which can rotate around their corresponding legs 7U, 8U. Each of the two front wheels 14, 15 is attached to its own front-wheel support 7L, 8L by the means of a bearing system rotating around a shaft horizontally mounted on the respective front-wheel support 7L, 8L. Four rod-ends 31, 34, 35, 11 are bearing structures mounted on the frontal tips of steering columns 9, 32 and lower-steering-shaft 18. A steering-rod 33 connects rod-ends 31 and 34 while a steering-spacer 36 connects rod-ends 35 and 11. Thus, each end of the mentioned steering-spacers 36 can rotate around a vertical axis as well as a horizontal axis. A balance control assembly includes an arc-shaped component 37 rigidly mounted between the arms of upper linkage 16 and a clamp mechanism 38 which can be pulled or released by the long lever of the left hand-brake 28 through a cable (not shown). According to an embodiment, the three-wheeled scooter 1000 is configured to be folded and unfolded in approximately 10 or fewer seconds.

FIGS. 51, 52, 53, and 54 illustrate the details of aforementioned rear-wheel assembly 12. Two bearings 43, 46 are mounted on a rear-axle 42 and separated by two spacers 44, 45. Inner spacer 44 and outer spacer 45 are of equal length while their diameters are chosen to allow the inner and the outer races of bearings 43, 46 rotate freely around rear-axle 42. Assembly 42, 43, 44, 45, 46 is inserted into a larger opening of a hub-shell 48. Another bearing 49 along with two cone-shaped spacers 47, 51 are inserted on another side of hub-shell 48. Both ends of rear-axle 42 are threaded. The outer side of hub-shell 48 is also threaded, thus a rear-freewheel 50 can be fastened to hub-shell 48. Two locknuts 52, 53 and two washers 41, 52 fasten rear-axle 42 to two rear fork ends built on both sides of mainframe 1. Washers 41, 52 may be secured with bolt 40. Thus, the fixed parts of the rear-wheel assembly are firmly incased between the two rear fork ends while the mobile parts can rotate freely supported by the aforementioned three internal bearings. A design with three bearings rather than just two was chosen to facilitate the usage of a free-wheel with low number of teeth and consequently a smaller inner diameter. However, a simpler, more conventional design can be used with just two bearings mounted at both ends of hub-shell 48.

Figure 55:
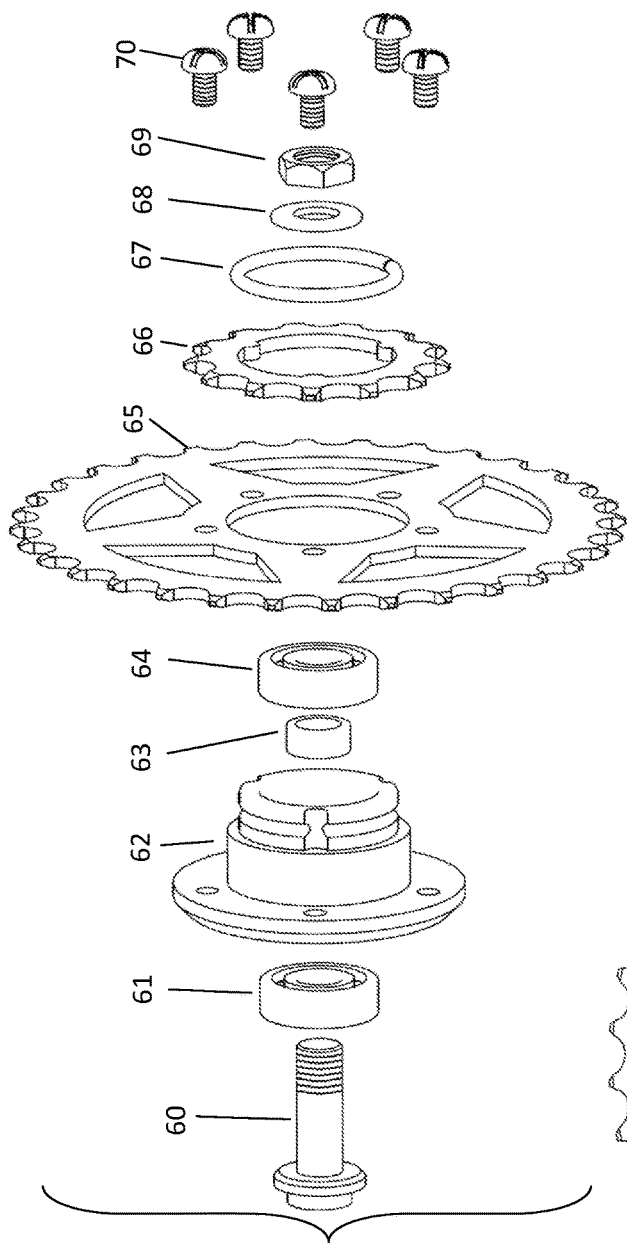
FIG. 55 is an exploded view of a rear-left assembly mounted on the mainframe on the left of the back wheel.
Figure 57:
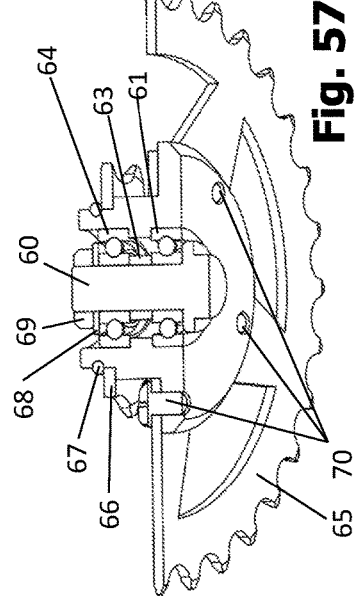
FIG. 57 is a transversal section view of the rear-left assembly in FIG. 55.
Figure 56:
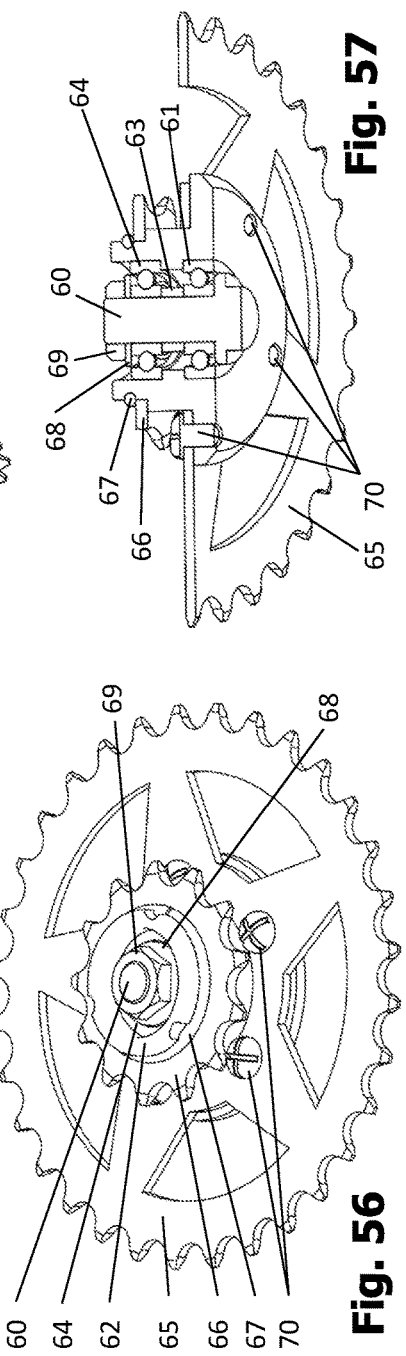
FIG. 56 is a perspective view of the rear-left assembly in FIG. 55 viewed from left.

FIGS. 55, 56, and 57 illustrate the details of a chain-wheel assembly mounted on a rear-left side of mainframe 1 where the un-threaded end of a rear-left-axle 60 is welded to mainframe 1 in a location 81 shown in FIGS. 41 to 47. Two bearings 61, 64, separated by a spacer 63, are inserted on both sides of a chain-wheel support 62. The inner shape of chain-wheel support 62 is designed with a flange as wide as the length of spacer 63. Assembly 61, 62, 63, 64 is mounted on rear-left-axle 60 and fastened with a locknut 69 and a washer 68. A large-chain-wheel 65 is attached to the outer side of chain-wheel support 62 with screws 70. A small-chain-wheel 66 is mounted on chain-wheel support 62 and secured with a retaining ring 67. Male splines on the inner hole of small-chain-wheel 66 match female splines on the outer side of chain-wheel support 62, thus chain-wheels 65, 66 rotate jointly around rear-left-axle 60 while being supported by bearings 61, 64.

FIGS. 58, 59, and 60 show the details of a drive-shaft assembly mounted on an axis going through the centers of two openings 82L and 82R of mainframe 1 shown in FIGS. 41 to 50. A drive-shaft 120 has a threaded segment at one of its ends, next to a hexagonal shaped section. A left chain-wheel support, built on the other end of drive-shaft 120, is designed with splines so that a left-chain-wheel 121 can be mounted and secured with a retaining ring 122. Male splines of left-chain-wheel 121 match female splines on the left chain-wheel support. A bearing 123 and a spacer 124 are mounted on a round section of drive-shaft 120. Spacer 124 is dimensioned to match the inner race of bearing 123. Assembly 120, 121, 122, 123, 124 is inserted into the aforementioned opening 82L of mainframe 1. The right end of drive-shaft 120 is supported by another bearing 125 inserted into the corresponding opening 82R on the right side of mainframe 1. A right chain-wheel support 126, which has its inner whole shaped to match the hexagonal profile of drive-shaft 120, is mounted on driveshaft 120 and fastened with a locknut 130 and a washer 129. A right-chain-wheel 127 is attached to chain-wheel support 126 with screws 128.

FIGS. 61, 62, 63, and 64 show the details of a unidirectional-shaft assembly mounted on an axis going through the centers of two openings 83L and 83R of mainframe 1 shown in FIGS. 41 to 50. A unidirectional-shaft 142 is hexagonal shaped on a segment of its length where two freewheel supports 143, 145 and two freewheels 144, 146 are mounted. The inner holes of the freewheel supports 143, 145 are designed to match the shape of the hexagonal segment of unidirectional-shaft 142. The outer cylindrical faces of freewheel supports 143, 145 are threaded so that they can be screwed into the threaded inner holes of freewheels 144, 146. These four components 143, 144, 145, 146 are mounted on the hexagonal segment of unidirectional-shaft 142. A free-rotating sprocket 152 is designed to be fixed firmly around a bearing 151 with the help of a lock-ring 150. This assembly 150, 151, 152 along with a bearing 148 and two spacers 147, 149 are mounted on the round shaped segment of unidirectional-shaft 142 as shown in FIG. 62. The left side of unidirectional-shaft 142 ends with another hexagonal shaped segment which is inserted in the matching inner hole of a chain-wheel support 153 on which a chain-wheel 154 is mounted with screws 156. The other end of unidirectional-shaft 142 is inserted into the inner hole of another bearing 141. The outer races of bearings 141, 148 are mounted into two openings 83L and 83R shown in FIGS. 41 and 42. The whole assembly is fastened on mainframe 1 with the help of two locknuts 140, 155 screwed into threaded holes at both ends of unidirectional-shaft 142.

Figure 41:
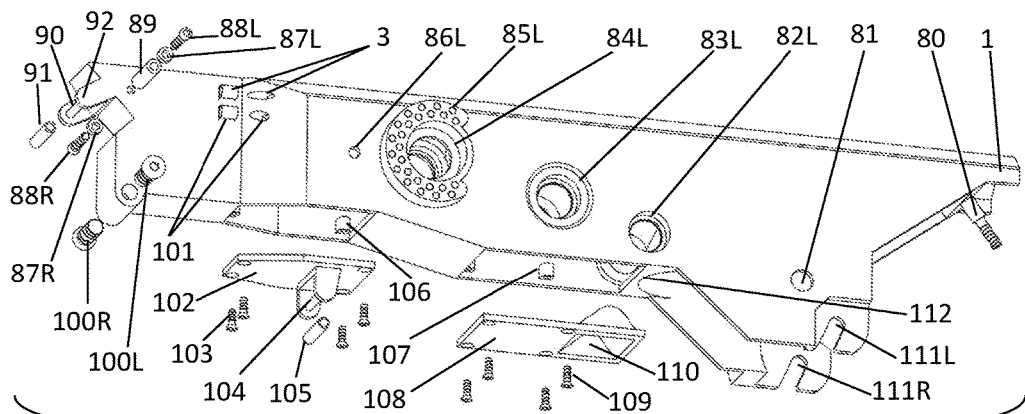
FIG. 41 is an exploded view of the mainframe, its connecting screws, and its two bottom covers.
Figure 65:
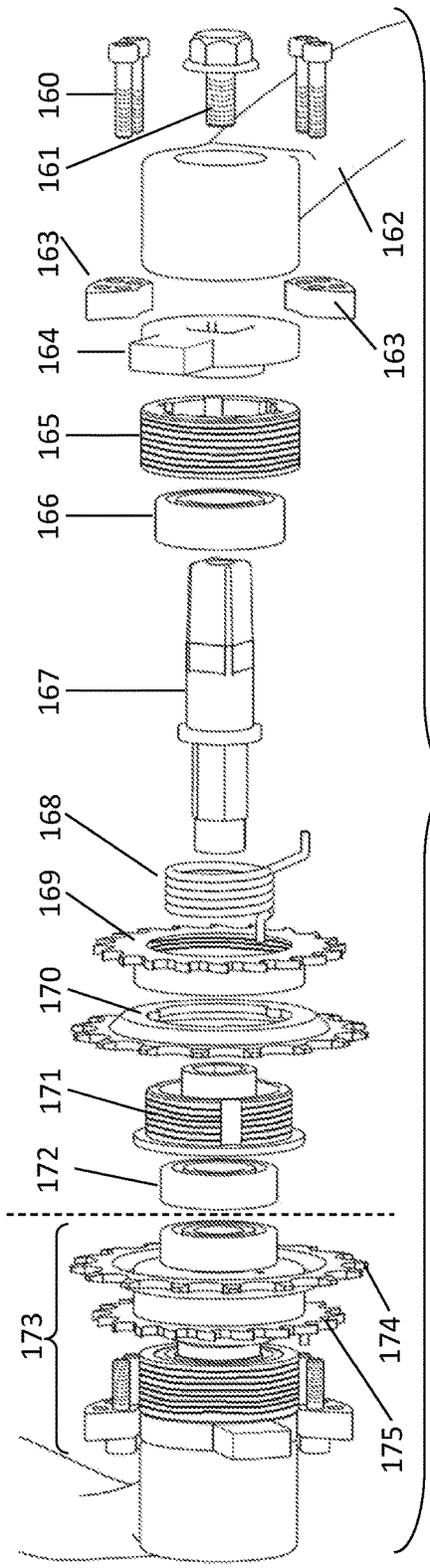
FIG. 65 is a view of the pedal assembly with the left half shown in an exploded view, while the right half is shown in a non-exploded view.
Figure 67:
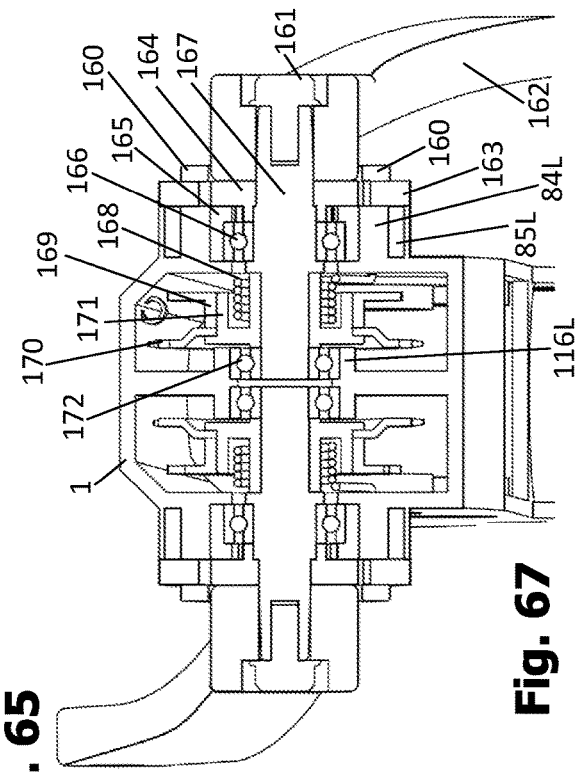
FIG. 67 is a transversal section view of the pedal assembly mounted on the mainframe.
Figure 66:
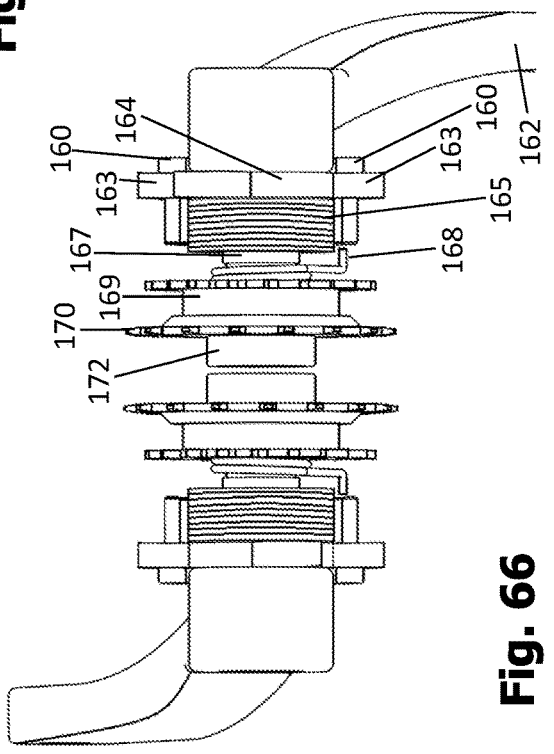
FIG. 66 is a frontal view of the pedal assembly without the frame.
Figure 68:
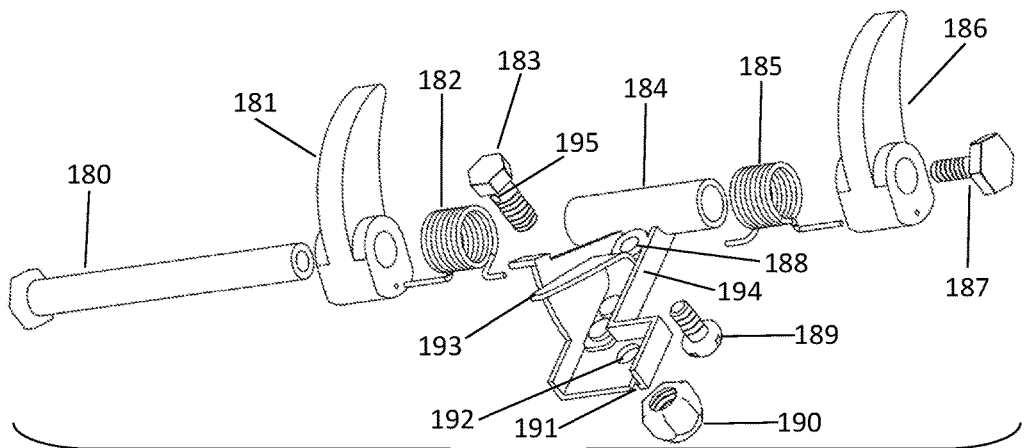
FIG. 68 is an exploded view of a pedal-blocker assembly.
Figure 69:
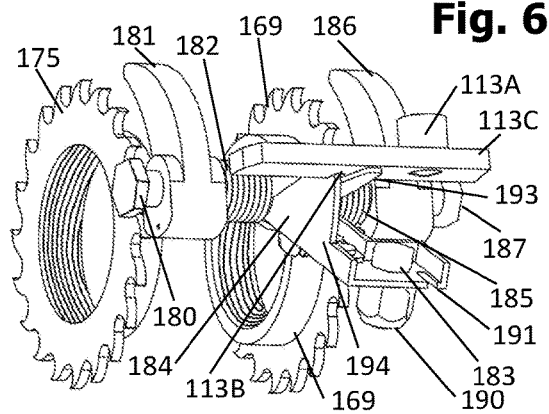
FIG. 69 is a perspective view of the pedal-blocker in FIG. 68 along with a transversal part of the mainframe with which it interacts.
Figure 70:
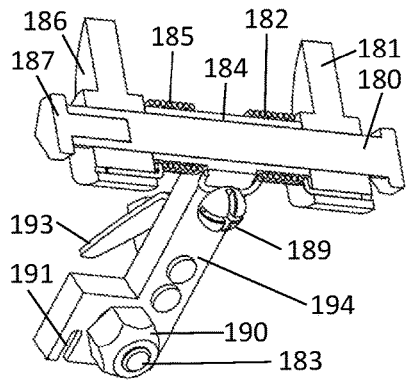
FIG. 70 is a transversal section view of pedal-blocker in FIG. 68.

FIGS. 65, 66, and 67 show the details of two assemblies mounted on an axis going through the centers of four openings 84L, 84R, 116L, and 116R of mainframe 1 shown in FIGS. 41 to 50. A drive-wheel support 171 is designed with a ridge on one of its sides, an outer tube which is threaded and has female splines on the outside, and an inner tube with a hexagonal shaped inner hole. A drive-wheel 170, designed with male splines, is mounted against the ridge of drive-wheel support 171 and fastened with the help of a pedal-blocker 169 which has a threaded inner hole and specially designed teeth. A left torsion-spring 168 is inserted in between two tubes of drive-wheel support 171. Left torsion-spring 168 has one of its ends rigidly connected to a base of drive-wheel support 171. Assembly 168, 169, 170, 171 is mounted on a hexagonal shaped segment of a crank-shaft 167 against a middle rim. A round shaped segment at one of the ends of crank-shaft 167 is inserted in the inner hole of a bearing 172 which has an outer race inserted in middle opening 116L of mainframe 1. The other end of left torsion-spring end 168 is rigidly connected to mainframe 1 in a location 115L shown in FIG. 44. Mainframe 1 includes a torsion-spring connection point 115R for the insertion of the other torsion-spring end. Another bearing 166 is mounted inside a hub support 165. A round-shaped middle segment of crank-shaft 167 is inserted in the inner hole of bearing 166. Hub support 165, which is threaded on its outer surface, is screwed into the inner hole of mainframe opening 84L which is also threaded. Thus, crank-shaft 167 along with all components it holds is tightly mounted on mainframe 1, supported by the inner races of bearings 166, 172. A retaining lever 164 is mounted next to bearing 166 on crank-shaft 167. One segment of its inner hole has a round profile so that it can be pressed against the inner race of bearing 166 while the other segment of its inner hole is squared and matches the squared profile of the segment on crank-shaft 167 where it is mounted. Crank-shaft 167 ends on the left with a segment where a crank-arm 162 is mounted. This segment can be squared, as it is shown here, but also hexagonal, or with splines that match an inner hole of crank-arm 162. The inner hole of crank-arm 162 has a segment that is round and threaded, so that a crank arm puller can be used to pull out the crank arm. A locknut 161 is screwed into the inner hole of crank-shaft 167 to fasten crank-arm 162 and retaining lever 164 on crank-shaft 167. Two pedal stoppers 163 are mounted around the retaining lever 164 to limit range of the angle the pedal can travel. Pedal stoppers 163 are fastened with screws 160 inserted into holes 85L disposed around the frame opening 84L as shown in FIG. 41. Holes 85L as well as the holes on the pedal stopper 163 are designed to allow pedal stoppers 163 to be fastened at locations separated by ten degrees. There are holes 85R opposite holes 85L. A mirrored assembly 173 on the right side of mainframe 1, which is shown assembled in FIG. 65, has the same type of components as the ones described for the left side, adapted to perform the same functions. Thus the retaining lever on the right has an inverse tread and its teeth are oriented in the opposite direction then the ones of left pedal-blocker 169.

An alternative embodiment of the assembly shown in FIGS. 61, 62, 63, 64 and FIGS. 65, 66, 67 would be to replace drive-wheels 170, 174 with freewheels of equivalent size and replace freewheels 144, 146 with drive-wheels of equivalent size. The main advantage of such an arrangement is a uniform wear of endless chains 420, 421 at the expense of an increased size of frame 1 in the pedal area.

FIGS. 68, 69, 70, and 71 show the details of an assembly mounted on an axis going through the centers of two openings 86L and 86R of mainframe 1 shown in FIGS. 41 to 50. A blocker-axle 180 is inserted in openings 86R, 86L, across the mainframe 1 and fastened with a screw 187. Mainframe 1 also includes opening 81. A pair of blocker-teeth 181, 186 are designed with holes so that they can be mounted on blocker-axle 180 right against the walls of mainframe 1. The tips of blocker-teeth 181, 186 match the cavities of the pedal-blockers 169, 175. Blocker-teeth 181, 186 have each a smaller hole in their base where the ends of two tooth torsion-springs 182, 185 are inserted. Tooth torsion-springs 182, 185 are mounted on a blocker-spacer 184 which is also used to keep blocker-teeth 181, 186 apart while letting them move around blocker-axle 180. The other ends of tooth torsion-springs 182, 185 are fastened to an extension 194 of blocker-spacer 184 with a screw 189 inserted into a threaded hole 188. Extension 194 is designed to be able to slide up and down through a squared opening 113B made in a transversal rail 113C of mainframe 1 as detailed in FIG. 47, thus keeping blocker-spacer 184 centered on blocker-axle 180 between the two blocker-teeth 181, 186. An elastic component 193 has one arm rigidly connected to extension 194 and another arm pushes against the bottom of transversal rail 113C. A cable screw 183 and a nut 190 are fastened to cylinder extension 194 on both sides of a hole 192. A cable, which is not shown, runs through cable guides 113A, 101 to short lever 26 of brake assembly 27 shown in FIGS. 5 and 41. The core of the cable runs through an opening 191 in extension 194 and from there through a transversal hole 195 of cable screw 183.

Figure 4:
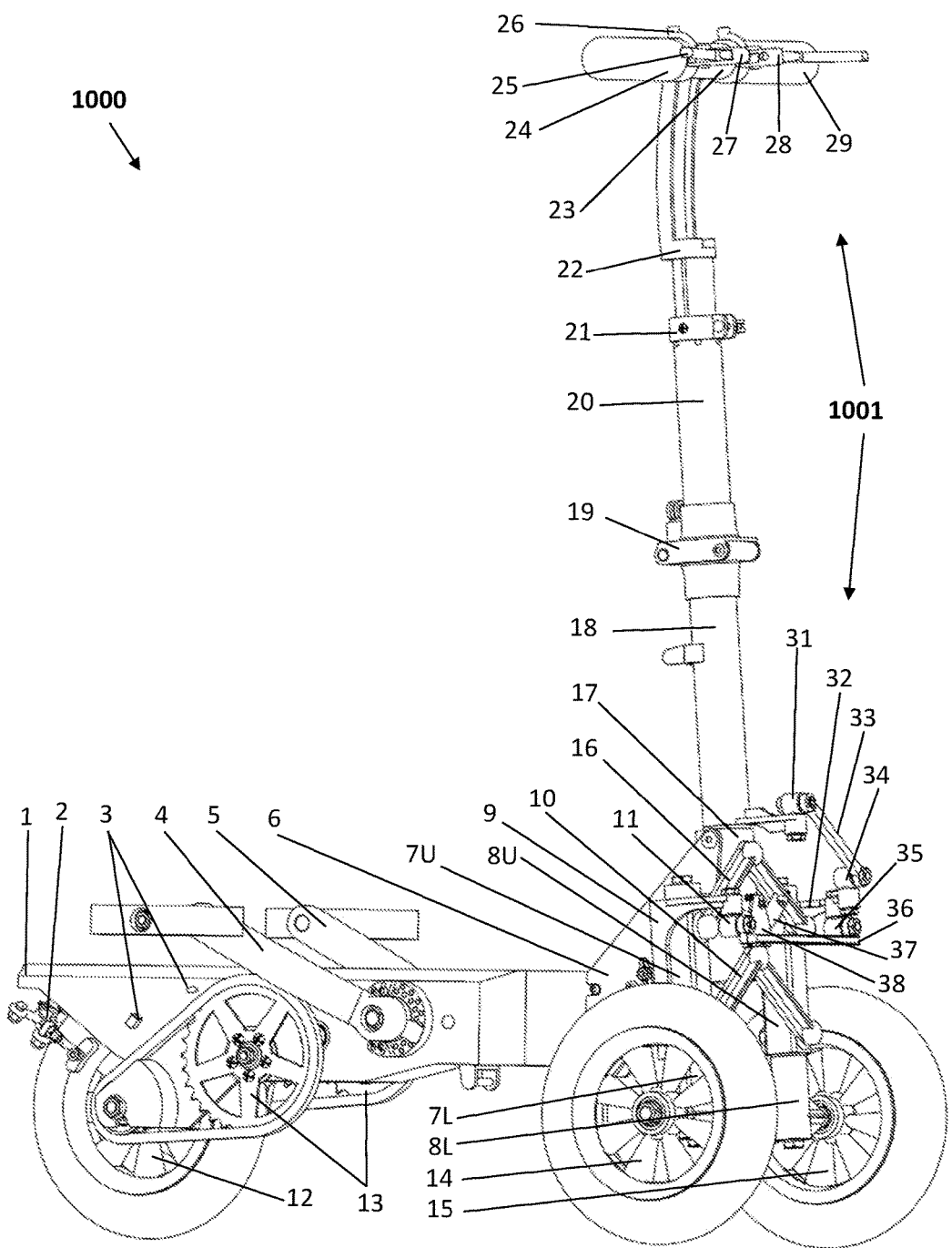
FIG. 4 is a perspective view of the scooter in FIG. 2 as seen from right.
Figure 5:
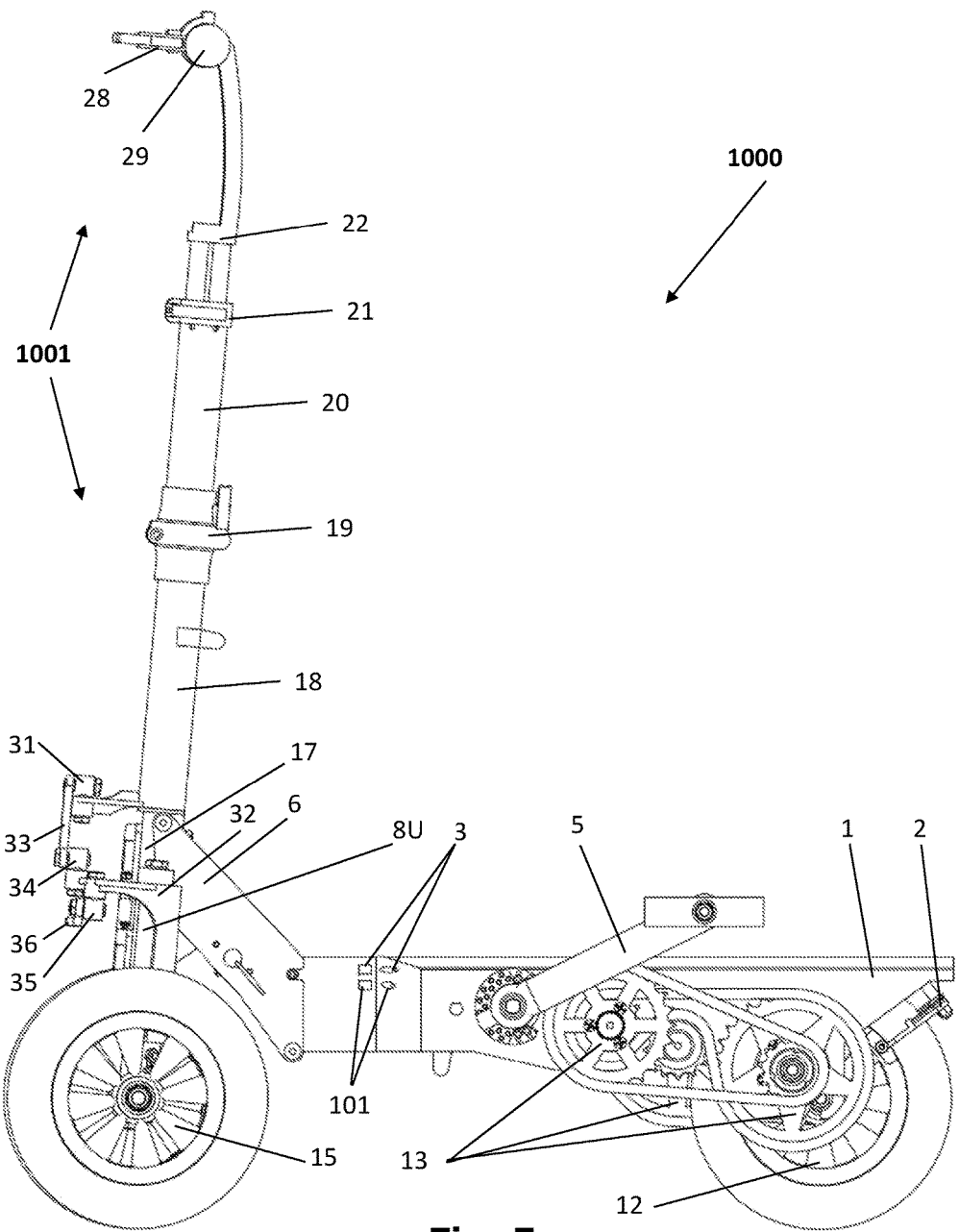
FIG. 5 is a lateral view of the scooter in FIG. 2 as seen from left.
Figure 6:
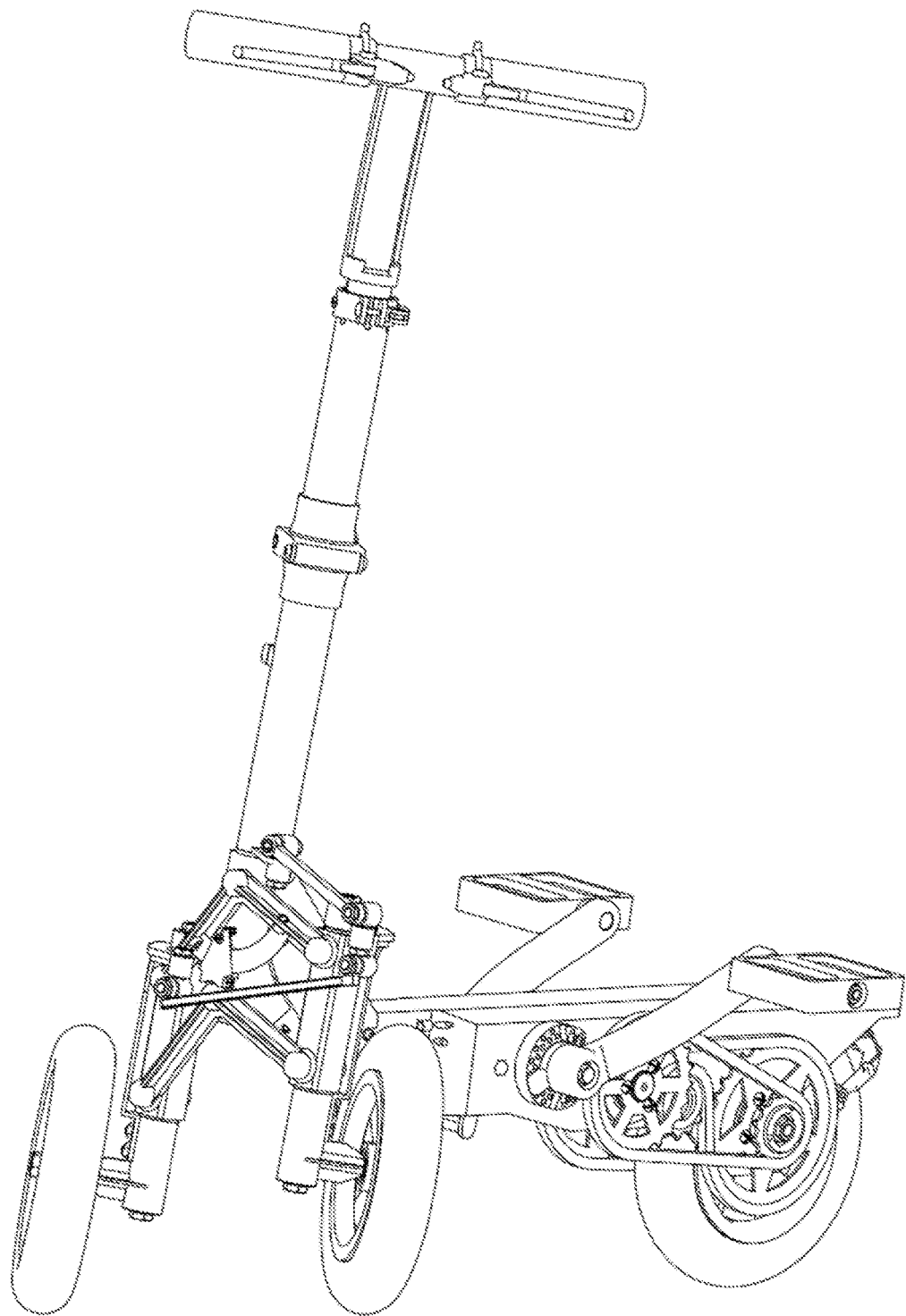
FIG. 6 is a perspective view of the three-wheel scooter turning left.
Figure 7:
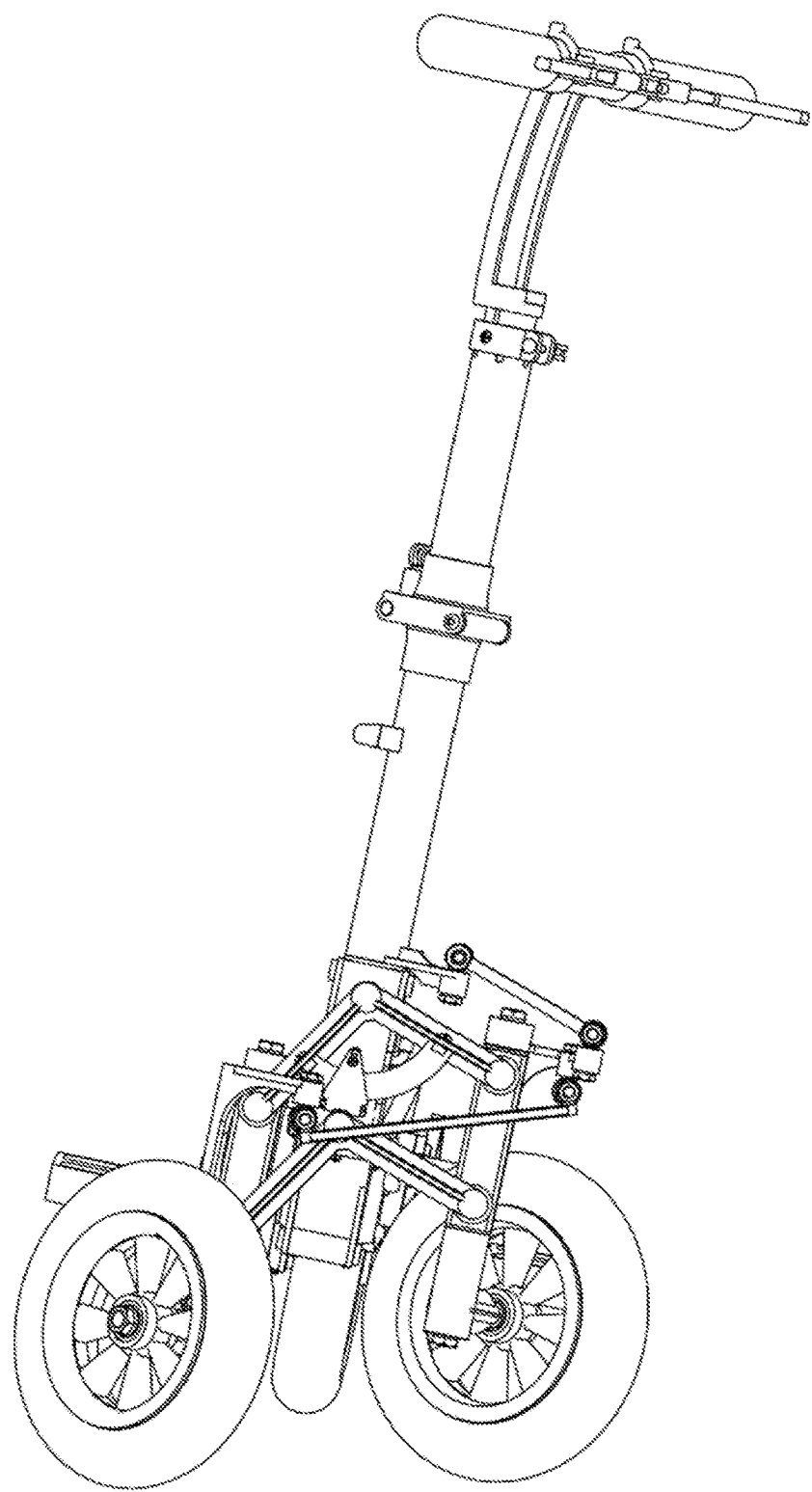
FIG. 7 is a frontal view of the scooter in FIG. 6.
Figure 8:
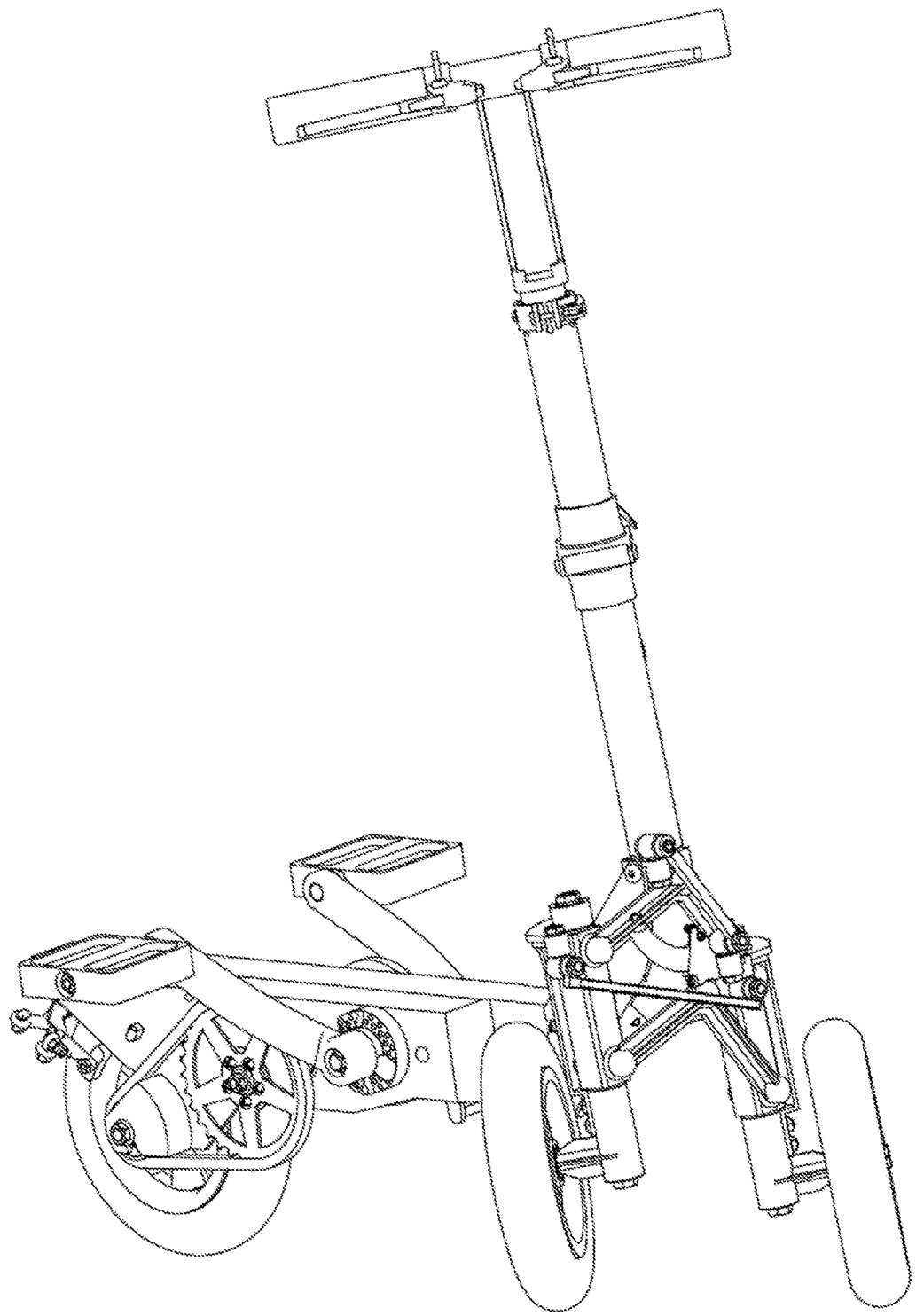
FIG. 8 is a perspective view of the three-wheel scooter turning right.
Figure 9:
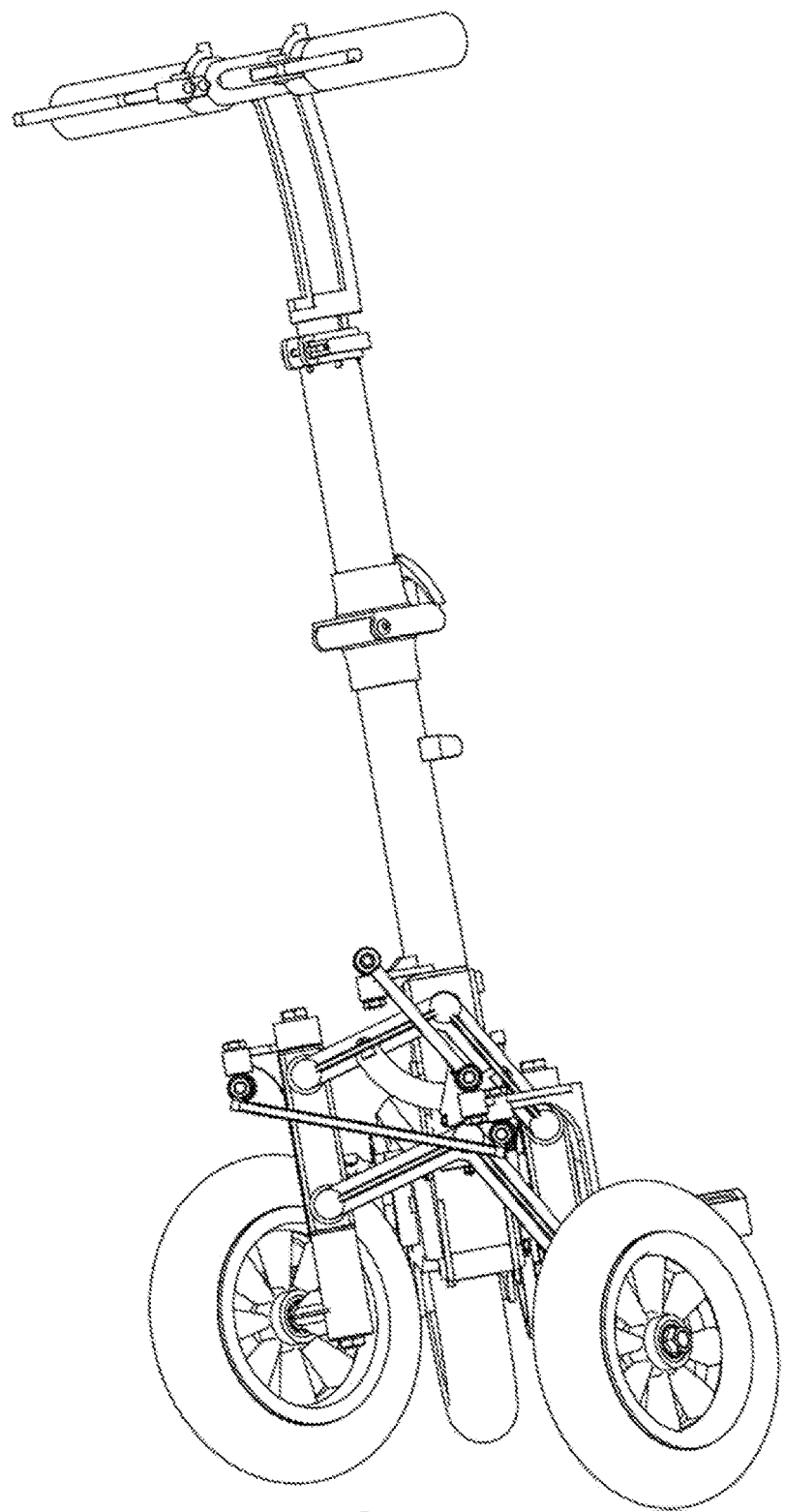
FIG. 9 is a frontal view of the scooter in FIG. 8.
Figure 42:
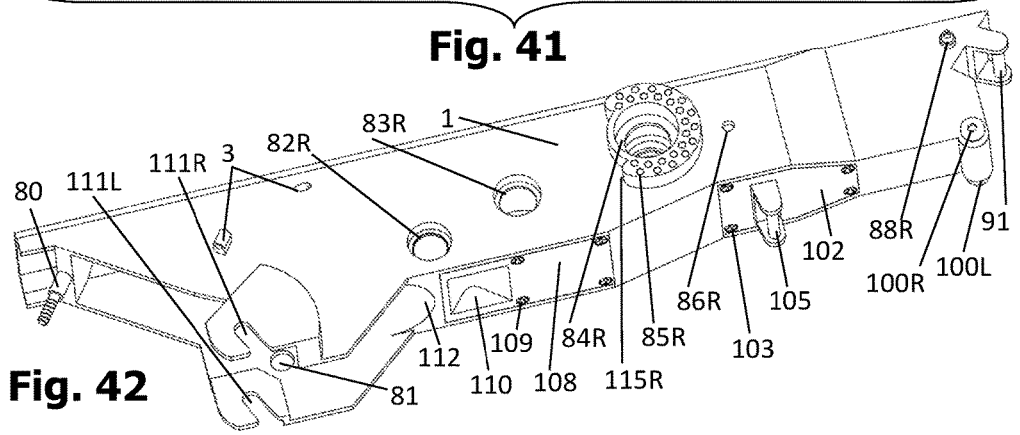
FIG. 42 is a perspective view of the mainframe, its connecting screws, and its two bottom covers, as seen from right.
Figure 43:
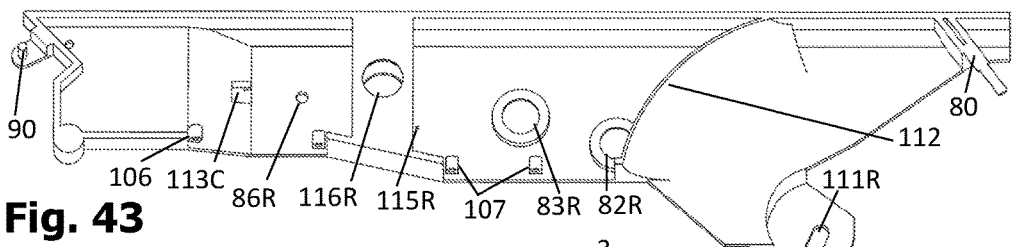
FIG. 43 is a longitudinal section view of the mainframe, as seen from left.
Figure 44:
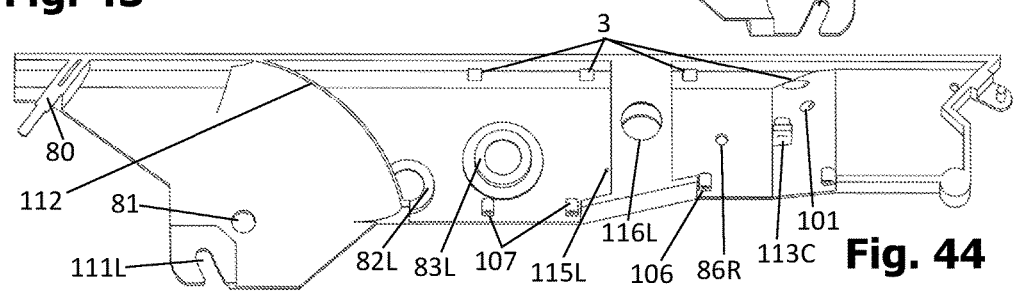
FIG. 44 is a longitudinal section view of the mainframe, as seen from right.
Figure 45:
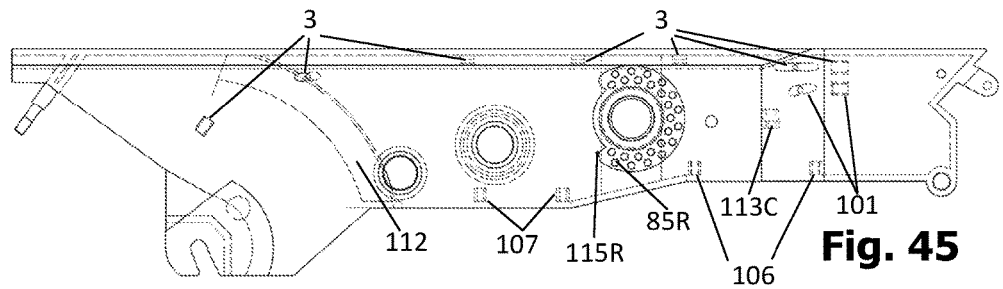
FIG. 45 is a lateral view of the mainframe, with hidden lines, as seen from right.
Figure 46:
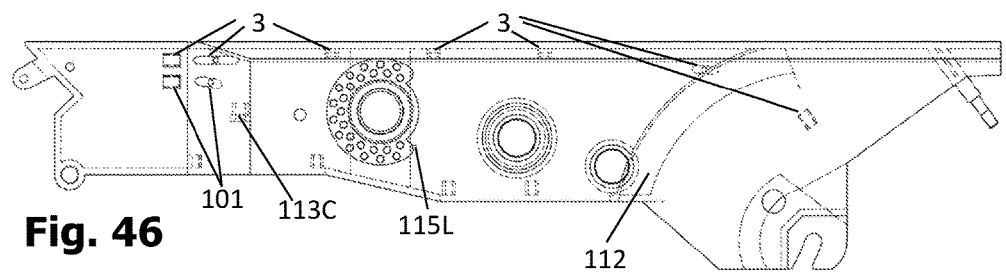
FIG. 46 is a lateral view of the mainframe, with hidden lines, as seen from left.
Figure 47:
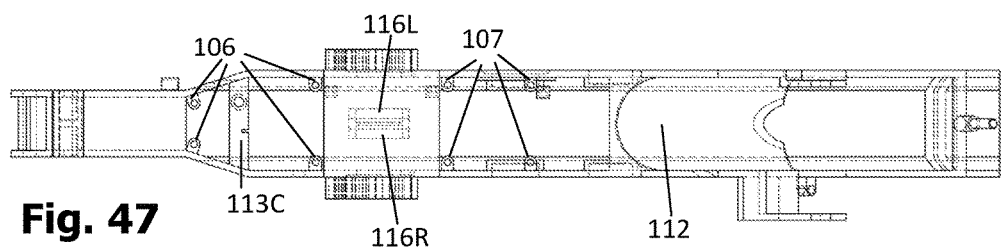
FIG. 47 is a view of the mainframe, with hidden lines, as seen from below.
Figure 48:
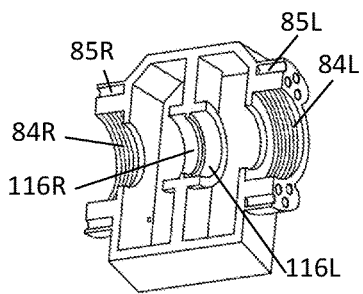
FIG. 48 is a transversal section of the mainframe, along the axis of a pedal assembly.
Figure 49:
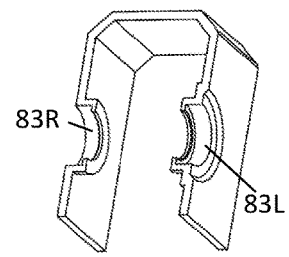
FIG. 49 is a transversal section of the mainframe along the axis of a unidirectional assembly.
Figure 50:
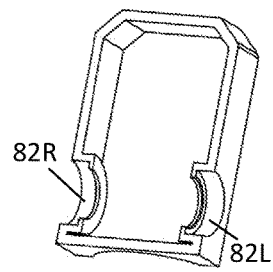
FIG. 50 is a transversal section of the mainframe along the axis of a drive assembly.
Figure 86:
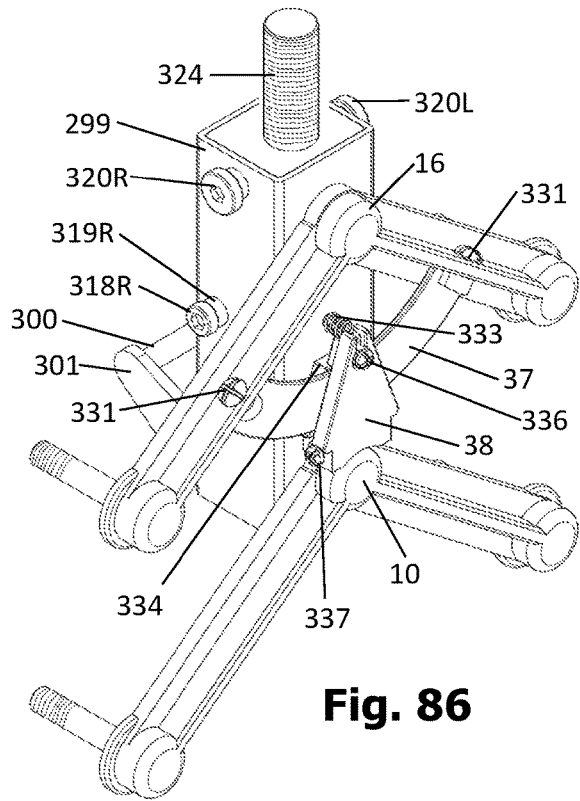
FIG. 86 is a perspective view of a balance assembly seen from front.
Figure 88:
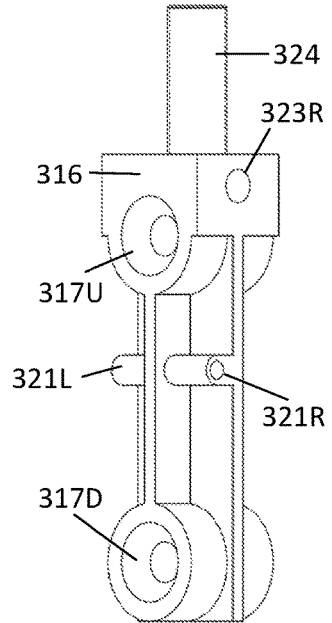
FIG. 88 is a perspective view of an internal front-frame core part included in FIG. 86.
Figure 87:
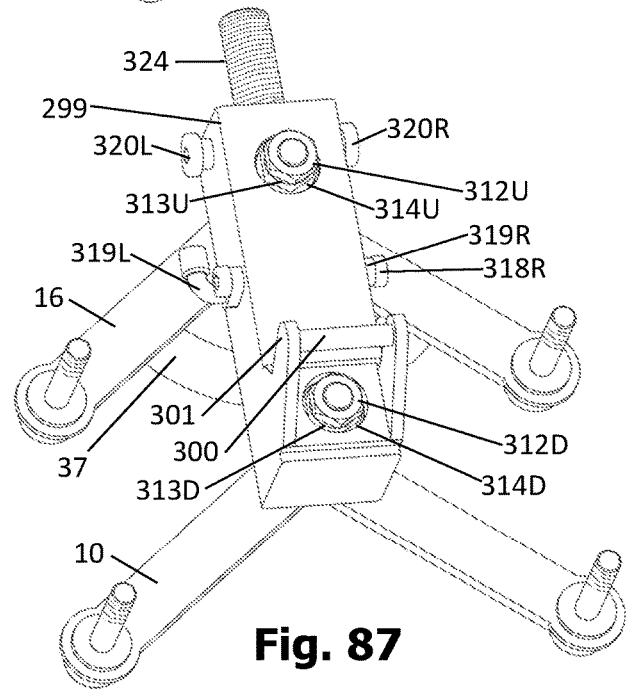
FIG. 87 is a perspective view of the balance assembly in FIG. 86, as seen from the back.
Figure 89:
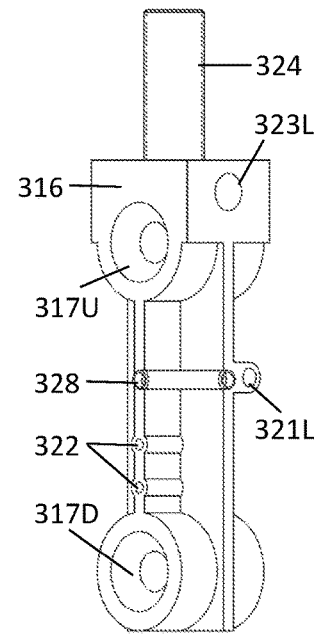
FIG. 89 is another perspective view of the internal front-frame core part shown in FIG. 88.
Figure 90:
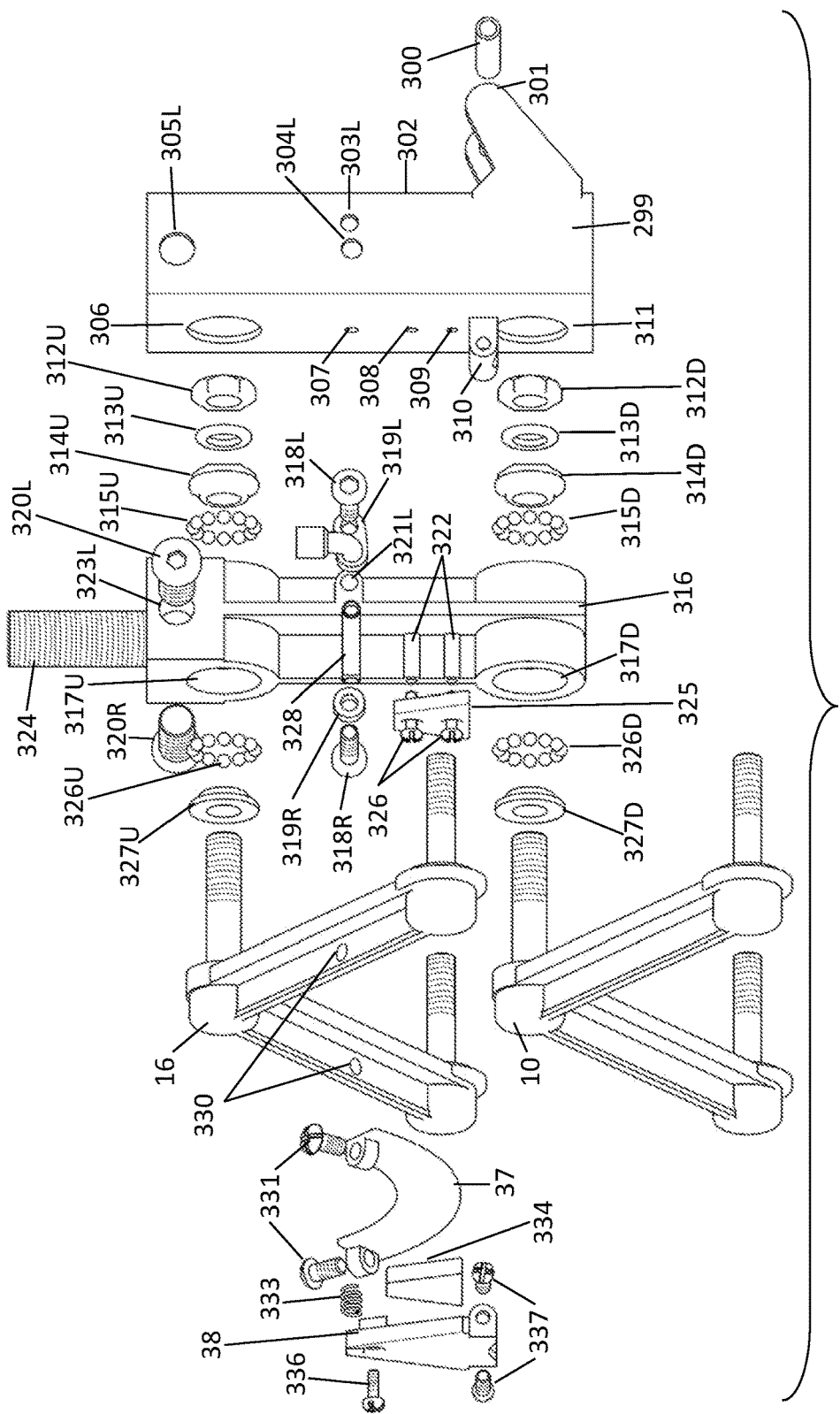
FIG. 90 is an exploded view of the balance assembly shown in FIG. 86.
Figure 97:
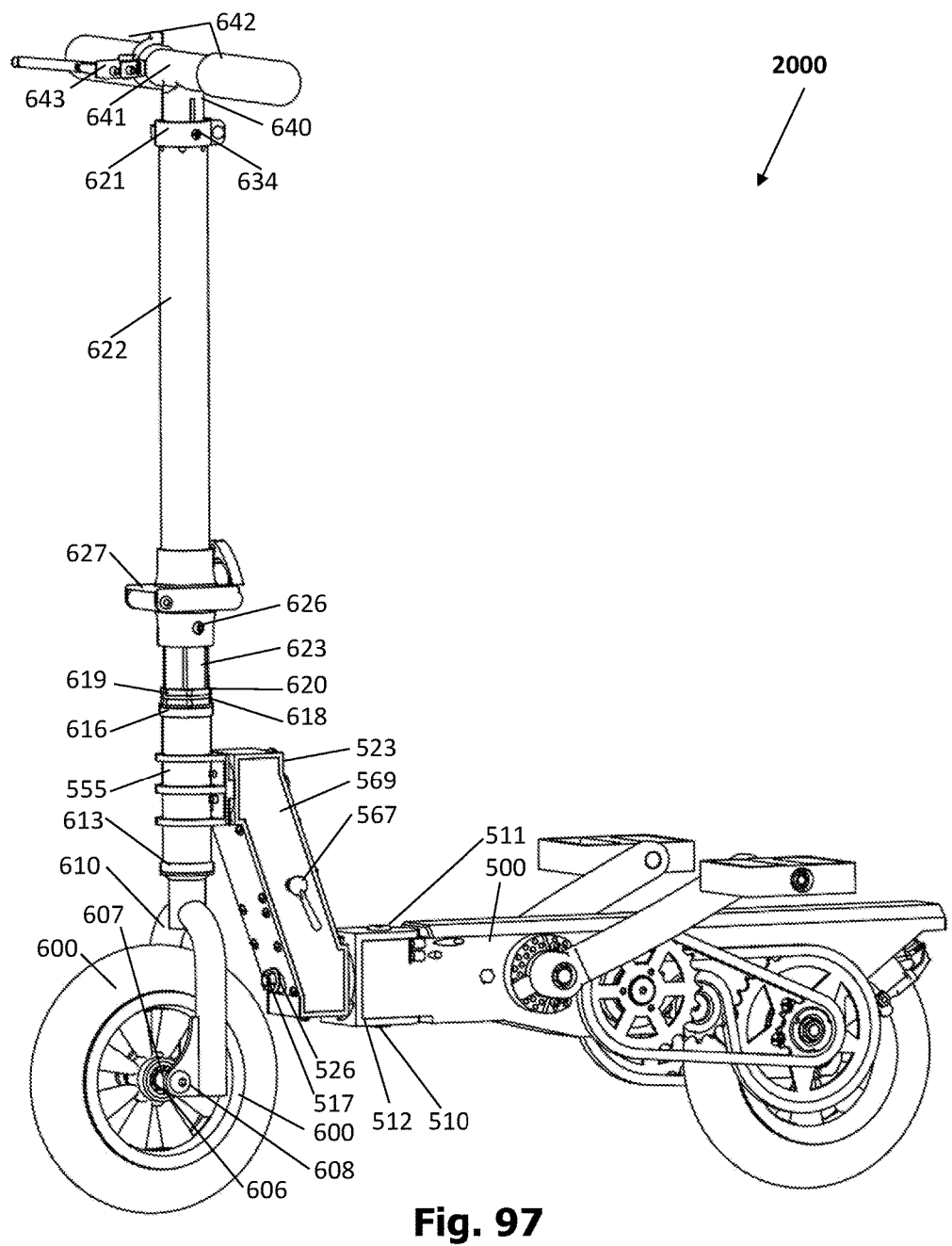
Figure 98:
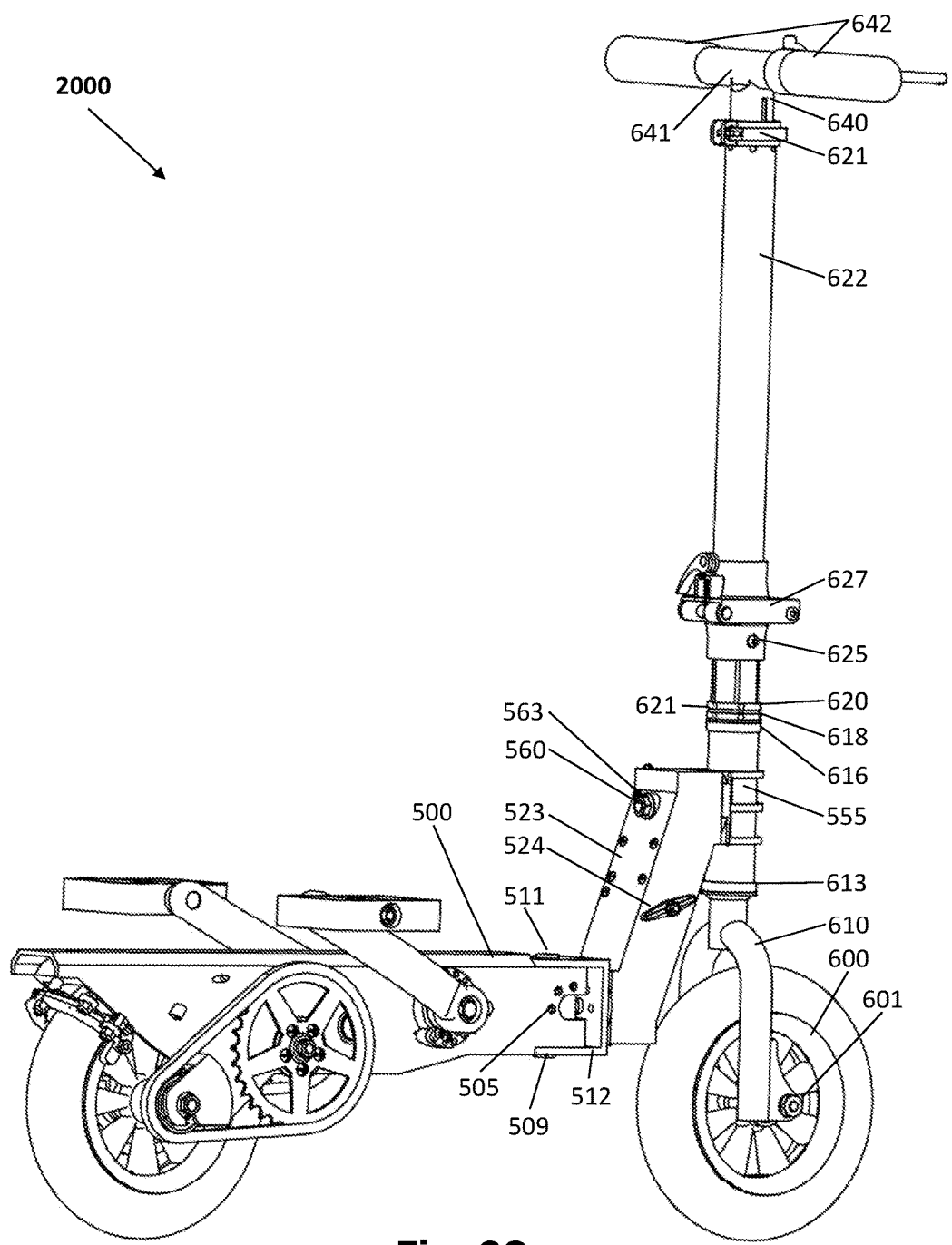

FIGS. 30 to 35 show the details of the previously mentioned joint assembly 6 and the means by which it connects to mainframe 1 and steering and balance mechanism 1001, as also shown in FIGS. 4 and 5. FIGS. 41 and 42 show two mainframe screws 100L, 100R connecting one end 216 of joint-frame 6F to mainframe 1, while FIGS. 86, 87, and 90 show two other screws 320L, 320R connecting another end 220 of joint-frame 6F to steering and balance mechanism 1001. These connections are hinge like and allow joint-frame 6F pivot around screws 100L, 100R, 320L, and 320R. A joint-frame shaft 200, with a lever 199 at one of its ends, is mounted transversally through the middle of joint-frame 6. Joint-frame shaft 200 has a segment of circular shape right by lever 199 where a spring 201 is mounted on the outside of joint-frame 6F. Joint-frame shaft 200 has a middle segment of hexagonal shape where a cogwheel 205 flanked by two spacers 204, 211 are mounted on an inside of joint-frame 6F. An inner hole of cogwheel 205 matches the hexagonal shape of the middle segment of joint-frame shaft 200. Joint-frame shaft 200 has three more round shaped segments of decreasing diameters next to the hexagonal one. A latch-bolt stopper 212 is mounted on the middle segment on the outside of joint-frame 6F. Stopper 212 has two legs inserted in two corresponding holes made in joint-frame 6F. The last segment on joint-frame shaft 200 has the smallest diameter and it is threaded. A washer 213 and a locknut 214 fasten the joint-frame shaft 200 and the components mounted on it to joint-frame 6F. As the threaded segment of joint-frame shaft 200 is smaller in diameter than the segment next to it, the axle can rotate, be pushed, and pulled to a certain extent while latch-bolt stopper 212 stays in the same position. Two latch-bolts 206, 207 are mounted on the inside of joint-frame 6F. They are shaped to be as wide as the inside of joint-frame 6F. Their vertical movement is limited by two rollers 202, 203 mounted on two screws 209, 210, as well as cogwheel 205. Latch-bolts 206, 207 have each a segment with cogs where the cogwheel 205 can roll, thus moving latch-bolts 206, 207 back and forth. This movement is limited by two screws 208, 215 mounted on the outside of joint-frame 6F with their tips fitting in gaps 208G, 215G designed on each of latch-bolts 206, 207. The two legs of latch-bolt stopper 212 prevent latch-bolts 206, 207 from moving when joint-frame shaft 200 is not pushed. FIG. 32 is a plane section showing latch-bolts 207, 206 locked behind a first latch-strike tip 92 of mainframe 1 and a third latch-strike-tip 301 of steering and balance mechanism 1001. Two rollers 300, 91, mounted on axles of tips 301, 92, facilitate the back and forth movements of two latch-bolts 206, 207. Two pairs of openings 217, 219 of joint-frame 6F latch into bolts 87L, 88L, 87R, 88R on mainframe 1 as shown in FIG. 41 and bolts 318L, 319L, 318R, 319R on steering and balance mechanism 1001 as shown in FIG. 90. Bolts 88L, 87L are inserted into roller 89. Mainframe 1 further includes latch openings 111R, 111L.

FIGS. 86 to 93 show the details of an assembly mounted at the bottom of steering and balance mechanism 1001. A frame-core 316 is inserted into a front-frame 299 and fastened with four screws 320L, 320R, 318L, 318R tied into four corresponding threaded holes 321L, 323L, 321R, 323R. Screws 320L, 320R, 318L, 318R are also used to connect the previously described joint assembly 6 to steering and balance mechanism 1001. Front-frame 299 may include holes 306 and 311. Lower screws 318L, 318R also hold two spacers 319L, 319R. Left spacer 319L has a part used as a cable guide. This part is aligned with an internal cable guide 328 mounted horizontally in the middle of frame-core 316. FIG. 92 shows a section through the cable guides. The end of a cable (not shown here) is fastened to the tip of clamp mechanism 38 with a screw 336, then it is run through the middle of a spring 333, a hole in the tube frame 307, and cable guides 328, 319L to the long lever of break assembly 28. Clamp mechanism 38 also includes a bottom pad 325 fastened to frame-core 316 with two screws 326, an upper pad 334 which is rigidly held by clamp 38, and the previously mentioned arc-shaped component 37 which is connected to v-shaped upper linkage 16 with two screws 331 tied into two threaded holes 330. Screws 326 may be inserted at 322. Clamp mechanism 38 is connected to a tip 310 of front-frame 299 with two screws 337 in such a way that it can pivot on a limited angle range. Two cones 327U, 327D are rigidly mounted at the base of the middle axles of v-shaped linkages 10, 16. Two sets of ball bearings 326U, 326D, 315U, 315D are mounted on each side of frame-core 316 in corresponding bearing cups 317U, 317D. V-shaped linkages 10, 16 along with cones 327U, 327D are mounted on a front of front-frame 299 and frame-core 316 and fastened with two adjustable cones 314U, 314D, two washers 313U, 313D, and two locknuts 312U, 312D on the back side. A roller 300 is mounted on an axle of a tip 301 of front-frame 299 along side 302. Front-frame 299 may further include holes 303L, 304L, 305L, 308, and 309.

FIGS. 79 to 85 show the details of an upper part of steering and balance mechanism 1001. A cylindrical post 342 is screwed on a stem 324 of aforementioned frame-core 316. A cone 340 is rigidly fixed to a bottom end of tube 342. The earlier described lower-steering-shaft 18 has two bearing cups 351, 355 rigidly attached to its ends. Assembly 18, 351, 355 is pivotally mounted around cylindrical post 342 between two sets of bearing balls 341, 343 and is fastened with the help of an adjustable cone 344, a washer 345, and a locknut 346. As previously described, the lower part of folding hinge assembly 19 is rigidly attached to lower-steering-shaft 18 while its upper part is attached to upper steering-shaft 20. Handlebar-stem 22, which is perpendicularly attached to the middle of steering-handlebar 23, has its other end inserted into upper steering-shaft 20 and can be locked in a desired position with the help of the stem locking system 21. Further description of folding hinge assembly 19 and stem locking system 21 is omitted as they are of a type ordinarily used for bicycles. Upper steering-shaft 20 and handlebar-stem 22 have matching splines as shown in FIG. 81. Stem locking system 21 is fixed to upper steering-shaft 20 with a screw 348 inserted in a threaded hole 349. Steering shaft 20 may also include slots 350. Lower-steering-shaft 18 has a frontal steering-tip 354 and a fourth latch-strike-tip 352 on its upper half. A roller 353 is mounted on an axle of fourth latch-strike-tip 352.

FIGS. 72 to 77 present the details of the right steering column and wheel assembly 7U, 7L, 14, 9, 11, 16, and 10 as previously described in FIG. 4. An upper part 368 is designed to have a longitudinal hole with bearing cups on each side and a vertical axle stemming from its top plane. A lower part 369 has a longitudinal hole with bearing cups on each side and an axle stemming from its bottom. A cone is permanently affixed on the axle at the bottom of part 369. Parts 368, 369 are rigidly mounted at both ends of a leg 7U. Assembly 7U, 368, 369 can also be designed to be made in one piece by eliminating leg 7U and connecting parts 368, 369. A right front-wheel support 7L, which has two bearing cups 375, 376 rigidly attached to its ends, is pivotally mounted between two sets of bearing balls 374, 377 on the axle of lower part 369 with the help of an adjustable cone 378 and a locknut 379. Left front-wheel support 7L has a horizontal axle on which wheel 14 is mounted, supported by two bearings 380, 382 separated by a spacer 381, and fastened with a washer 383 and a locknut 384. V-shaped linkages 10, 16, which have cones 372, 373 rigidly installed to the bases of their lateral axles, are pivotally fastened into the holes of previously described assembly 7U, 368, 369 supported by bearing ball sets 370, 371, 366, 367, adjustable cones 364, 365, and fastened with washers 362, 363, and locknuts 360, 361. Two bearings 399, 401 are mounted on each side of a bearing support 400 of aforementioned right steering-arm 9. Assembly 9, 399, 401 is pivotally fastened on the axle of upper part 368 with a washer 402 and a locknut 403. An opening 386 at the base of steering-arm 9 is designed to allow it to be fastened to the screws on right front-wheel support 7L with nuts 385. Another bearing support 394 on a frontal tip of steering-arm 9 holds two bearings 393, 396 separated by a spacer 395. A washer 397 and nut 398 may be positioned against bearing 396. The axle of previously mentioned rod-end assembly 11 is pivotally mounted on the axis of bearing support 394 and fastened with a washer 402 and a nut 403. Rod-end assembly 11 holds two bearings 388, 392 separated by a spacer 389 and mounted on an axle 391. Axle 391 is screwed into a right end of a steering-spacer 36 and secured with a nut 387. As it can be seen in FIG. 4, steering column and wheel assembly on the left 8U, 8L, 15, 32, 34, 35, 16, 10 is functionally identical to the one on the right. However, as shown in FIG. 75, left steering-arm 32 has an extra rod-end assembly 34 held by another bearing support 404, so that steering-arm 32 can be linked to tip of lower-steering-shaft 18. All bearing structures 31, 34, 35, 11 are functionally identical. Steering-arm 32 may also include bearing support 405.

Figure 38:
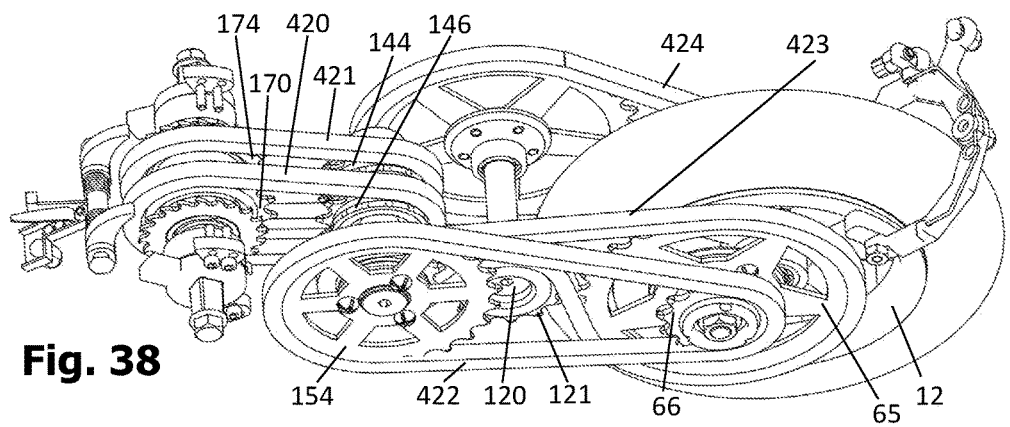
FIG. 38 is a perspective view of the gear-train and back-wheel assembly without the mainframe, as seen from left.
Figure 39:
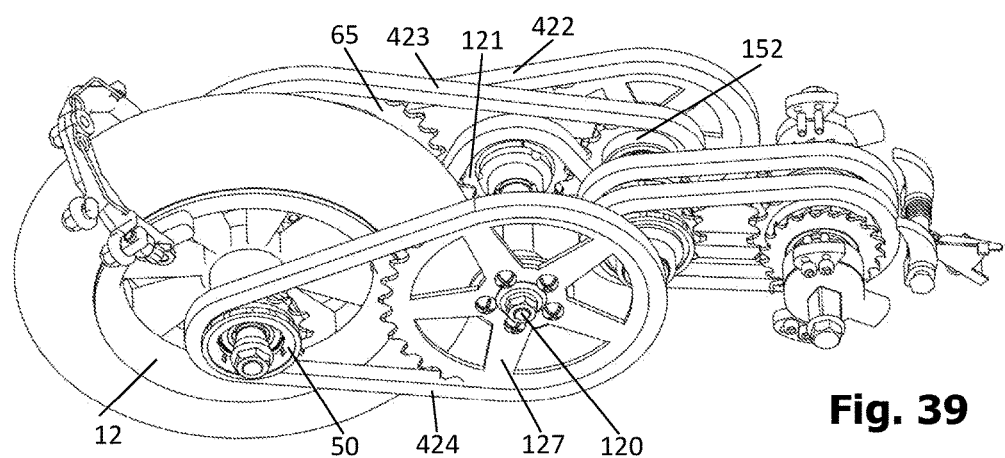
FIG. 39 is a perspective view of the gear-train and back-wheel assembly without the mainframe, as seen from right.
Figure 40:
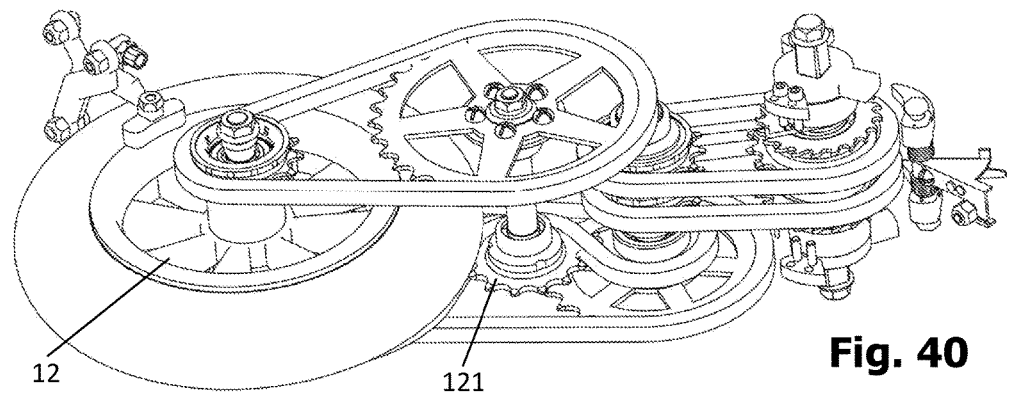
FIG. 40 is a perspective view of the gear-train and back-wheel assembly without the mainframe, as seen from bellow.

FIGS. 38, 39, and 40 show the details of the drive gear assembly 13 as previously shown in FIG. 4. Mainframe 1 is removed for a better visualization of the interconnecting parts. Two endless chains 420, 421 connect drive-wheels 170, 174 mounted on the crank-shafts with free-wheels 144, 146. Another endless chain 422 is mounted around chainwheel 154 and small-chain-wheel 66. A longer endless chain 423 is mounted around left-chain-wheel 65, over left-chain-wheel 121, and around free-rotating sprocket 152 in such a way that left-chain-wheel 121 rotates in the opposite direction than chain-wheel 65 and free-rotating sprocket 152. Yet, another endless chain 424 is mounted on the right side of the gear assembly 13 around right-chain-wheel 127 and rear-free-wheel 50.

Two-Wheel Scooter:

FIGS. 94 to 98 illustrate the embodiment of a foldable two-wheel scooter 2000 having one driven rear-wheel and one steerable front wheel 600. As the two-wheel scooter 2000 have a drive gear assembly, a break assembly, and a mainframe 500 identical to the ones previously shown for the three-wheel scooter 1000, further description of these components is omitted and only new parts and features are presented.

FIGS. 106 to 110, show the specific features of aforementioned mainframe 500 as well as the design of a mainframe hinge 512 which is pivotally mounted on a frontal tip of mainframe 500 on an axle 511 that goes through two hinge holes 510 and a vertical tube 506 built in mainframe 500. Axle 511 is fastened with a locknut 509. A horizontal hinge-axle 517 is rigidly affixed to a frontal face of mainframe hinge 512. The bottom of hinge-axle 517 goes beyond a back face of mainframe hinge 512 so it can be welded and provide a strong connection. The tip of the mainframe 500 is designed with a ditch 507 to allow the bottom of axle 517 rotate while providing even more support for mainframe hinge 512. Four holes 508 on a frontal face and three other holes 505 on a right lateral face of mainframe 500 match six corresponding holes 516 on mainframe hinge 512. A rim 515, which has two keys 513, 514, is designed around axle 517. Two bottom covers 501, 503 are fastened to mainframe 500 with two sets of screws 502, 504.

Figures 113, 114, 115:
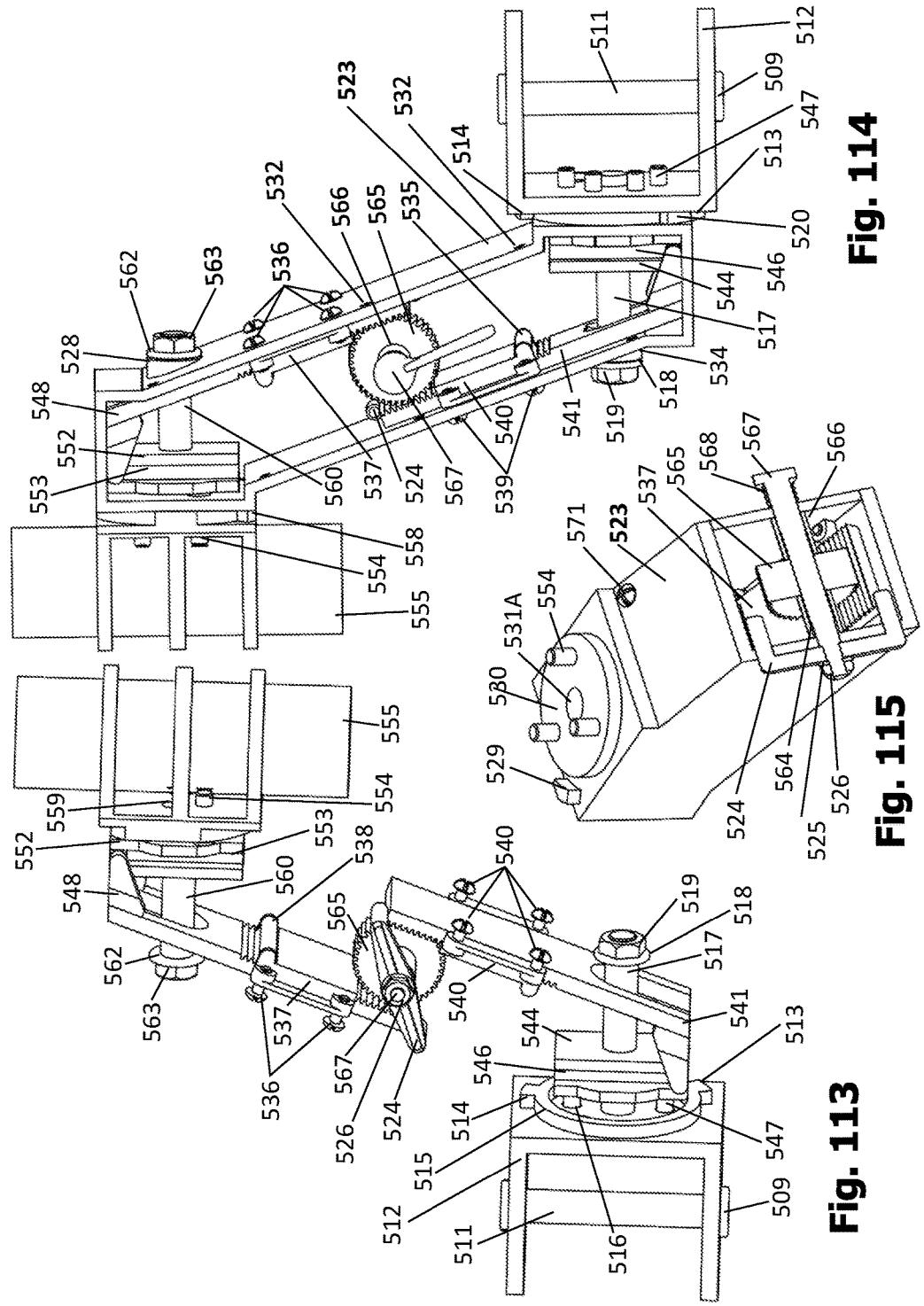
Figure 116:
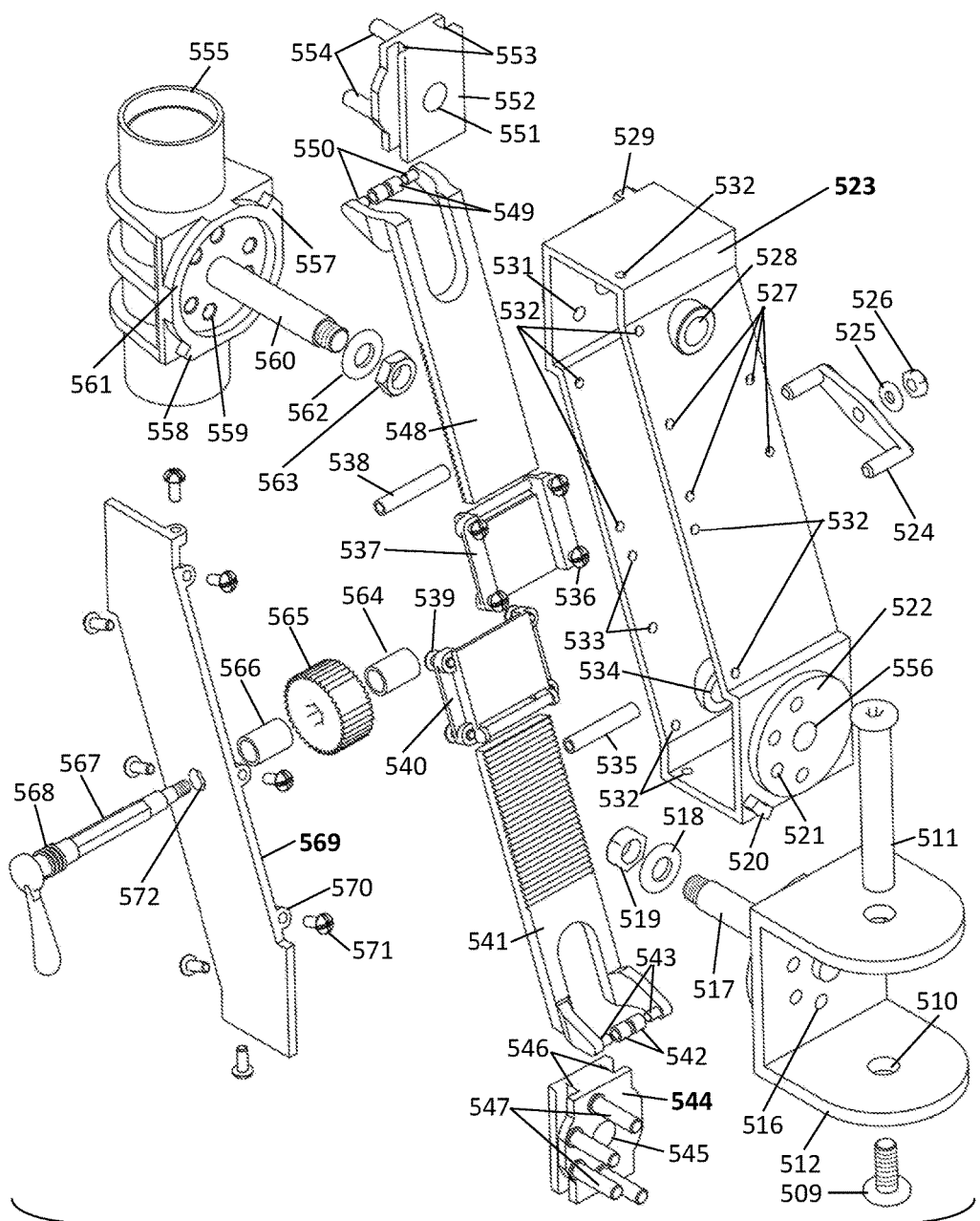
Figure 117:
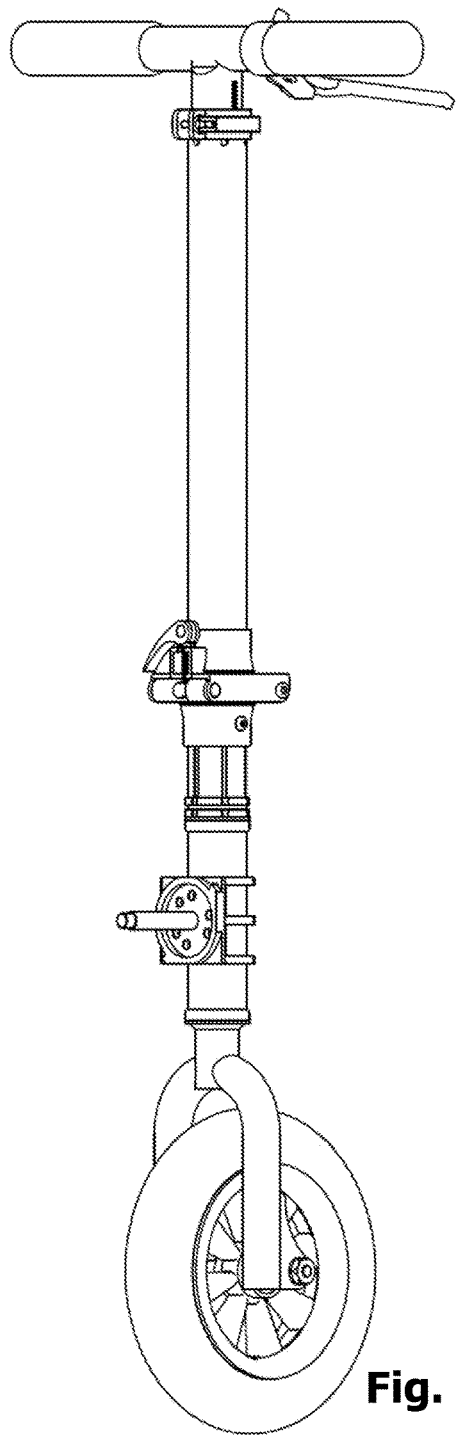
Figure 118:
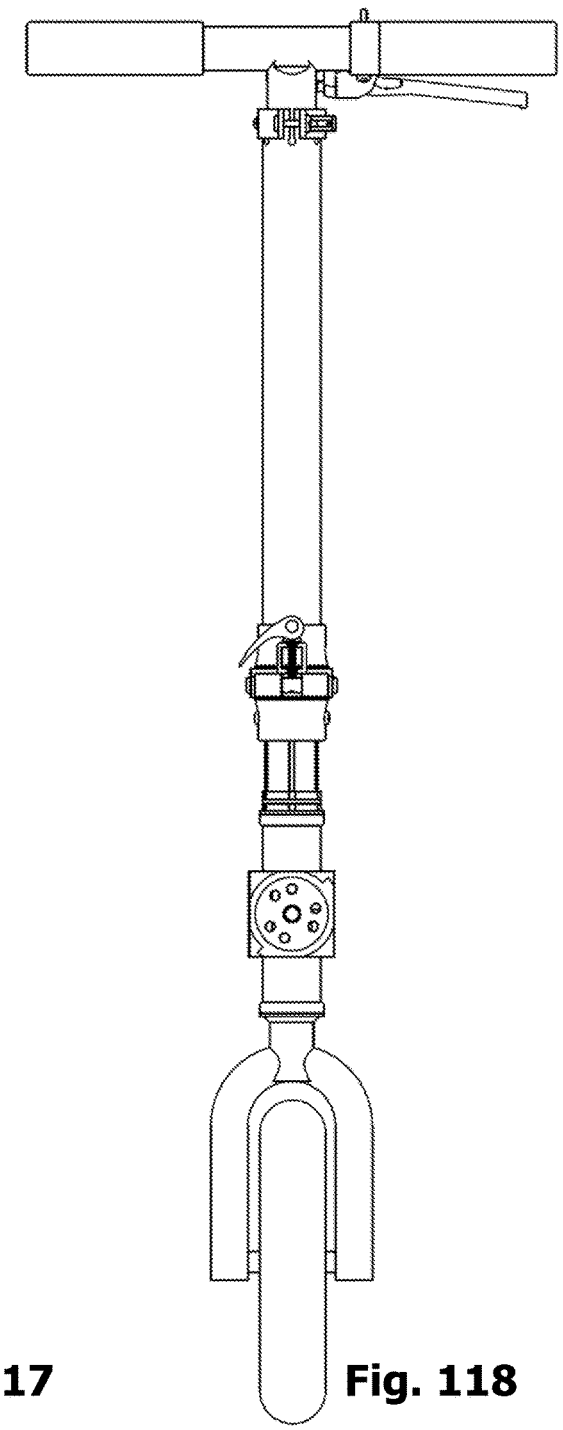
Figure 119:
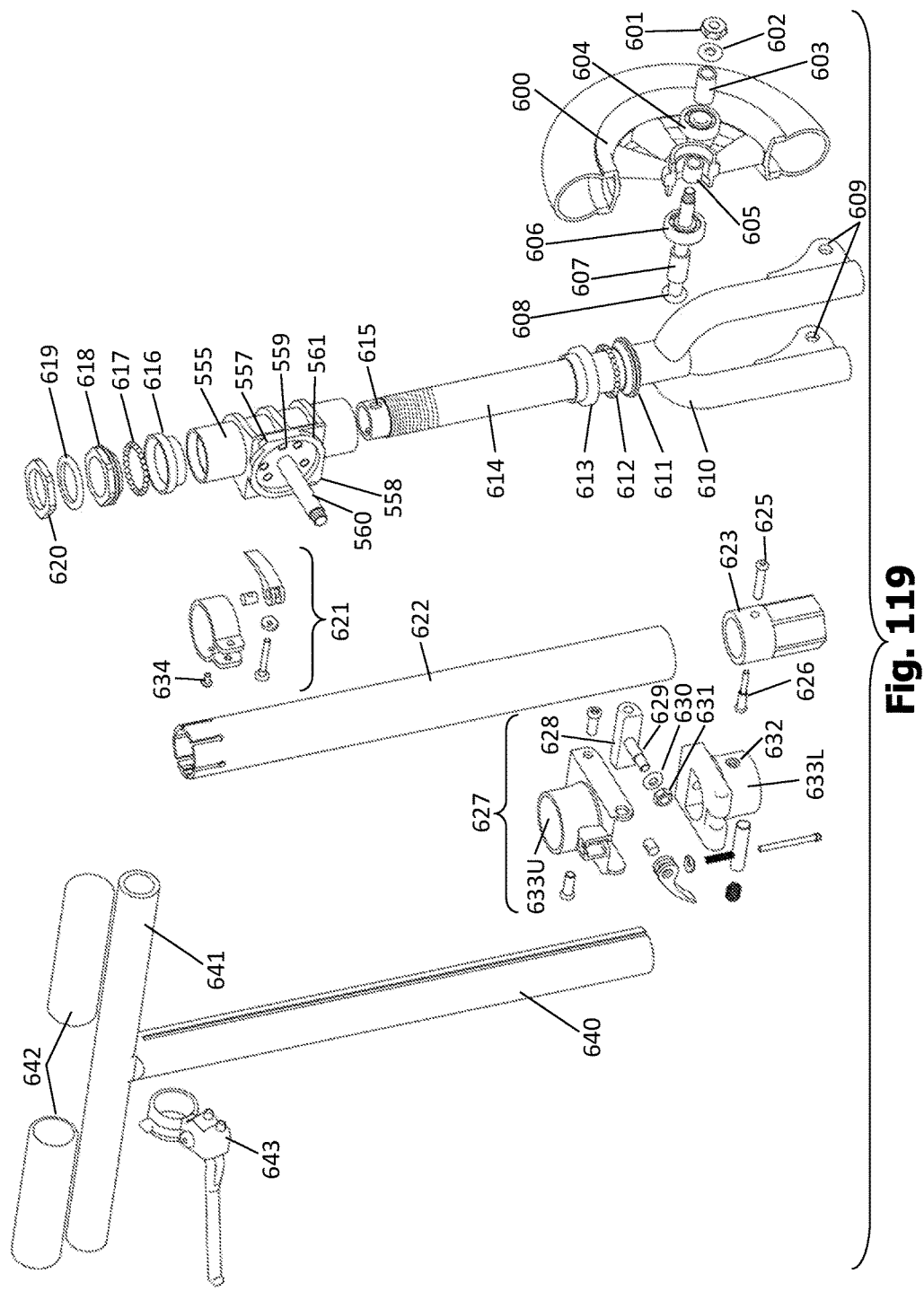
Figure 120:
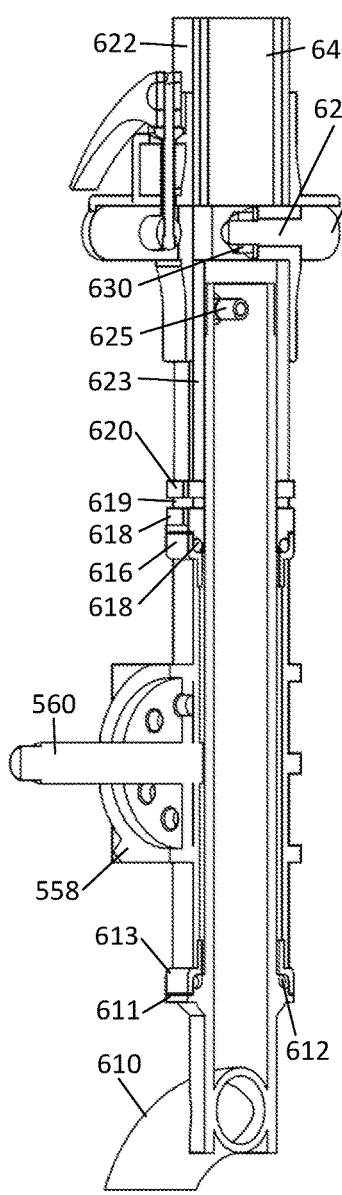
Figure 121:
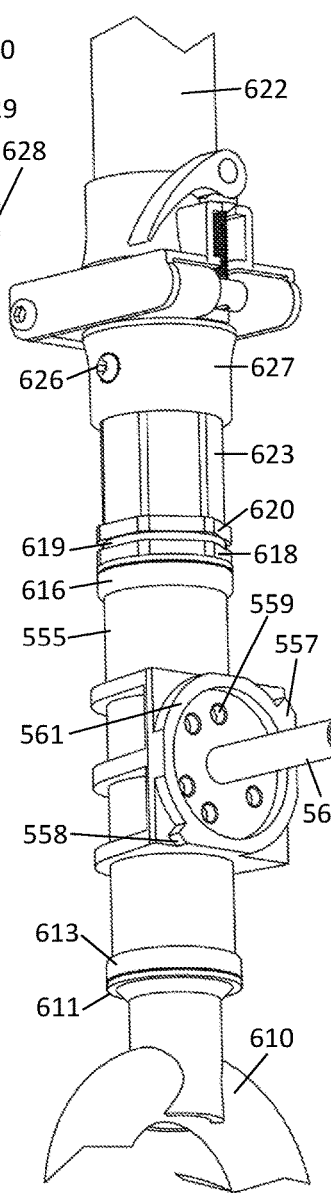

FIGS. 113 to 116 present the details of a joint assembly which is mounted on aforementioned axle 517. A joint-frame 523 has a circular flange 522 designed on a back face which matches the interior opening of rim 515 on mainframe hinge 512. Flange 522 has a center-hole 556 and four other holes 521 which match the holes 516 on mainframe hinge 512. Axle 517 is inserted through center-hole 556 and another hole 534 on joint-frame 523 and fastened with a washer 518 and a nut 519. A key 520, on the same face of joint-frame 523 as flange 522, allows joint-frame 523 rotate within a range limited by two keys 513, 514 on mainframe hinge 512. A lower-latch 544 is mounted on axle 517, which axle 517 is inserted in a center-hole 545 on lower-latch 544. Built on lower-latch 544, there are four pins 547, which pins are inserted into holes 521 and can travel in and out of corresponding holes 516 on mainframe hinge 512. Two slider rollers 542 can go up and down on two tracks 546 built into lower-latch 544. Rollers 542 are mounted on two short axles 543 held by two arms of a slider 541. A slider guide 540 is fastened on an inside of joint-frame 523 with four screws 539 inserted into four threaded holes 533. Slider guide 540 has a roller 535 mounted on a transversal axle. Thus, slider 541 can move up and down on an interior face of joint-frame 523 while being guided by slider guide 540, a roller 535, the rim around frame hole 534, and two tracks 546 of lower-latch 544. A similar set of components are mounted on an opposite interior side of joint-frame 523. Thus, a slider guide 537, which has a roller 538 mounted on an axle, is fastened to an interior wall of joint-frame 523 with four screws 536 inserted into four threaded holes 527. A slider 548 has two arms holding two short axles 550 on which two rollers 549 are mounted. Rollers 549 can move up and down along two tracks 553 built in an upper-latch 552, which upper-latch 552 has three frontal pins 554 that are inserted into three holes 531 on a frontal face of joint-frame 523. As seen in FIG. 115, a flange 530 is built on a frontal face of joint-frame 523. A post 555 has a circular rim 561 with two keys 557, 558 and six holes 559 surrounding a post-axle 560. Post-axle 560 goes through a center-hole 531A on flange 530 as well as a hole 528 on an opposite side of joint-frame 523 and is fastened with a washer 562 and a nut 563. The diameter of flange 530 matches the interior diameter of rim 561. A key 529 on the frontal face of frame 523 allows the joint-frame assembly to rotate around post-axle 560 within a limited angle range between keys 557, 558 on post 555. A cover 569 is fastened to joint-frame 523 with the help of screws 571 going through frame holes 532 and screwed into threaded holes 570 built in cover 569. A joint-frame shaft 567 has multiple segments of different profiles along its length and a lever at one end. Thus, the segment by the lever is circular and matches the size of a center-hole 572 built in cover 569. A spring 568 is mounted on joint-frame shaft 567, on the outside of cover 569. Joint-frame shaft 567 is inserted through cover hole 572, two spacers 566, 564, a cog wheel 565, and another hole on the right side of joint-frame 523. As shown in FIG. 115, a slider-stopper 524 has two legs inserted into two holes made in the right side of joint-frame 523, and one center-hole through which joint-frame shaft 567 is inserted. Assembly 567, 566, 564, 524 is fastened to joint-frame 523 with a washer 525 and a nut 526. The legs of slider-stopper 524 are positioned in such a way to prevent sliders 541, 548 from moving when joint-frame shaft 567 is not pushed. An inner hole of cogwheel 565 matches the hexagonal shaped segment of joint-frame shaft 567 where it is mounted. Sliders 541, 548 have cogs placed linearly, matching the cogs on cogwheel 565.

FIGS. 117 to 124 show the details of a front-wheel steering assembly and the means by which it is connected to the rest of the scooter. Thus, a front wheel 600 is installed between two ends 609 of a fork 610 on bearings 604, 606 mounted on a front wheel axle 608 and fastened with a washer 602 and a nut 601. Bearings 604, 606 are spaced from each other with an internal spacer 605, and spaced from the ends 609 of fork 610 with two external spacers 603, 607. Fork 610 has a vertical stem 614 with a cone 611 rigidly affixed near its base while its other end is threaded. Previously mentioned post 555 has two cups 613, 616 rigidly connected to its both ends. This assembly 555, 613, and 616 is mounted on fork stem 614 between a pair of bearing balls 612, 617, and fastened with an adjustable cone 618, a washer 619, and a locknut 620. A hinge adaptor 623 is screwed on the threaded segment of fork stem 614. A folding hinge assembly 627 is used to connect the fork assembly to an upper tube 622. As it can be seen in FIGS. 122 and 123, folding hinge assembly 627 includes a hinge part 628 that has an axle 629 fastened to the hinge body with the help of a washer 630 and a nut 631 in such a way that the upper part of the hinge can pivot left and right when the hinge is open. Further description of the folding hinge assembly 627 is omitted as it is of a type ordinarily used for bicycles. A hinge assembly lower part 633L of is mounted on the aforementioned hinge adaptor 623 and secured with a pair of screws 625, 626 which go through a pair of holes 615 on the top of fork stem 614. Lower part 633L may include hole 632. A hinge assembly upper part 633U is rigidly connected to upper tube 622. A handlebar 641 has two handgrips 642 inserted at its ends, a handbrake assembly 643 mounted on one of its branches, and a handlebar-stem 640 affixed perpendicularly on its middle. Handlebar-stem 640 is inserted in upper tube 622 and secured in a desired position with the help of a stem locking system 621. Further description of the stem locking system 621 is omitted as it is of a type ordinarily used for bicycles. Locking system 621 may include holes 634 and bolts 634. As it can be seen in FIG. 124, handlebar-stem 640 and the upper tube 622 have matching splines, so that handlebar-stem 640 cannot rotate inside of tube 622.

Operation

Figure 36:
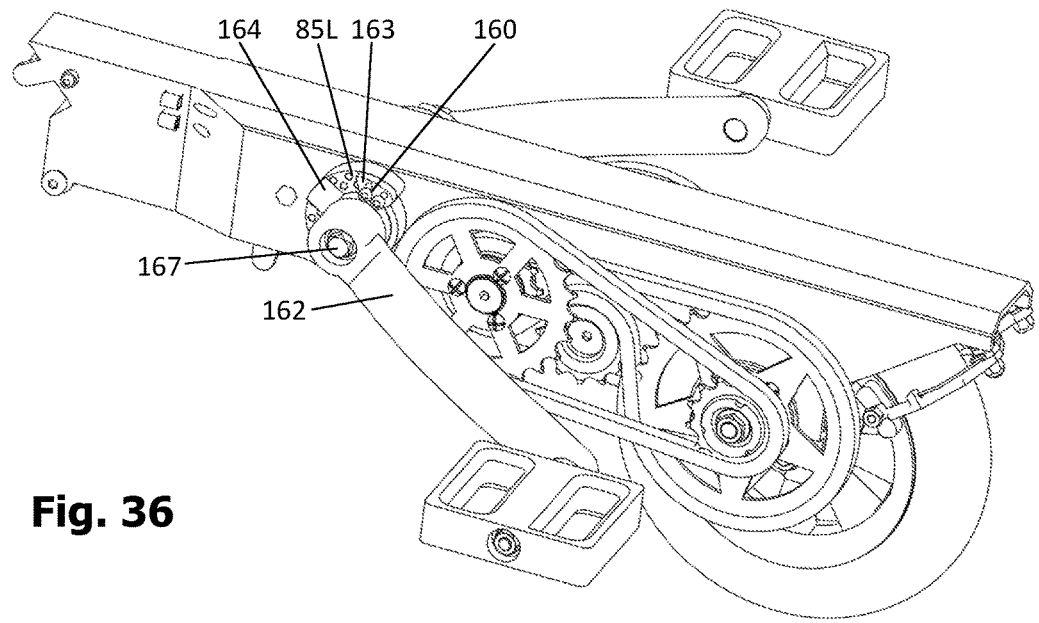
FIG. 36 is a perspective view of the mainframe and the internal and external components it holds, as seen from left.
Figure 37:
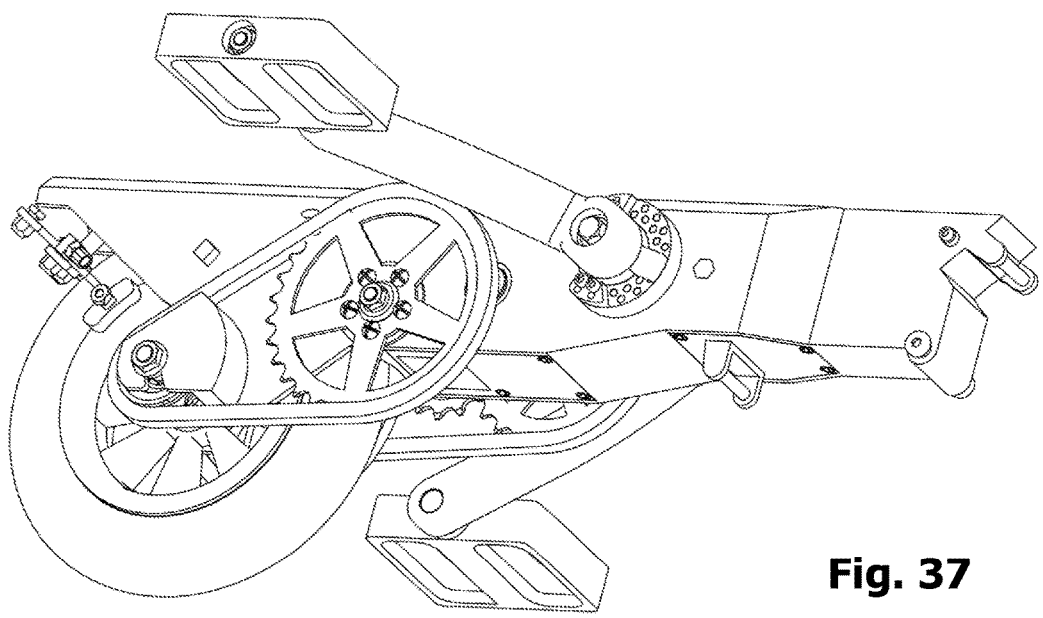
FIG. 37 is a perspective view of the mainframe and the internal and external components it holds, as seen from right.

Three-Wheel Scooter:

The scooter is propelled forward when the pedals are pushed down by a rider standing with both feet on the pedals while holding the handlebar for steering and balance. The pedals are moved upwards by internal torsion-springs 168 as shown in FIGS. 65 to 67. As it can be seen in FIG. 36, the lowest and the highest positions of crank-arm 162, which is moving jointly with retaining lever 164, can be adjusted by fastening pedal stoppers 163 with screws 160 in various positions on the range of holes 85L around pedal crank-shaft 167. As shown in FIGS. 38 to 40 and 65 to 67, when the left pedal is pressed down, crank arm 162 turns drive-wheel 170 via pedal crank-shaft 167. Drive-wheel 170 rotates endless chain 420, thus turning free-wheel 146 which, in turn, engages unidirectional-shaft 142. When the left pedal travels upwards, free-wheel 146 rotates in a direction where it is disengaged from unidirectional-shaft 142. A similar course of events occurs when the right pedal travels downwards and upwards. Thus, unidirectional-shaft 142 rotates only in one direction when the left and right pedals are pushed down. Unidirectional-shaft 142 rotates jointly with chain-wheel 154, which further rotates small-chain-wheel 66 via endless chain 422. Large-chain-wheel 65 rotates jointly with small-chain-wheel 66, thus causing endless chain 423 rotate left-chain-wheel 121 in the opposite direction. Free-rotating sprocket 152 rotates freely on unidirectional-shaft 142. The drive torque is transmitted from left-chain-wheel 121 to right-chain-wheel 127 via drive-shaft 120. Right-chain-wheel 127 rotates rear-free-wheel 50, which engages rear-wheel 12, thus propelling the scooter forward. To be able to provide speeds equivalent to those obtained with bicycles with regular sized wheels, the drive mechanism uses four stages of multiplication of rotation. Thus, the first stage is between drive-wheels 170, 174 and free-wheels 144, 146, the second stage is between chain wheels 154 and 66, the third stage is between chain wheels 65 and 121, and the fourth stage is between right-chain-wheel 127 and rear-free-wheel 50. As the pedals can move independent of each other, a rider can propel the scooter by pushing only one pedal while resting the other foot on the other pedal.

Figure 71:
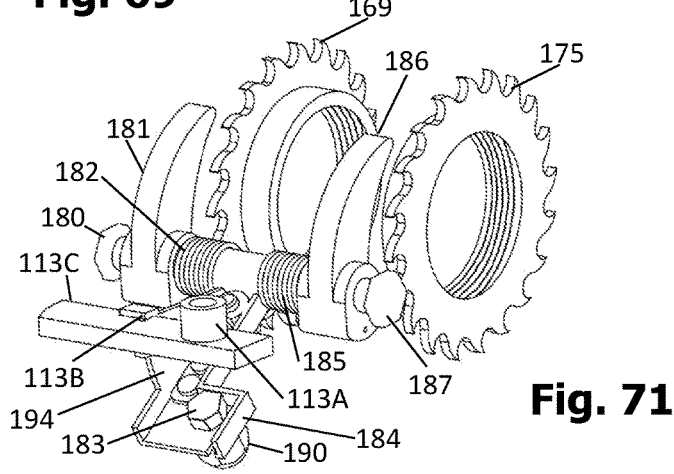
FIG. 71 is another perspective view of the pedal-blocker in FIG. 69.
Figure 72:
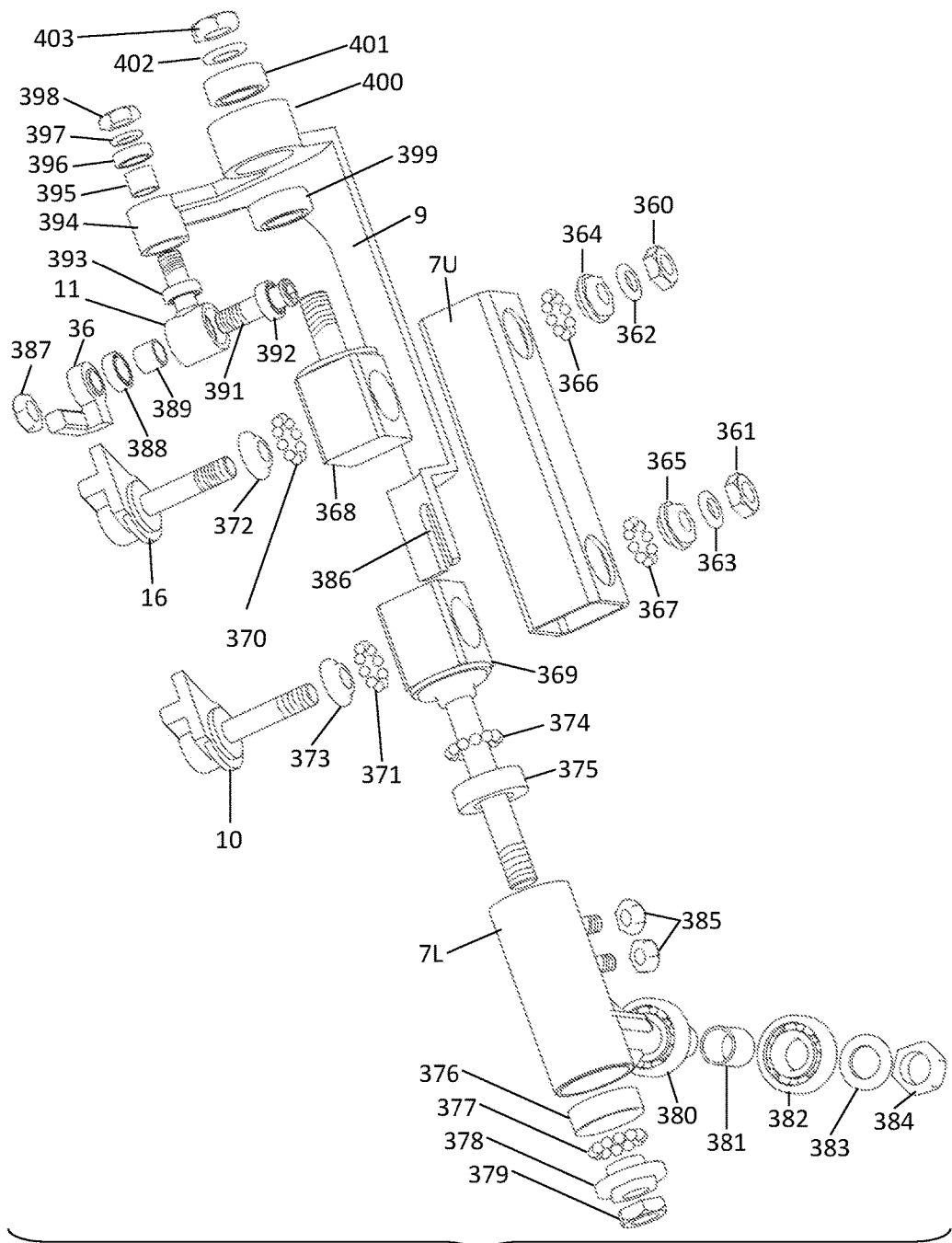
FIG. 72 is an exploded view of a right front steering assembly without the wheel.
Figures 77, 78:
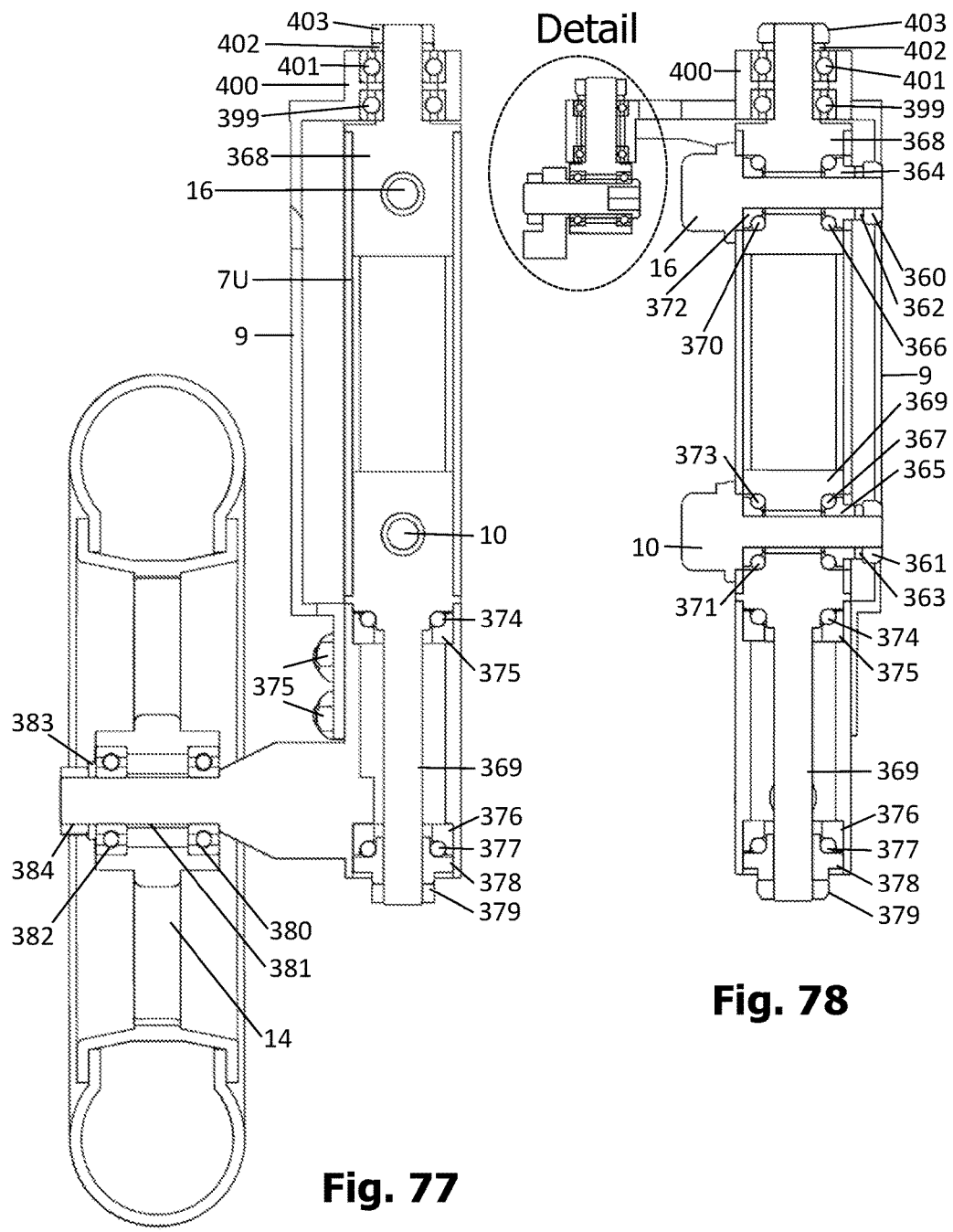
FIG. 77 is a transversal section view of the assembly shown in FIG. 74.
FIG. 78 is a longitudinal section view of the assembly shown in FIG. 74, without the wheel.
Figure 85:
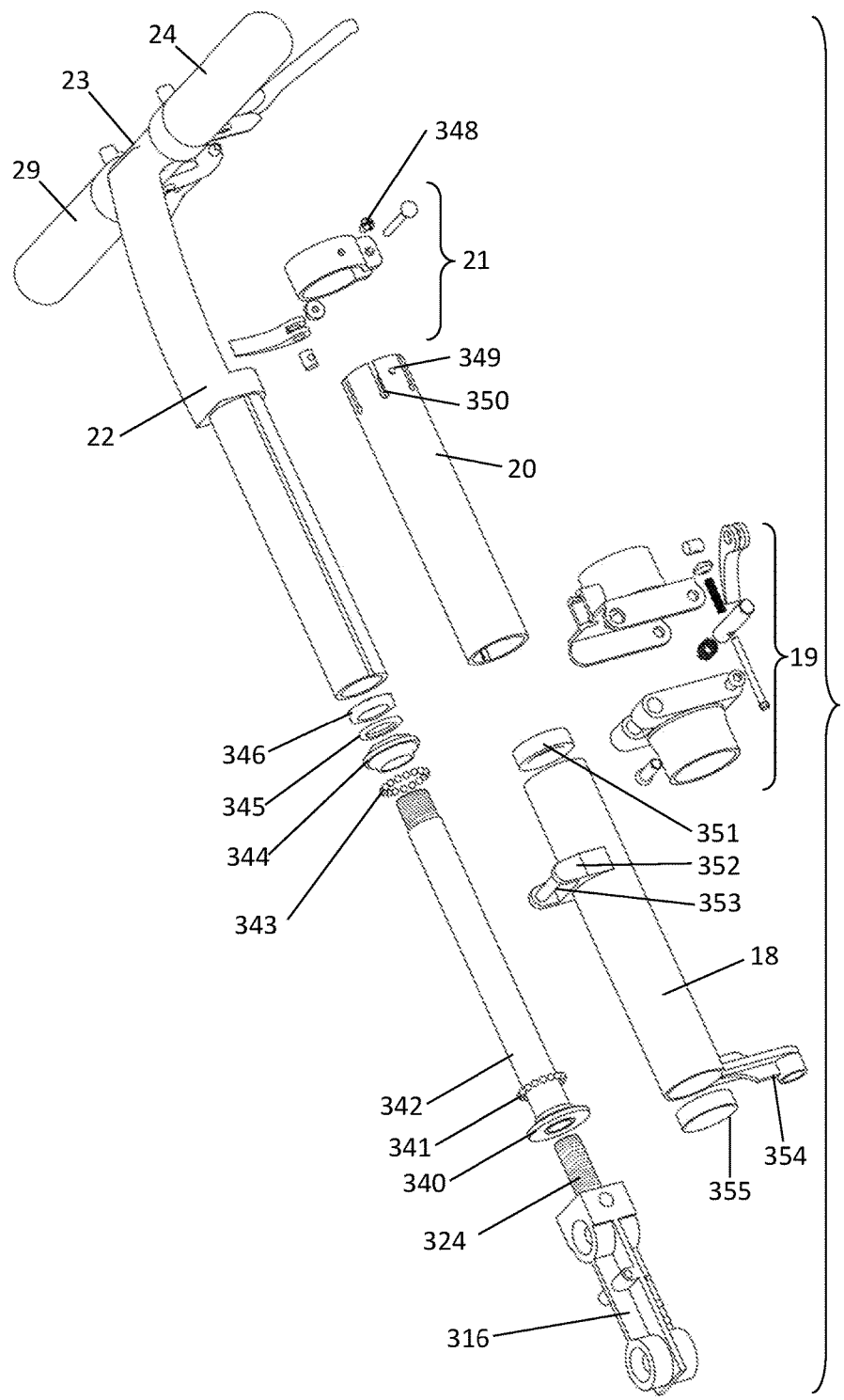
FIG. 85 is an exploded view of the components shown in FIG. 79.

The pedals can be prevented from moving upwards by a mechanism controlled by the hand of the rider. This is an optional feature that can be useful when the scooter is parked, carried-on, or stored. As seen in FIGS. 4, 41, and 71, short lever 26 of hand-brake assembly 27 is connected to a cable running through cable guides 101 and 113A. The cable is not shown here. When lever 26 is pulled, the cable pulls up extension 194 of blocker-spacer 184 towards transversal rail 113C while compressing elastic component 193 as shown in FIGS. 68 to 71. Blocker-spacer 184 rotates tooth torsion-springs 182, 185 along with blocker-teeth 181, 186 towards pedal-blockers 169, 175 where the tips of the teeth lock into the cavities of the blockers 169, 175, thus preventing the pedals from moving upwards. When lever 26 is released, the cable allows elastic component 193 to decompress and push extension 194 of blocker-spacer 184 away from transversal rail 113C, thus applying tension to tooth torsion-springs 182, 185 which tend to move blocker-teeth 181, 186 away from pedal-blockers 169, 175. However, blocker-teeth 181, 186 remain locked into the cavities of pedal-blockers 169, 175 until the pedal is pushed down and the corresponding tooth is released.

FIGS. 4 and 18 to 29 show how the balance and steering of the front wheels are achieved. Front-frame assembly 17 along with legs 7U, 8U, and v-linkages 10, 16 form a parallelogram structure which maintains steering legs 7U, 8U and front-frame assembly 17 parallel to the plane of the rear-wheel when the scooter leans left/right or travels on uneven terrain. As seen in FIGS. 86, 91, and 92, a mechanism controlled by the hand of the rider can lock upper linkage 16, and the rest of the parallelogram structure, in a desired position. This function is useful when the scooter is stopped and the rider chooses to remain mounted. When the long lever of handbrake assembly 28 is pushed, a cable pulls down clamp 38 which locks arc-shaped component 37 while compressing spring 333. The short lever of handbrake assembly 28 is used to lock the long lever in a "pushed" position if the rider decides to park the scooter in an upright position. When the long lever of handbrake assembly 28 is released, spring 333 pushes clamp 38 away from arc-shaped component 37 and the parallelogram structure is freed to move. The rider can steer the front wheels by turning steering-handlebar 23 left or right. As seen in FIGS. 79 and 80, steering-handlebar 23, handlebar-stem 22, upper steering-shaft 20, and lower-steering-shaft 18 pivot jointly around cylindrical post 342 causing bottom-tip 354 to rotate along with them. Stem 324 is positioned in such a way that the axis of cylindrical post 342 is on the plane formed by the axes of the two parallel steering columns 7U and 8U. If bottom-tip 354 rotates to left or right, it causes steering-rod 33 turn the frontal tip of the left steering-arm 32 and along with it the frontal tip of the right steering-arm 9 through the means of steering-spacer 36. As steering-arms 9, 32 rotate jointly with their respective lower segment of front-wheel supports 7L, 8L, front wheels 14, 15 will rotate in sync with steering-handlebar 23. The length of steering-spacer 36 as well the shapes and lengths of the frontal tips of steering-arms 9, 32 are designed to preserve the rules of Ackermann's steering geometry while allowing the front wheels turn left and right to angles of up to 45 degrees.

Figure 20:
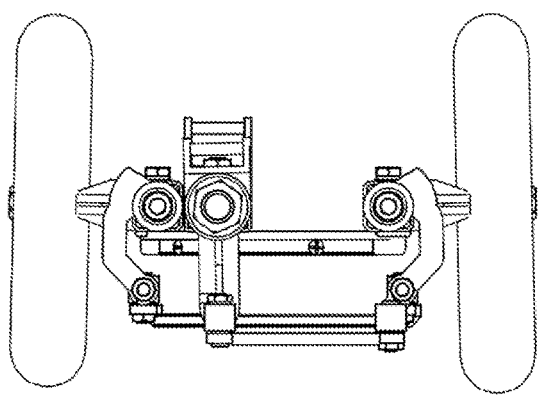
FIG. 20 is a view of the steering components in FIG. 18 as seen from above.
Figure 20A:
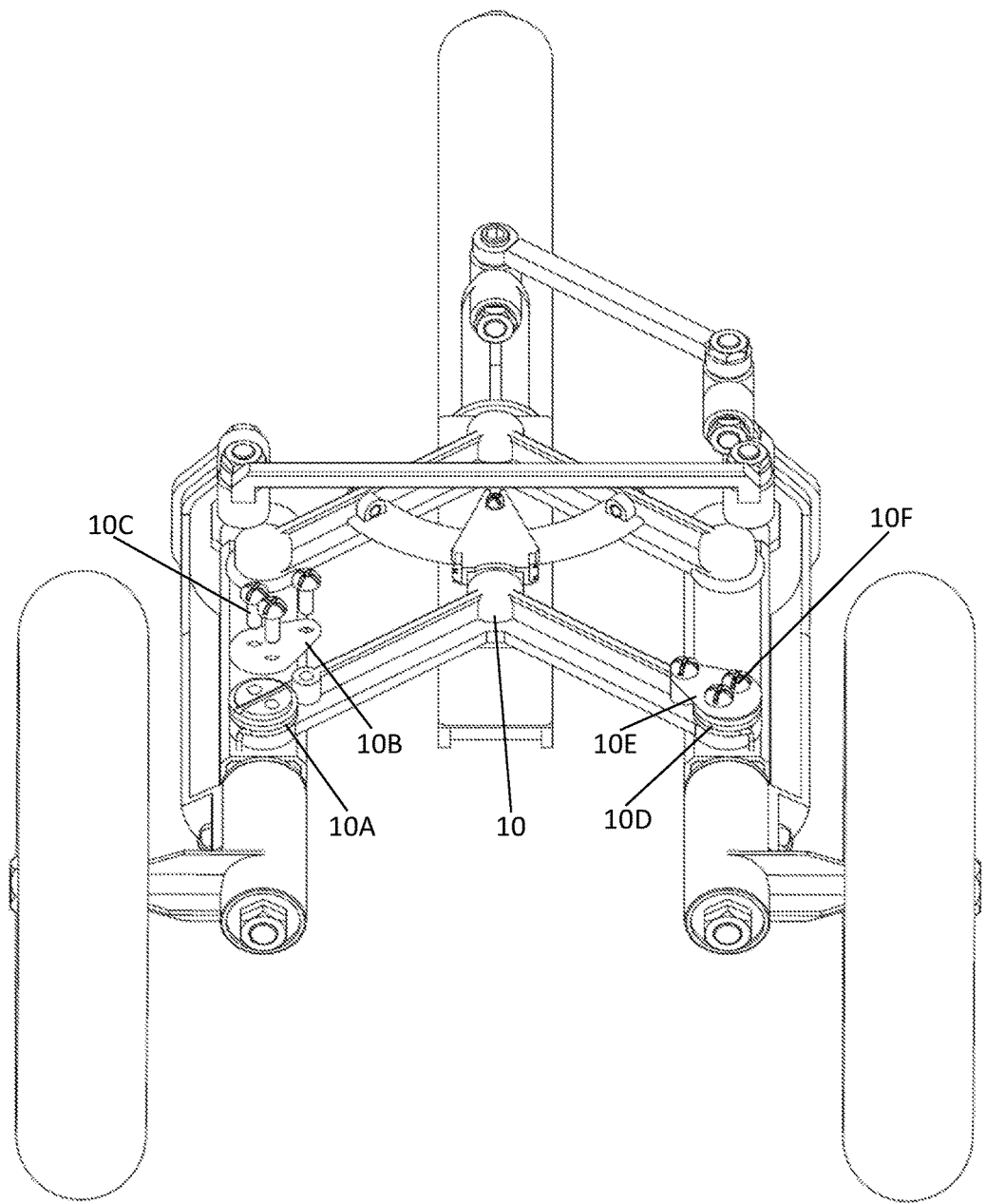
FIG. 20A shows an optional, complementary implementation of the balance mechanism.
Figure 21:
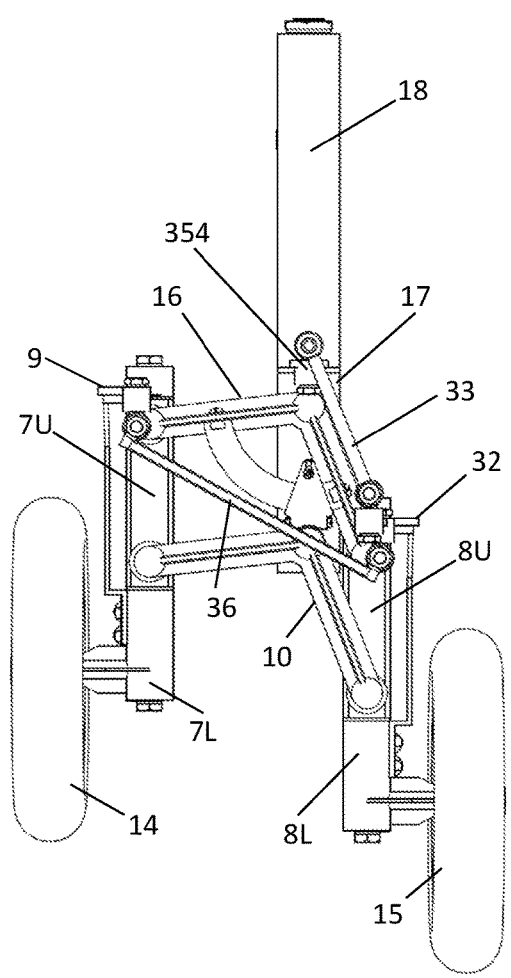
FIG. 21 is a frontal view of the frontal steering components with the right wheel at its highest position.
Figure 22:
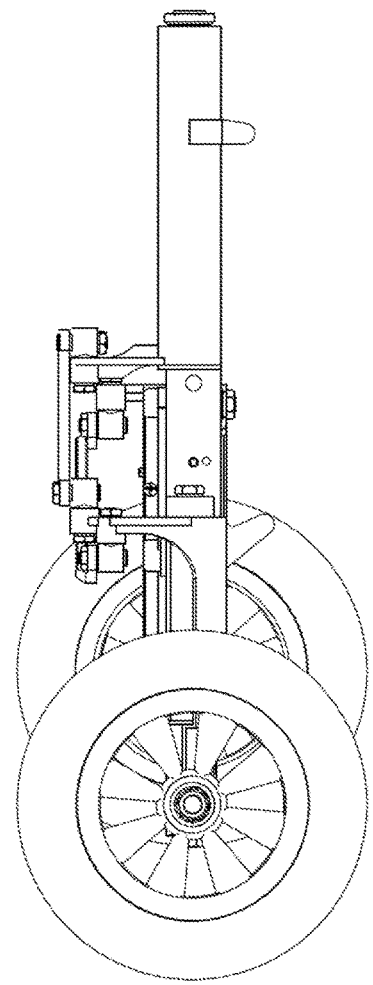
FIG. 22 is a lateral view of the steering components in FIG. 21.
Figure 23:
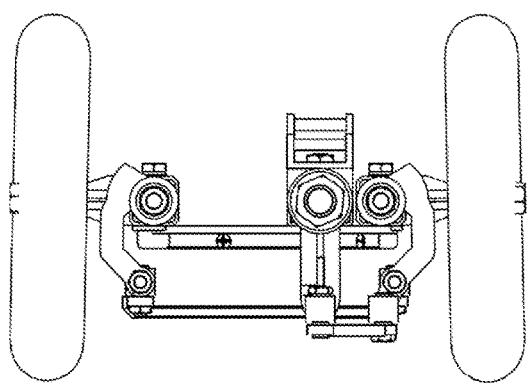
FIG. 23 is a view of the steering components in FIG. 21 as seen from above.
Figure 27:
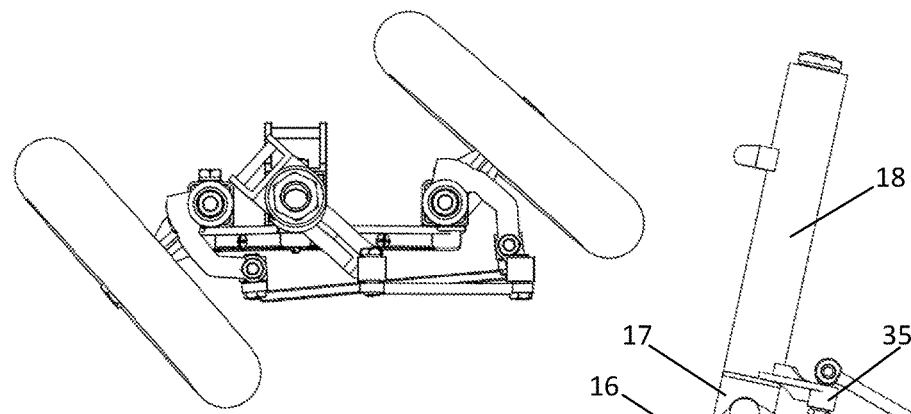
FIG. 27 is a view of the steering components when turning left, as it can be seen from above.
Figure 28:
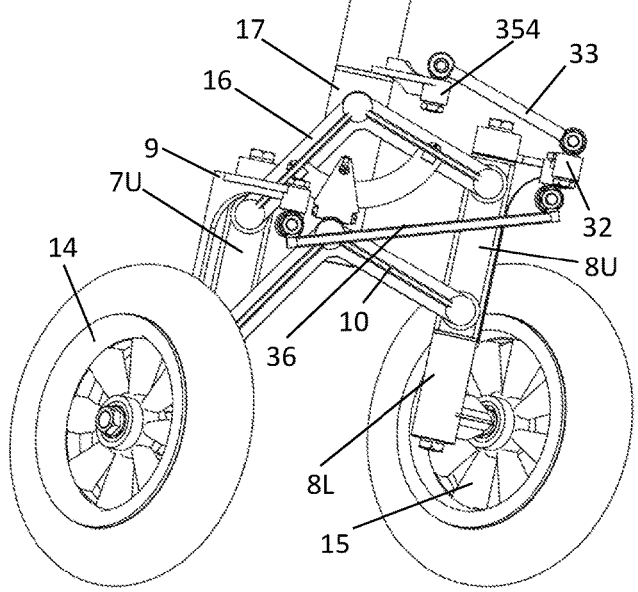
FIG. 28 is a frontal view of the steering components in FIG. 27.
Figure 29:
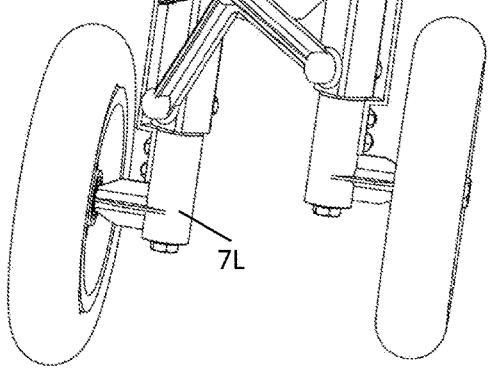
FIG. 29 is a lateral view of the steering components in FIG. 27.

FIG. 20A shows an optional, complementary implementation of the balance mechanism. The right side of lower linkage 10 is shown in an exploded view while its left side is shown in an assembled view. Note that the lower linage 10 is non-collinear with the upper linkage. Further, this design provides the means for the scooter to remain in an upright position when parked, without employing the blocking mechanism which contains clamp 38, handbrake 28, and arc-shaped component 37. A modified lower linkage 10 has two lateral tips where a pair of torsion-springs 10A, 10D are mounted with the help of two sets of screws 10C, 10F, and two spring covers 10B, 10E. The torsion-springs 10A, 10D have one end rigidly connected to the corresponding tip of lower linkage 10 while the other end is rigidly connected to the corresponding leg 7U, 8U.

FIGS. 30 to 35 are used to explain the operation of the joint assembly. FIG. 32 shows a section of joint-frame 6 where latch-strike tips 92, 301 are locked by latch-bolts 206, 207. When joint-frame shaft 200 is pushed, spring 201 is compressed, and the legs of latch-bolt stopper 212 are retracted, thus unlocking latch-bolts 206, 207. If lever 199 is turned counter-clockwise while still pushed, joint-frame shaft 200 turns cogwheel 205, which makes latch-bolts 206, 207 slide towards each other, moving away from underneath rollers 300, 91. Guided by rollers 202, 203, latch-bolts 206, 207 travel linearly within a range limited by the length of gaps 208G, 215G. Now, latch-strike tips 92, 301 are no longer locked and the scooter can be fractured for folding. The reverse operation is achieved by positioning the joint assembly in such a way that latch-strike tips 92, 301 go into joint assembly openings 218, 221, then turning lever 199 clockwise. Thus, joint-frame shaft 200 turns cogwheel 205, which in turn makes latch-bolts 206, 207 slide underneath rollers 300, 91, locking latch-strike tips 92, 301. When latch-bolts 206, 207 reach their travel limit, the legs of latch-bolt stopper 212 fall back, thus preventing latch-bolts 206, 207 from moving. Spring 201 decompresses, thus keeping latch-bolt stopper 212 in place. Joint assembly openings 217 lock into the corresponding bolts 87L, 88L, 87R, and 88R on the mainframe, while openings 219 lock into the corresponding bolts 318L, 319L, 318R, and 319R on front-frame 299.

Figure 10:
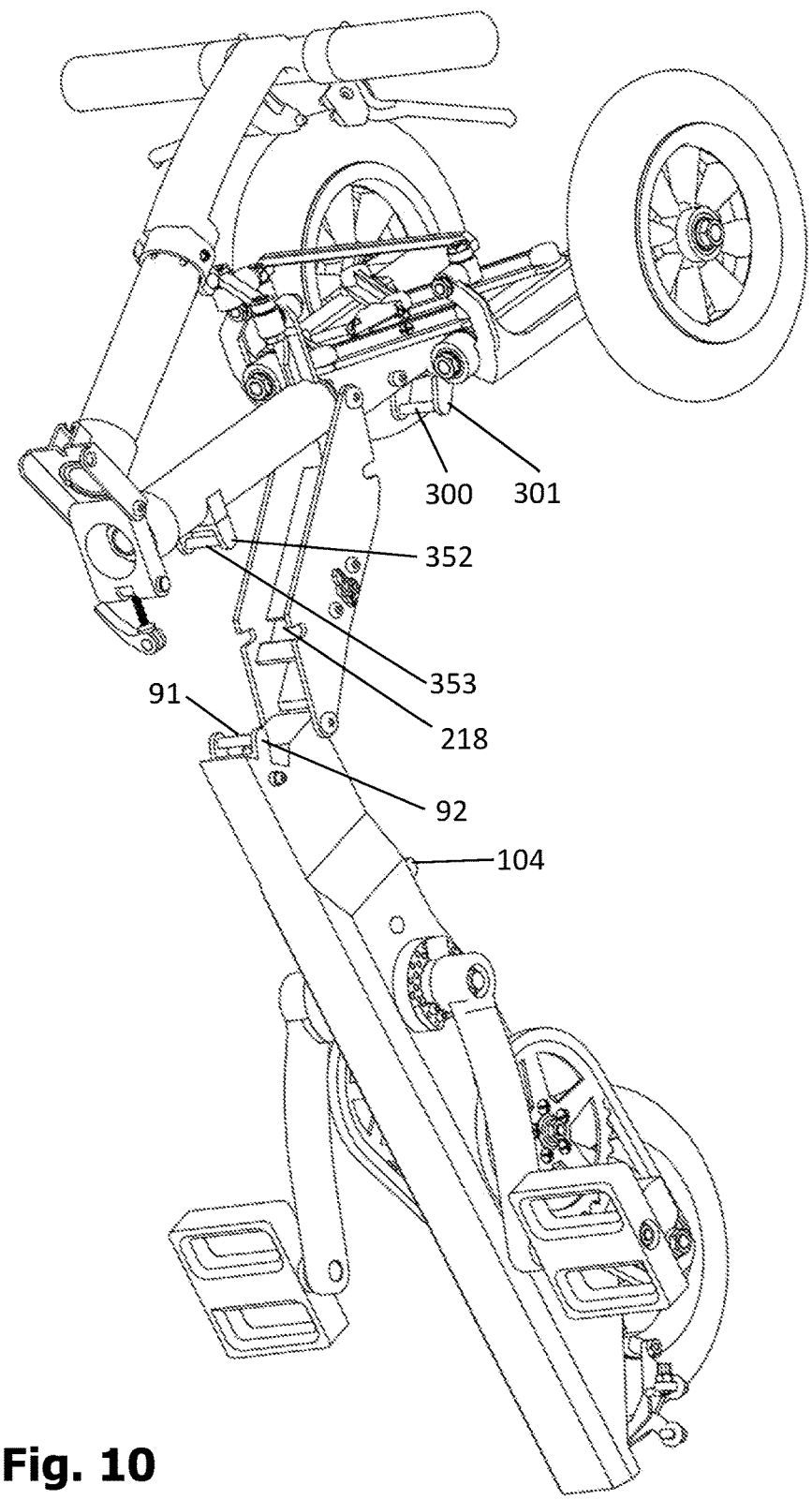
FIG. 10 is a perspective view of the three-wheel scooter half-way folded, as seen from above.
Figure 11:
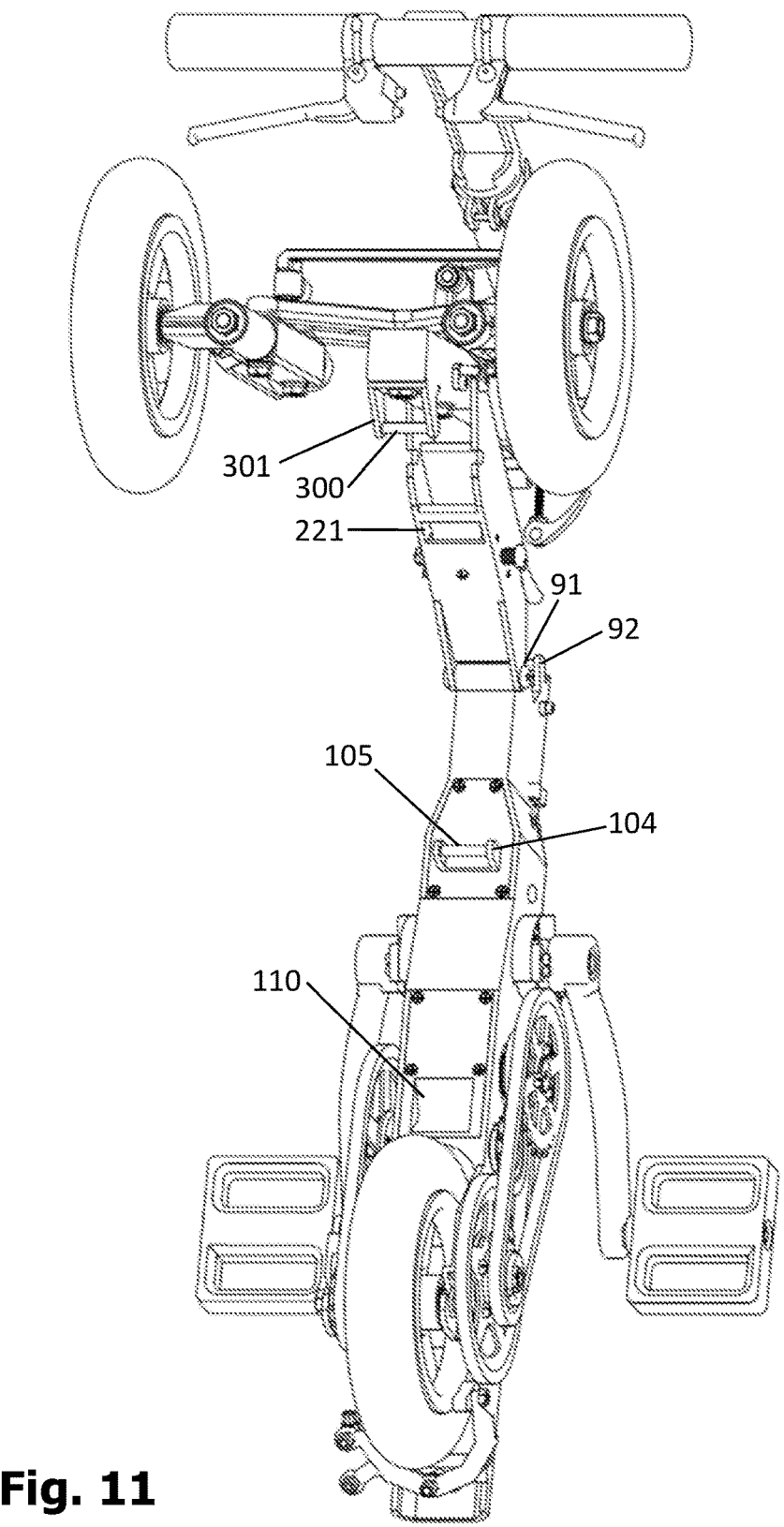
FIG. 11 is a perspective view of the scooter in FIG. 10 viewed from below.
Figure 12:
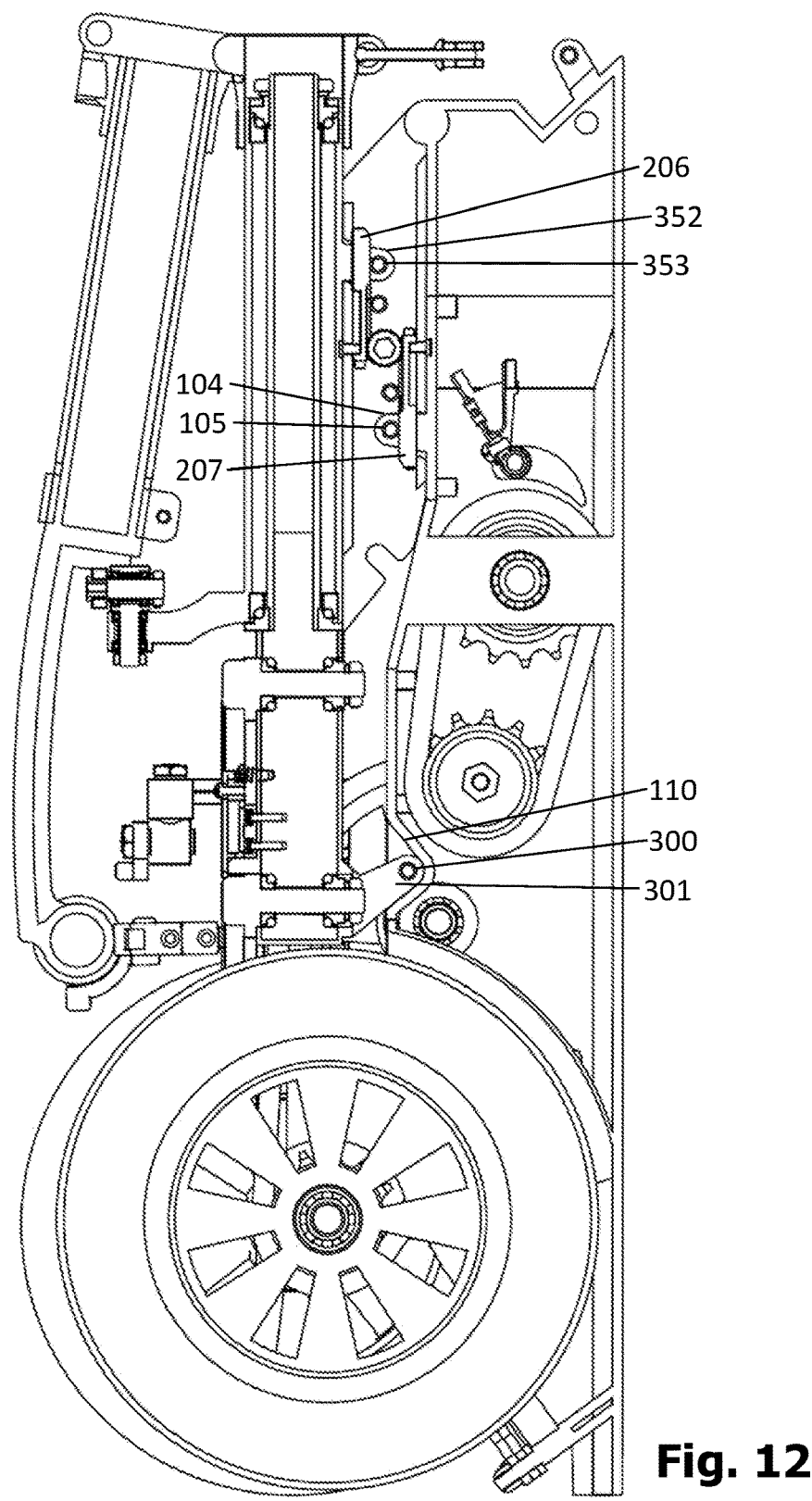
FIG. 12 is a longitudinal plane section of the three-wheel scooter folded completely.
Figure 13:
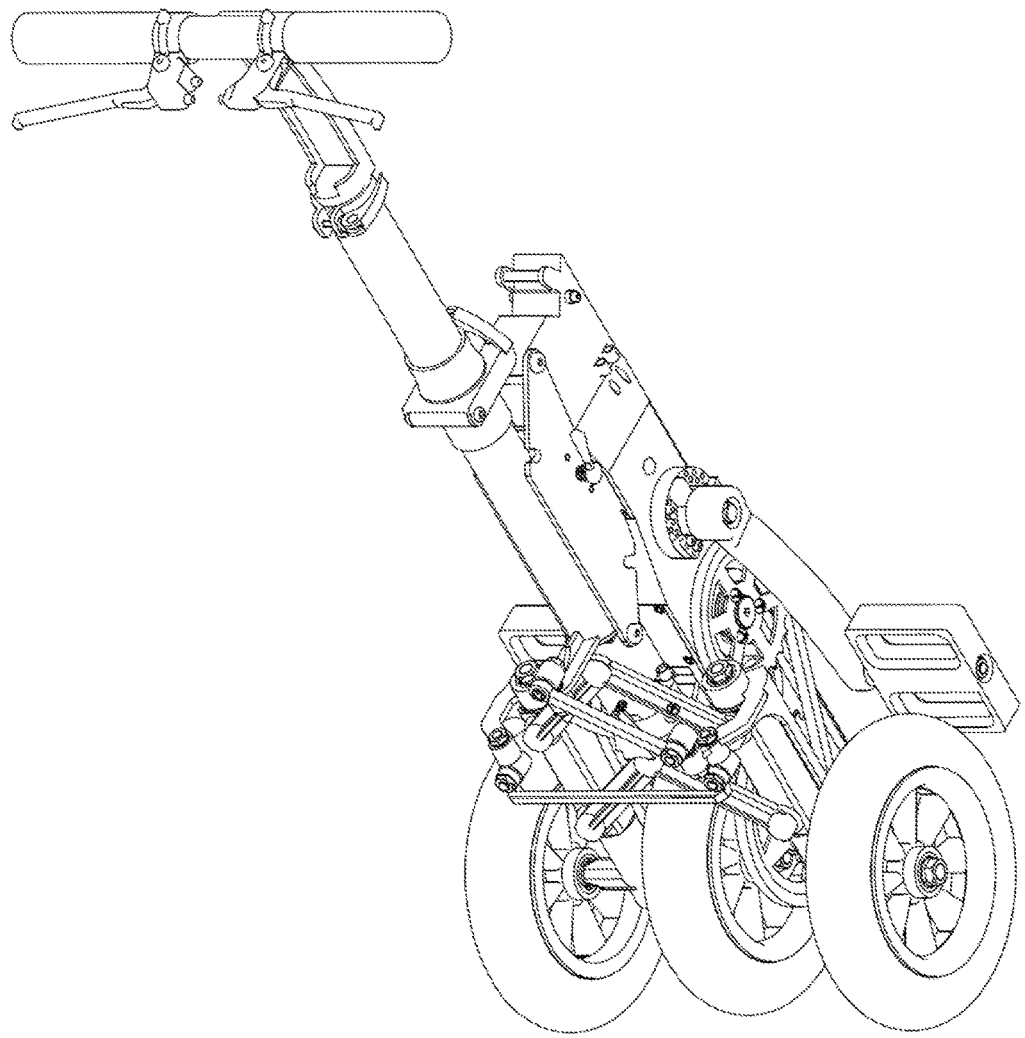
FIG. 13 is an enlarged view of the scooter in FIG. 1.
Figure 15:
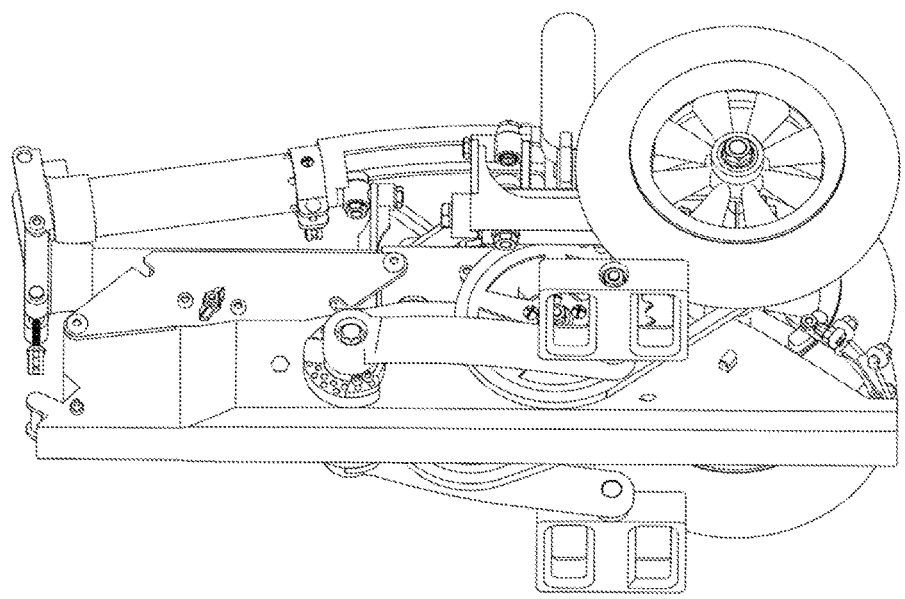
FIG. 15 is an enlarged, perspective view of the scooter in FIG. 3 as seen from right.
Figure 14:
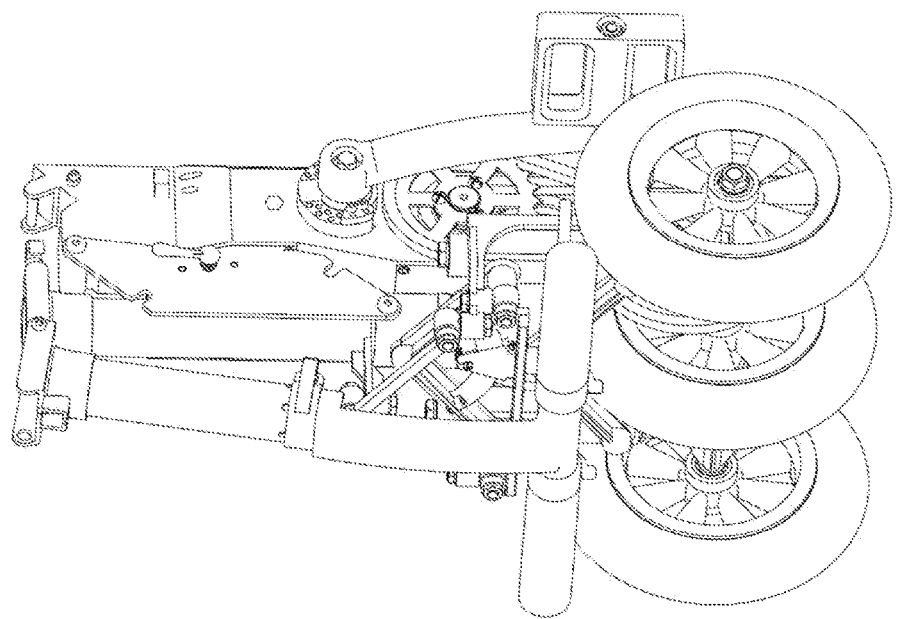
FIG. 14 is an enlarged, perspective view of the scooter in FIG. 3 as seen from left.
Figure 17:
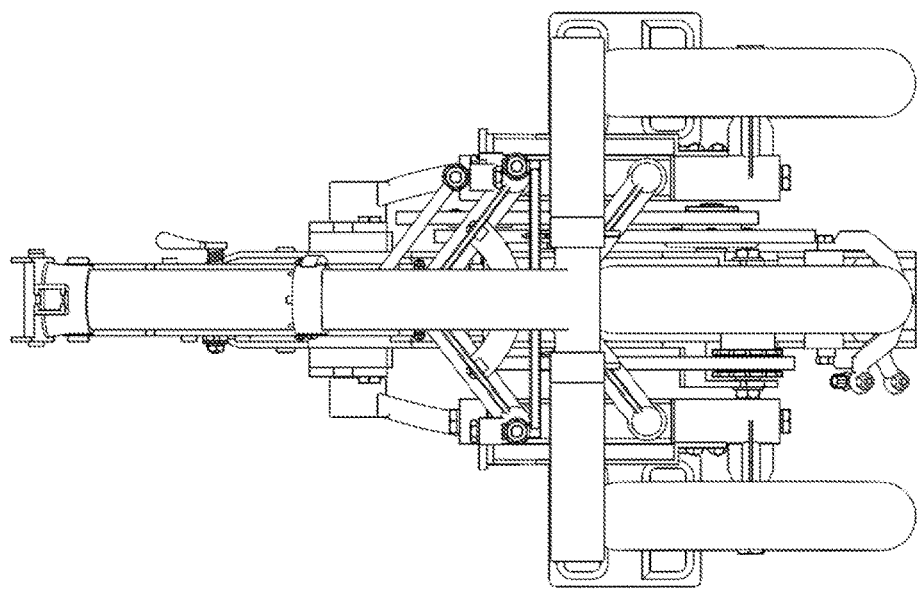
FIG. 17 is an enlarged, frontal view of the scooter in FIG. 3.
Figure 16:
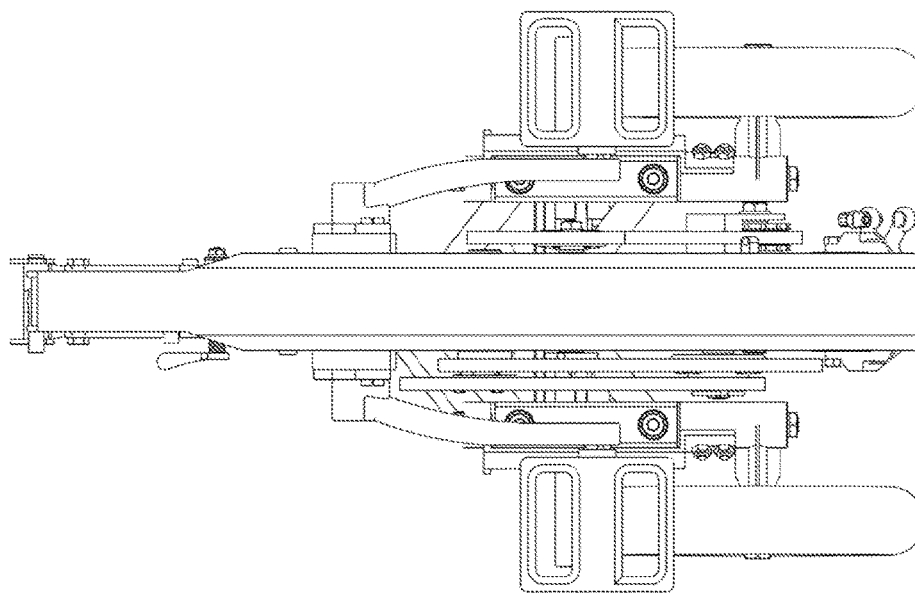
FIG. 16 is an enlarged, back view of the scooter in FIG. 3.
Figure 18:
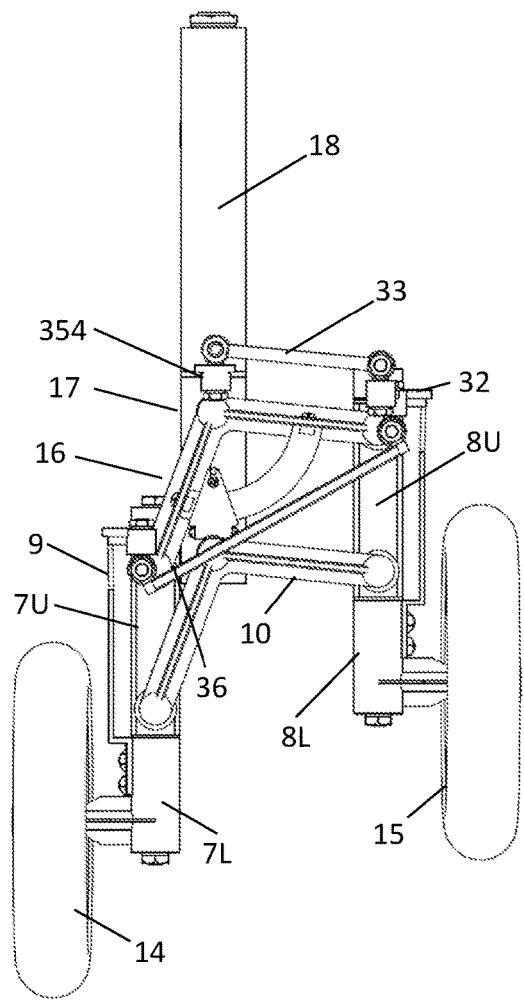
FIG. 18 is a frontal view of the steering components with the left wheel at its highest position.
Figure 19:
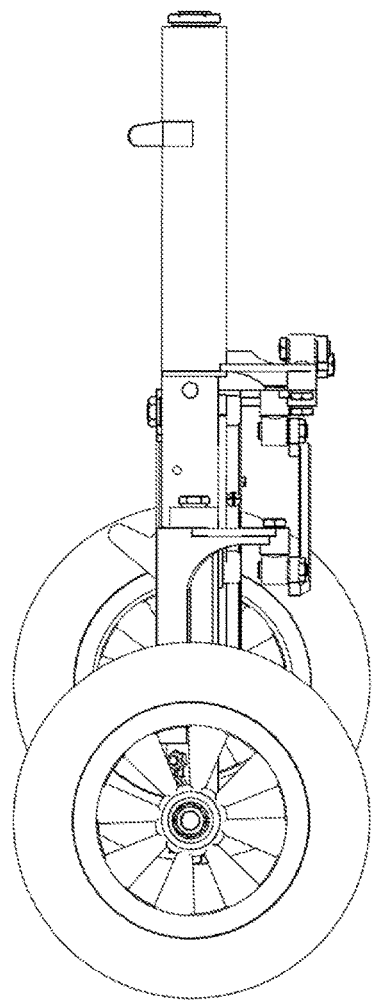
FIG. 19 is a lateral view of the steering components in FIG. 18.

As shown in FIGS. 10 and 11, when lever 199 is pushed and turned counter-clockwise, latch-bolts 206, 207 are retracted, latch-strike tips 92, 301 are released, and the scooter can be fractured for folding. If the folding continues until the rear-wheel docks between the front wheels, second latch-strike-tip 104 goes into opening 221 and fourth latch-strike-tip 352 goes into opening 218. When lever 199 is turned clockwise and released, latch-bolts 206, 207 slide under rollers 353, 105 of latch-strike-tips 352, 104, and the scooter is locked in that position, as show in FIG. 12. Third latch-strike-tip 301 docks into opening 110 of the mainframe at portion 108, which is attached to mainframe 1 at 112 using screws 109 which are inserted into 107. Roller 105 is inserted into 104 of portion 102, which is secured to mainframe 1 using screws 103 inserted into 106.

As it can be seen in FIGS. 10 to 17, the upper assembly of the steering-shaft, including steering-handlebar 23, handlebar-stem 22, and upper steering-shaft 20, can be further folded by unlocking folding hinge assembly 19 and docking it right above the frontal wheels.

Two-Wheel Scooter:

As the operation of the drive gear for the two-wheel scooter is identical to the one previously presented for the three-wheel scooter, only the operation of the joint assembly, the folding process, and the steering for the two-wheel scooter will be described going forward.

Figure 99:
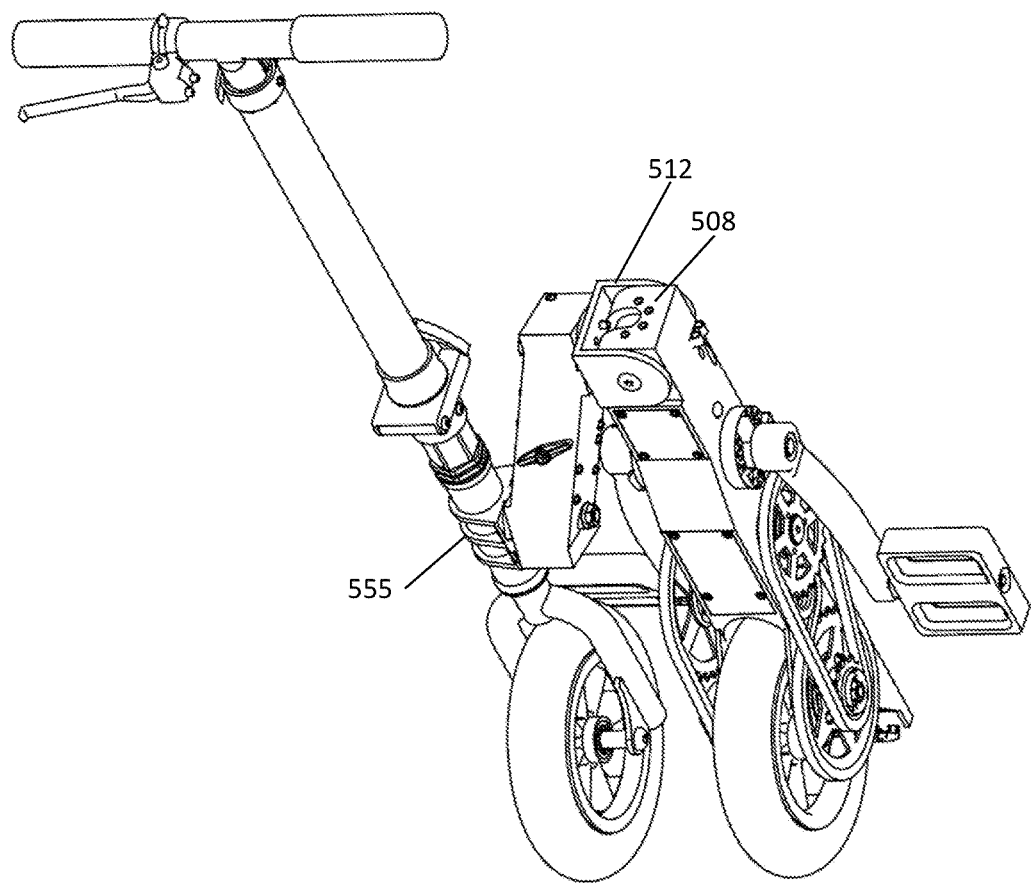
Figures 100, 101:
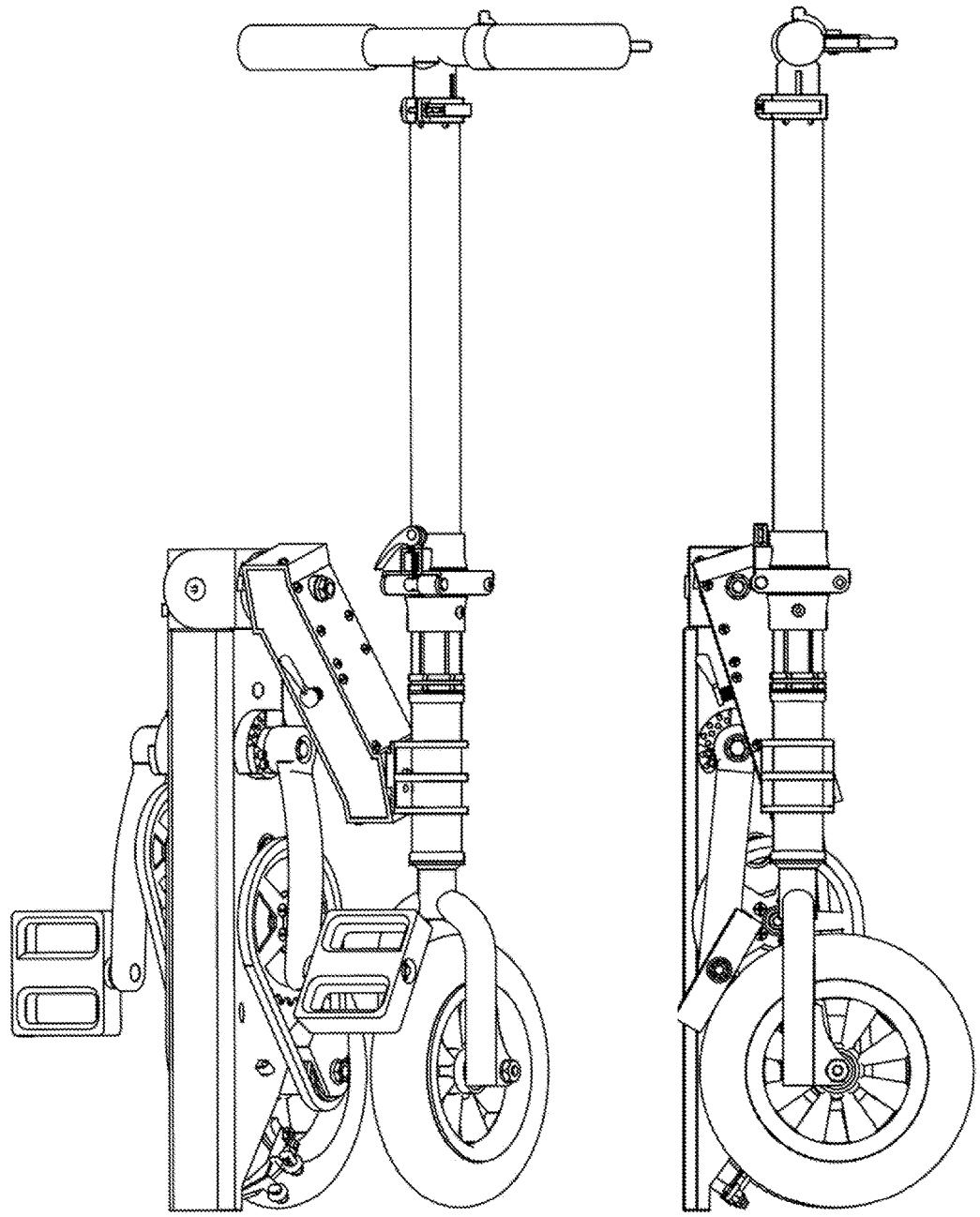
Figure 111:
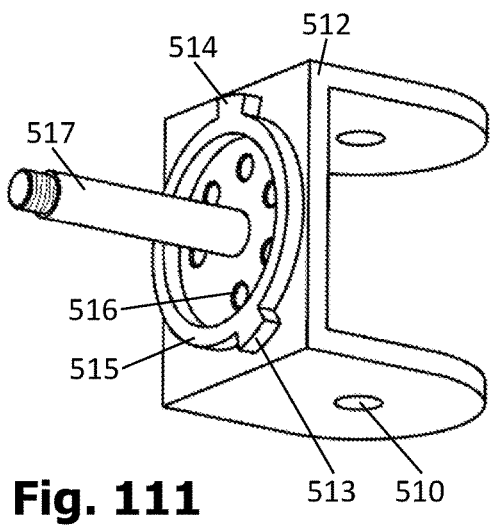
Figure 112:
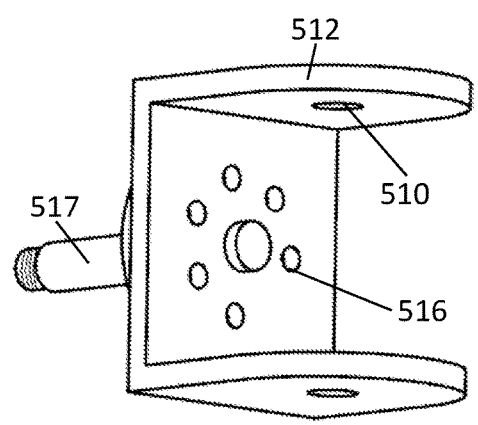

FIGS. 113 to 115 show the joint assembly in a "locked for riding" status. Frontal pins 554 are inserted into holes 559, thus preventing the joint assembly from rotating around post-axle 560. Pins 547 are inserted in holes 516 of mainframe hinge 512 and holes 508 of mainframe 500, thus preventing the joint assembly from rotating around hinge-axle 517 or axle 511 of mainframe hinge 512. Spring 568 pushes joint-frame shaft 567 outwards, thus keeping the legs of slider-stopper 524 against sliders 541 and 548, and preventing them from sliding. When the lever of joint-frame shaft 567 is pushed, the legs of slider-stopper 524 are pushed outwards, thus allowing sliders 541 and 548 to move. If the lever of joint-frame shaft 567 is turned clockwise, cogwheel 565 turns too, and the cogs on sliders 541 and 548 make them move towards each other. The movements of sliders 541 and 548 cause horizontal movements of lower and upper-latches 544, 552, which may include hole 551, and which extract pins 554 from holes 559 and pins 547 from holes 516 and 508, shown in FIGS. 106, 111, and 116. Mainframe hinge 512 is turned 90 degrees to the right around axle 511, the lower side of the joint assembly is rotated around hinge-axle 517 in such a way that joint assembly key 520 travels between keys 513 and 514 on mainframe hinge 512, and the upper side of the joint assembly is rotated around post-axle 560 in such a way that joint assembly key 529 travels between keys 558 and 557 of post 555, to end up in "carry-on" folding state as shown in FIG. 99. According to an embodiment, in the folding state, the axle of the front wheel is collinear to the axle of the back wheel. The lever of joint-frame shaft 567 is turned back, counter-clockwise, until pins 554 are inserted in holes 559 of post 555, and pins 547 are inserted in holes 516 and holes 505 of mainframe 500. When the lever is released, spring 568 decompresses, and the legs of slider-stopper 524 fall back against sliders 541, 548 preventing them from moving. Now, the scooter is "locked" in a "carry-on" folding state and can be dragged the same way as a carry-on luggage. A reverse sequence of steps takes the scooter from the "carry-on" state to the "ride-on" state.

Figure 102:
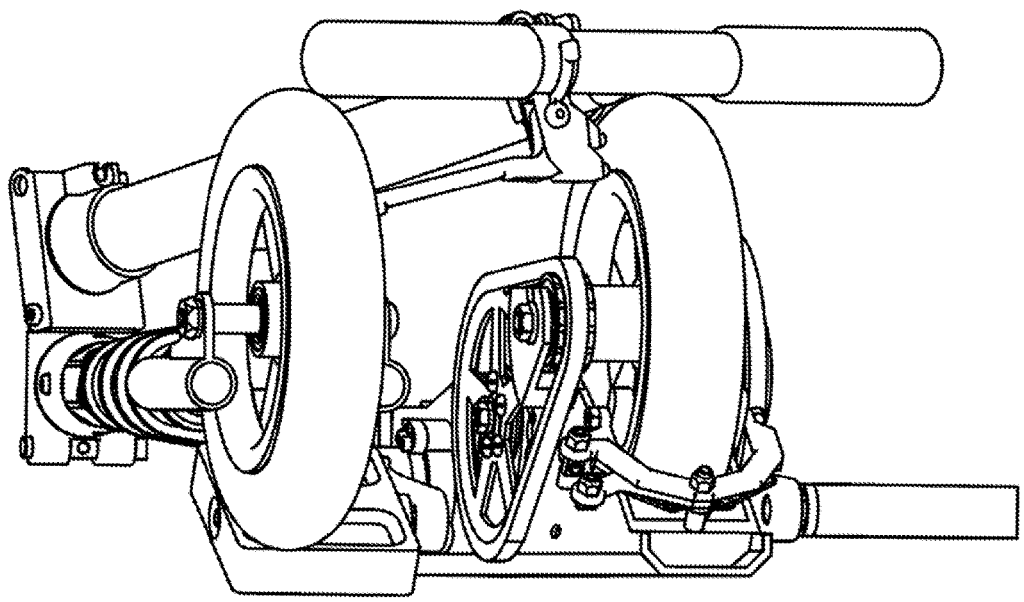
Figure 103:
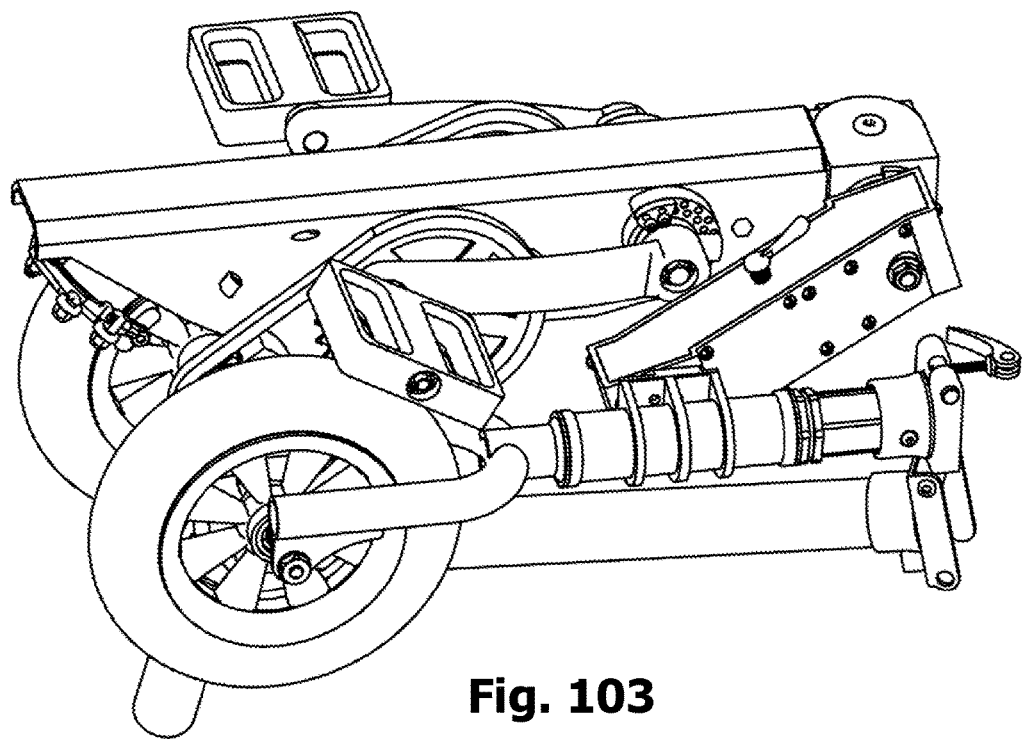
Figure 104:
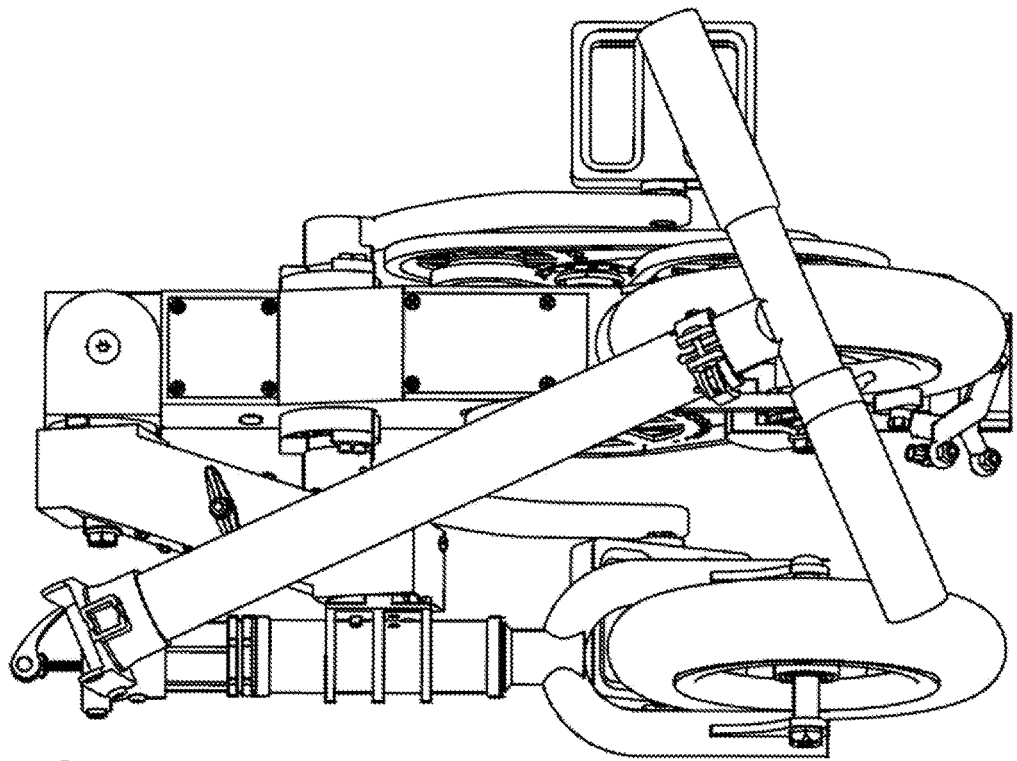
Figure 105:
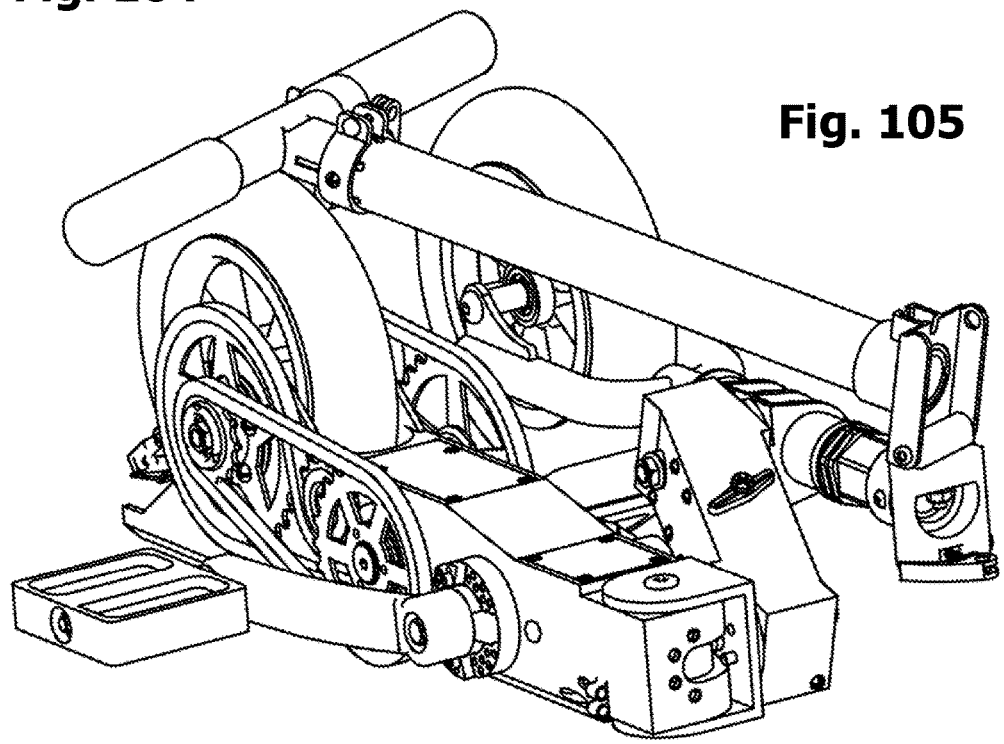
Figure 108:
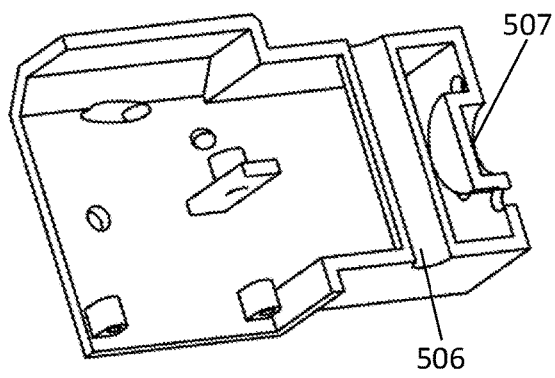
Figure 109:
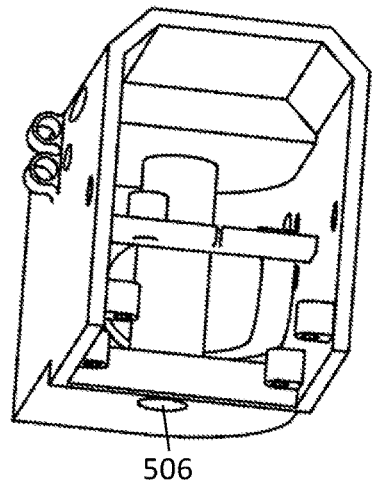
Figure 110:
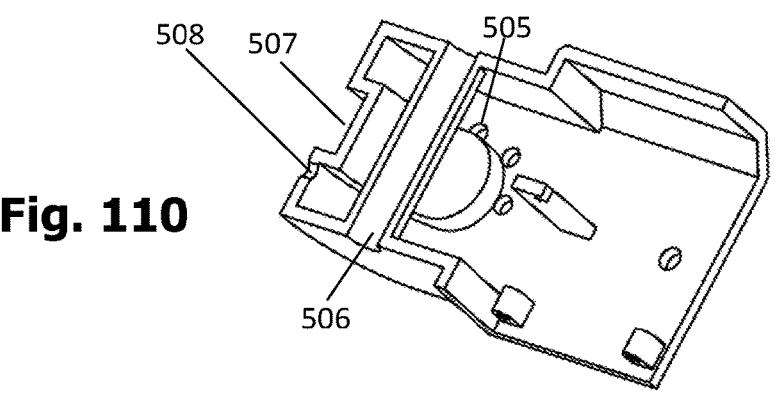
Figure 122:
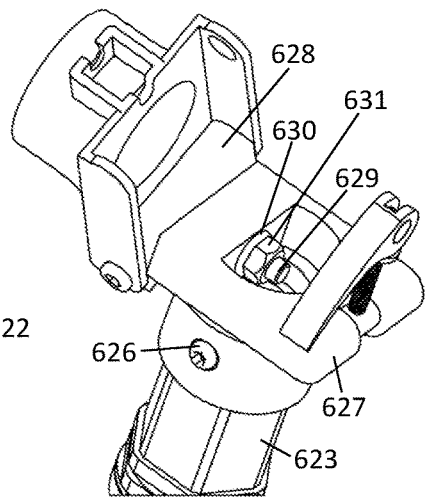
Figure 123:
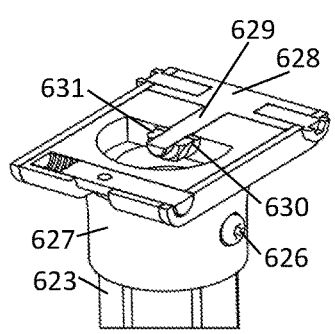
Figure 124:
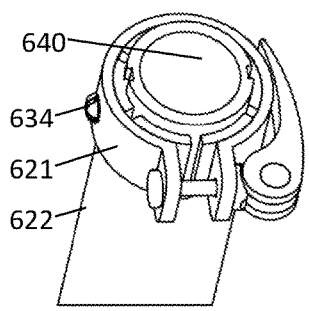

FIGS. 120 to 124 show the elements involved in folding the scooter for storage. Folding hinge 627 allows the upper part of the frontal tube to be fractured in a longitudinal vertical plane and also turned around axle 629, as shown in FIGS. 122 and 123. Handlebar 641 can be set at the desired height by locking handlebar-stem 640 inside of upper tube 622 with the help of stem locking system 621, as shown in FIG. 124. All the aforementioned elements allow the scooter to be folded in such a way that occupies very little space when stored, as shown in FIGS. 102 and 103.

The steering of frontal wheel 600 is done by turning handlebar 641 left or right. Handlebar-stem 640, upper tube 622, hinge adaptor 623, fork stem 614, the fork 610, and front wheel 600 can pivot jointly left and right while being held between a pair of bearing balls 612, 617, supported by cones 611, 618 and two cups 613, 616 of post 555 as shown in FIGS. 117 to 121.

According to various embodiments, any or all of the scooters shown and/or described in FIGS. 1-124 may be enhanced with an electrical motor/generator and/or batteries which can perform a drive function when the pedals are not used, and have the capability to charge the batteries when the pedals are used.

When introducing elements of the present disclosure or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A three-wheeled scooter comprising:
    a mainframe;
    a rear-wheel mounted at a rear end of the mainframe and braking means for the rear-wheel, whereby a rider can control the braking of the rear-wheel by hand;
    a drive mechanism held by the mainframe, whereby the drive mechanism propels the rear-wheel;
    a steering-handlebar mounted perpendicularly on a handlebar-stem, which handlebar-stem is inserted in an upper steering-shaft and secured in a desired position by a stem ring assembly mounted on the upper steering-shaft;
    a lower steering-shaft which is rigidly connected to the upper steering-shaft;
    a left leg having a left leg upper shaft and a left leg lower shaft on which a left leg upper shaft set of bearings and a left leg lower shaft set of bearings are pivotally mounted respectively;
    a right leg having a right leg upper shaft and a right leg lower shaft on which a right leg upper shaft set of bearings and a right leg lower shaft set of bearings are pivotally mounted respectively;
    a left-front-wheel support pivotally mounted on the left leg lower shaft set of bearings;
    a right-front-wheel support pivotally mounted on the right leg lower shaft set of bearings;
    a left steering-arm which is rigidly connected to the left-front-wheel support and pivotally mounted on the left leg upper shaft set of bearings;
    a right steering-arm which is rigidly connected to the right-front-wheel support and pivotally mounted on the right leg upper shaft set of bearings;
    a left front-wheel pivotally mounted on a left front-wheel set of bearings which are mounted on a horizontal axle of the left-front-wheel support;
    a right front-wheel pivotally mounted on a right front-wheel set of bearings which are mounted on a horizontal axle of the right-front-wheel support;
    a steering-spacer having a left end connected to a front-tip of the left steering-arm with a left end steering-spacer bearing means, and having a right end connected to a front-tip of the right steering-arm with a right end steering-spacer bearing means, whereby the left and right ends of the steering-spacer can move freely while keeping a constant distance between the two front-tips of the left and the right steering-anus;
    a steering-rod having a first end connected to a frontal steering-tip of the lower steering-shaft with a steering-rod first end bearing means, and having a second end connected to the front-tip of the left or the right steering-arms with a steering-rod second end bearing means, whereby the first end and the second end or the steering-rod can move freely while keeping a constant distance between the frontal steering-tip and the tip of the left or the right steering-arms,
    wherein, the left or right steering of the handlebar turns the handlebar-stem which rotates in conjunction with the upper steering-shaft, the lower steering-shaft, and the steering-tip on the lower steering-shaft, thus pushing or pulling the steering-rod, which in turn causes the front-tips of the left and right steering-arms to rotate jointly with the left and right front-wheel supports, and the left and right front-wheels around the left leg lower shaft and the right leg lower shaft respectively.

2. The three-wheeled scooter as recited in claim 1, further comprising:
    a front-frame;
    a frame-core, rigidly mounted within the front-frame, having a stem affixed to a top side of the frame-core;
    an upper linkage, having an upper linkage middle axle, an upper linkage left axle, and an upper linkage right axle perpendicularly affixed in a middle point, a left end, and a right end of the upper linkage respectively, wherein the upper linkage middle point is not collinear with the upper linkage left end and the upper linkage right end, and the upper linkage middle point is distanced equally from the upper linkage left end and the upper linkage right end, wherein
    the upper linkage middle axle is pivotally mounted in an upper opening built in the frame-core and supported by an upper linkage middle point bearing means,
    the upper linkage left axle is pivotally mounted in an upper opening built in the left leg and supported by an upper linkage left end bearing means,
    the upper linkage right axle is pivotally mounted in an upper opening built in the right leg and supported by an upper linkage right end bearing means;
    a lower linkage, having a lower linkage middle axle, a lower linkage left axle, and a lower linkage right axle perpendicularly affixed in a middle point, a left end, and a right end of the lower linkage respectively, wherein the lower linkage middle point is not collinear with the lower linkage left end and the lower linkage right end, and the lower linkage middle point is distanced equally from the lower linkage left end and the lower linkage right end, wherein
    the lower linkage middle axle is pivotally mounted in a lower opening built in the frame-core and supported by a lower linkage middle point bearing means,
    the lower linkage left axle is pivotally mounted in a lower opening built in the left leg and supported by a lower linkage left end bearing means,
    the lower linkage right axle is pivotally mounted in a lower opening built in the right leg and supported by a lower linkage right end bearing means;
        wherein the lower linkage, the upper linkage, the front-frame, the left leg, and the right leg form a parallelogram structure which maintains the front wheels and the rear-wheel at equal angles to a ground surface when the three-wheeled scooter leans left or right.

3. The three-wheeled scooter as recited in claim 1, further comprising a means for blocking pivotal movements of the upper linkage in an intermediary position by a hand-brake device mounted on the steering-handlebar, including:
    a clamp mechanism mounted on a frontal side of the front-frame;
    an arc-shaped component rigidly mounted on the upper linkage and being sandwiched between a front side and a back side of the clamp;
    a spring mounted between the front side and the back side of the clamp;
    a cable which has one end connected to the hand-brake device and another end connected to the front side of the clamp.

4. The three-wheeled scooter as recited in claim 2, wherein the three-wheeled scooter is further configured to be folded and unfolded by:
    jointly unlocking a first latch-strike-tip and a third latch-strike-tip while the three-wheeled scooter is in an unfolded state;

pivoting a joint-frame of the three-wheeled scooter around two ends of the joint-frame until the rear-wheel docks under the front-frame, wherein the mainframe is parallel to the joint-frame and to the front-frame, and wherein a second latch-strike-tip is docked in a bottom opening of the joint-frame, and a fourth latch-strike-tip is docked in a top opening of the joint-frame;

locking simultaneously the third latch-strike-tip and the fourth latch-strike-tip while the three-wheeled scooter is in a folded state;

jointly unlocking the second latch-strike-tip and the fourth latch-strike-tip while the three-wheeled scooter is in the folded state;

pivoting the joint-frame around its two ends until the mainframe is in a riding position, wherein the third latch-strike-tip is docked in a bottom opening of the joint-frame, and wherein the first latch-strike-tip is docked in a top opening of the joint-frame; and jointly locking the first latch-strike-tip and the third latch-strike-tip while the three-wheeled scooter is in the unfolded state.

5. The three-wheeled scooter as recited in claim 1, further comprising a means for maintaining the three-wheeled scooter in an upright position when the three-wheeled scooter is not mounted, the means including:

a modified lower linkage which has a left torsion-spring mounted on its left end and a right torsion-spring mounted on its right end, wherein the left torsion-spring has one end rigidly connected to the left end of the lower linkage, while its other end is rigidly connected to the left leg, and wherein the right torsion-spring has one end rigidly connected to the right end of the lower linkage, while its other end is rigidly connected to the right leg.

\* \* \* \* \*